US008639214B1

(12) United States Patent
Fujisaki

(10) Patent No.: US 8,639,214 B1
(45) Date of Patent: *Jan. 28, 2014

(54) COMMUNICATION DEVICE

(76) Inventor: Iwao Fujisaki, Tokyo (JP)

(*) Notice: Subject to any disclaimer, the term of this patent is extended or adjusted under 35 U.S.C. 154(b) by 1216 days.

This patent is subject to a terminal disclaimer.

(21) Appl. No.: 11/925,728

(22) Filed: Oct. 26, 2007

(51) Int. Cl.
H04M 11/00 (2006.01)

(52) U.S. Cl.
USPC ........ 455/406; 455/414.4; 455/407; 455/408; 379/88.03; 704/270; 705/30

(58) Field of Classification Search
USPC .................. 455/406, 414.4; 705/26; 704/270; 379/88.03, 218.01
See application file for complete search history.

(56) References Cited

U.S. PATENT DOCUMENTS

| | | | |
|---|---|---|---|
| 4,934,773 A | 6/1990 | Becker | |
| 4,937,570 A | 6/1990 | Matsukawa et al. | |
| 5,113,427 A | 5/1992 | Ryoichi et al. | |
| 5,272,638 A | 12/1993 | Martin et al. | |
| 5,345,272 A | 9/1994 | Ersoz et al. | |
| 5,353,376 A | 10/1994 | Oh et al. | |
| 5,388,147 A | 2/1995 | Grimes | |
| 5,404,579 A | 4/1995 | Obayashi et al. | |
| 5,405,152 A | 4/1995 | Katanics et al. | |
| 5,414,461 A | 5/1995 | Kishi et al. | |
| 5,418,837 A | 5/1995 | Johansson et al. | |
| 5,438,357 A | 8/1995 | McNelley | |
| 5,442,453 A | 8/1995 | Takagi et al. | |
| 5,446,904 A | 8/1995 | Belt et al. | |
| 5,479,476 A | 12/1995 | Finke-Anlauff | |
| 5,530,472 A | 6/1996 | Bregman et al. | |
| 5,532,741 A | 7/1996 | Tsutsumi | |
| 5,542,557 A | 8/1996 | Koyama et al. | |
| 5,543,789 A | 8/1996 | Behr et al. | |
| 5,550,754 A | 8/1996 | McNelley et al. | |
| 5,559,554 A | 9/1996 | Uekane et al. | |
| 5,625,675 A | 4/1997 | Katsumaru et al. | |
| 5,629,741 A | 5/1997 | Hopper | |
| 5,648,768 A | 7/1997 | Bouve | |
| 5,675,630 A | 10/1997 | Beatty | |
| 5,687,331 A | 11/1997 | Volk et al. | |
| 5,732,383 A | 3/1998 | Foladare et al. | |
| 5,758,280 A | 5/1998 | Kimura | |
| 5,772,586 A | 6/1998 | Heinonen et al. | |
| 5,778,304 A | 7/1998 | Grube et al. | |
| 5,786,846 A | 7/1998 | Hiroaki | |
| 5,802,460 A | 9/1998 | Parvulescu et al. | |
| 5,805,672 A | 9/1998 | Barkat et al. | |
| 5,812,930 A | 9/1998 | Zavrel | |

(Continued)

FOREIGN PATENT DOCUMENTS

| | | | |
|---|---|---|---|
| JP | H11/195137 | A1 | 7/1999 |
| JP | 2005/216149 | A1 | 8/2005 |
| WO | WO03001457 | A1 | 1/2003 |

OTHER PUBLICATIONS

Gamespot, "Super Mario Bros. 3", Feb 12, 1990, <http://www.gamespot.com/nes/action/supermariobros3/index.html?tag=tabs%3Bsummary>.

(Continued)

Primary Examiner — Kamran Afshar
Assistant Examiner — Shahriar Behnamian

(57) ABSTRACT

The communication device comprising a voice communicating implementer, a payment monetary value data transmitting implementer, a remaining monetary value data updating implementer, an automated supplementary monetary value data adding implementer, and a simultaneous implementation implementer.

3 Claims, 1 Drawing Sheet

(56) References Cited

U.S. PATENT DOCUMENTS

| | | | |
|---|---|---|---|
| 5,825,408 | A | 10/1998 | Yuyama et al. |
| 5,844,824 | A | 12/1998 | Newman et al. |
| 5,902,349 | A | 5/1999 | Endo et al. |
| 5,903,706 | A | 5/1999 | Wakabayashi et al. |
| 5,916,024 | A | 6/1999 | Von Kohorn |
| 5,918,180 | A | 6/1999 | Dimino |
| 5,924,040 | A | 7/1999 | Trompower |
| 5,959,661 | A | 9/1999 | Isono |
| 6,009,336 | A | 12/1999 | Harris et al. |
| 6,011,973 | A | 1/2000 | Valentine et al. |
| 6,034,715 | A | 3/2000 | Ishida et al. |
| 6,043,752 | A | 3/2000 | Hisada et al. |
| 6,069,648 | A | 5/2000 | Suso et al. |
| 6,073,034 | A | 6/2000 | Jacobsen et al. |
| 6,081,265 | A | 6/2000 | Nakayama et al. |
| 6,085,112 | A | 7/2000 | Kleinschmidt et al. |
| 6,094,237 | A | 7/2000 | Hashimoto |
| 6,115,597 | A | 9/2000 | Kroll et al. |
| 6,128,594 | A | 10/2000 | Gulli et al. |
| 6,144,848 | A | 11/2000 | Walsh et al. |
| 6,148,212 | A | 11/2000 | Park et al. |
| 6,161,134 | A | 12/2000 | Wang et al. |
| 6,167,283 | A | 12/2000 | Korpela et al. |
| 6,192,343 | B1 | 2/2001 | Morgan et al. |
| 6,198,942 | B1 | 3/2001 | Hayashi et al. |
| 6,202,060 | B1 | 3/2001 | Tran |
| 6,216,013 | B1 | 4/2001 | Moore et al. |
| 6,216,158 | B1 | 4/2001 | Luo et al. |
| 6,222,482 | B1 | 4/2001 | Gueziec |
| 6,223,029 | B1 | 4/2001 | Kikuchi et al. |
| 6,225,944 | B1 | 5/2001 | Hayes |
| 6,236,832 | B1 | 5/2001 | Ito |
| 6,243,039 | B1 | 6/2001 | Elliot |
| 6,249,720 | B1 | 6/2001 | Kubota et al. |
| 6,253,075 | B1 | 6/2001 | Beghtol et al. |
| 6,265,988 | B1 | 7/2001 | LeMense et al. |
| 6,285,317 | B1 | 9/2001 | Ong |
| 6,285,757 | B1 | 9/2001 | Carroll et al. |
| 6,292,666 | B1 | 9/2001 | Siddiqui et al. |
| 6,292,747 | B1 | 9/2001 | Amro et al. |
| 6,311,011 | B1 | 10/2001 | Kuroda |
| 6,311,077 | B1 | 10/2001 | Bien |
| 6,332,122 | B1 | 12/2001 | Ortega et al. |
| 6,333,684 | B1 | 12/2001 | Kang |
| 6,363,320 | B1 | 3/2002 | Chou |
| 6,366,651 | B1 | 4/2002 | Griffith et al. |
| 6,366,782 | B1 | 4/2002 | Fumarolo et al. |
| 6,374,221 | B1 | 4/2002 | Haimi-Cohen |
| 6,385,465 | B1 | 5/2002 | Yoshioka |
| 6,385,466 | B1 | 5/2002 | Hirai et al. |
| 6,385,541 | B1 | 5/2002 | Blumberg et al. |
| 6,385,654 | B1 | 5/2002 | Tanaka |
| 6,405,033 | B1 | 6/2002 | Kennedy, III et al. |
| 6,411,198 | B1 | 6/2002 | Hirai et al. |
| 6,411,822 | B1 | 6/2002 | Kraft |
| 6,415,138 | B2 | 7/2002 | Sirola et al. |
| 6,421,470 | B1 | 7/2002 | Nozaki et al. |
| 6,421,602 | B1 | 7/2002 | Bullock et al. |
| 6,430,498 | B1 | 8/2002 | Maruyama et al. |
| 6,438,380 | B1 | 8/2002 | Bi et al. |
| 6,442,404 | B1 | 8/2002 | Sakajiri |
| 6,445,802 | B1 | 9/2002 | Dan |
| 6,477,387 | B1 | 11/2002 | Jackson et al. |
| 6,486,867 | B1 | 11/2002 | Kopp et al. |
| 6,487,422 | B1 | 11/2002 | Lee |
| 6,510,325 | B1 | 1/2003 | Mack, II et al. |
| 6,512,919 | B2 | 1/2003 | Ogasawara |
| 6,518,956 | B1 | 2/2003 | Sato |
| 6,519,566 | B1 | 2/2003 | Boyer et al. |
| 6,526,293 | B1 | 2/2003 | Matsuo |
| 6,528,533 | B2 | 3/2003 | Lauffer et al. |
| 6,529,742 | B1 | 3/2003 | Yang |
| 6,532,035 | B1 | 3/2003 | Saari et al. |
| 6,538,558 | B2 | 3/2003 | Sakazume et al. |
| 6,542,750 | B2 | 4/2003 | Hendrey et al. |
| 6,542,814 | B2 | 4/2003 | Polidi et al. |
| 6,549,215 | B2 | 4/2003 | Jouppi |
| 6,553,309 | B2 | 4/2003 | Uchida et al. |
| 6,553,310 | B1 | 4/2003 | Lopke |
| 6,567,745 | B2 | 5/2003 | Fuchs et al. |
| 6,567,984 | B1 | 5/2003 | Allport |
| 6,600,975 | B2 | 7/2003 | Moriguchi et al. |
| 6,606,504 | B1 | 8/2003 | Mooney et al. |
| 6,611,753 | B1 | 8/2003 | Millington |
| 6,615,186 | B1 | 9/2003 | Kolls |
| 6,618,704 | B2 | 9/2003 | Kanevsky et al. |
| 6,622,018 | B1 | 9/2003 | Erekson |
| 6,630,958 | B2 | 10/2003 | Tanaka et al. |
| 6,631,271 | B1 | 10/2003 | Logan |
| 6,647,251 | B1 | 11/2003 | Siegle et al. |
| 6,650,877 | B1 | 11/2003 | Tarbouriech et al. |
| 6,650,894 | B1 | 11/2003 | Berstis et al. |
| 6,658,272 | B1 | 12/2003 | Lenchik et al. |
| 6,658,461 | B1 | 12/2003 | Mazo |
| 6,662,023 | B1 | 12/2003 | Helle |
| 6,665,711 | B1 | 12/2003 | Boyle et al. |
| 6,681,120 | B1 | 1/2004 | Kim |
| 6,687,515 | B1 | 2/2004 | Kosaka |
| 6,690,932 | B1 | 2/2004 | Barnier et al. |
| 6,694,143 | B1 | 2/2004 | Beamish et al. |
| 6,701,148 | B1 | 3/2004 | Wilson et al. |
| 6,707,942 | B1 | 3/2004 | Cortopassi et al. |
| 6,711,399 | B1 | 3/2004 | Granier |
| 6,725,022 | B1 | 4/2004 | Clayton et al. |
| 6,728,531 | B1 | 4/2004 | Lee et al. |
| 6,728,533 | B2 | 4/2004 | Ishii |
| 6,738,643 | B1 | 5/2004 | Harris |
| 6,738,711 | B2 | 5/2004 | Ohmura et al. |
| 6,763,226 | B1 | 7/2004 | McZeal, Jr. |
| 6,772,174 | B1 | 8/2004 | Pettersson |
| 6,775,361 | B1 | 8/2004 | Arai et al. |
| 6,779,030 | B1 | 8/2004 | Dugan et al. |
| 6,782,412 | B2 | 8/2004 | Brophy et al. |
| 6,788,928 | B2 | 9/2004 | Kohinata et al. |
| 6,795,715 | B1 | 9/2004 | Kubo et al. |
| 6,812,954 | B1 | 11/2004 | Priestman et al. |
| 6,813,501 | B2 | 11/2004 | Kinnunen et al. |
| 6,819,939 | B2 | 11/2004 | Masamura |
| 6,820,055 | B2 | 11/2004 | Saindon et al. |
| 6,836,654 | B2 | 12/2004 | Decotignie |
| 6,850,209 | B2 | 2/2005 | Mankins et al. |
| 6,865,372 | B2 | 3/2005 | Mauney et al. |
| 6,870,828 | B1 | 3/2005 | Giordano, III |
| 6,876,379 | B1 | 4/2005 | Fisher |
| 6,883,000 | B1 | 4/2005 | Gropper |
| 6,888,927 | B1 | 5/2005 | Cruickshank et al. |
| 6,891,525 | B2 | 5/2005 | Ogoro |
| 6,895,084 | B1 | 5/2005 | Saylor et al. |
| 6,895,256 | B2 | 5/2005 | Harma et al. |
| 6,895,259 | B1 | 5/2005 | Blank nee Keller et al. |
| 6,898,321 | B1 | 5/2005 | Knee et al. |
| 6,898,765 | B2 | 5/2005 | Matthews, III et al. |
| 6,901,383 | B1 | 5/2005 | Ricketts et al. |
| 6,904,298 | B2 | 6/2005 | Arai et al. |
| 6,912,544 | B1 | 6/2005 | Weiner |
| 6,922,212 | B2 | 7/2005 | Nakakubo et al. |
| 6,922,630 | B2 | 7/2005 | Maruyama et al. |
| 6,937,868 | B2 | 8/2005 | Himmel et al. |
| 6,947,728 | B2 | 9/2005 | Tagawa et al. |
| 6,954,645 | B2 | 10/2005 | Tsai et al. |
| 6,958,675 | B2 | 10/2005 | Maeda et al. |
| 6,961,559 | B1 | 11/2005 | Chow et al. |
| 6,968,184 | B2 | 11/2005 | Criss et al. |
| 6,968,206 | B1 | 11/2005 | Whitsey-Anderson |
| 6,970,178 | B2 | 11/2005 | Tanioka et al. |
| 6,970,703 | B2 | 11/2005 | Fuchs et al. |
| 6,992,699 | B1 | 1/2006 | Vance et al. |
| 6,999,757 | B2 | 2/2006 | Bates et al. |
| 6,999,802 | B2 | 2/2006 | Kim |
| 7,003,598 | B2 | 2/2006 | Kavanagh |
| 7,007,239 | B1 | 2/2006 | Hawkins et al. |
| 7,012,999 | B2 | 3/2006 | Ruckart |
| 7,019,770 | B1 | 3/2006 | Katz |
| 7,028,077 | B2 | 4/2006 | Toshimitsu et al. |

(56) References Cited

U.S. PATENT DOCUMENTS

| | | |
|---|---|---|
| 7,030,880 B2 | 4/2006 | Tanioka et al. |
| 7,035,666 B2 | 4/2006 | Silberfenig et al. |
| 7,058,356 B2 | 6/2006 | Slotznick |
| 7,076,052 B2 | 7/2006 | Yoshimura |
| 7,081,832 B2 | 7/2006 | Nelson et al. |
| 7,085,578 B2 | 8/2006 | Barclay et al. |
| 7,085,739 B1 | 8/2006 | Winter et al. |
| 7,089,298 B2 | 8/2006 | Nyman et al. |
| 7,106,846 B2 | 9/2006 | Nguyen et al. |
| 7,107,081 B1 | 9/2006 | Fujisaki |
| 7,113,981 B2 | 9/2006 | Slate |
| 7,117,152 B1 | 10/2006 | Mukherji et al. |
| 7,117,504 B2 | 10/2006 | Smith et al. |
| 7,126,951 B2 | 10/2006 | Belcea et al. |
| 7,127,238 B2 | 10/2006 | Vandermeijden et al. |
| 7,127,271 B1 | 10/2006 | Fujisaki |
| 7,130,630 B1 | 10/2006 | Enzmann et al. |
| 7,139,555 B2 | 11/2006 | Apfel |
| 7,142,810 B2 | 11/2006 | Oesterling |
| 7,142,890 B2 | 11/2006 | Irimajiri et al. |
| 7,146,179 B2 | 12/2006 | Parulski et al. |
| 7,190,880 B2 | 3/2007 | Cookson et al. |
| 7,218,916 B2 | 5/2007 | Nonami |
| 7,224,792 B2 | 5/2007 | Fusco |
| 7,224,851 B2 | 5/2007 | Kinjo |
| 7,224,987 B1 | 5/2007 | Bhela et al. |
| 7,231,231 B2 | 6/2007 | Kokko et al. |
| 7,233,781 B2 | 6/2007 | Hunter et al. |
| 7,233,795 B1 | 6/2007 | Ryden |
| 7,239,742 B2 | 7/2007 | Ohtani et al. |
| 7,251,255 B1 | 7/2007 | Young |
| 7,254,408 B2 | 8/2007 | Kim |
| 7,260,416 B2 | 8/2007 | Shippee |
| 7,266,186 B1 | 9/2007 | Henderson |
| 7,274,952 B2 | 9/2007 | Hayashi |
| 7,277,711 B2 | 10/2007 | Nyu |
| 7,321,783 B2 | 1/2008 | Kim et al. |
| 7,346,373 B2 | 3/2008 | Kim |
| 7,372,447 B1 | 5/2008 | Jacobsen et al. |
| 7,383,067 B2 | 6/2008 | Phillips et al. |
| 7,426,264 B1 | 9/2008 | Henderson |
| 7,433,845 B1 | 10/2008 | Flitcroft et al. |
| 7,444,168 B2 | 10/2008 | Nakagawa et al. |
| 7,450,709 B2 | 11/2008 | Gonzalez et al. |
| 7,451,084 B2 | 11/2008 | Funakura |
| 7,489,768 B1 | 2/2009 | Strietzel |
| 7,532,879 B1 | 5/2009 | Fujisaki |
| 7,551,899 B1 | 6/2009 | Nicolas et al. |
| 7,593,712 B2 | 9/2009 | Moton, Jr. et al. |
| 7,642,929 B1 | 1/2010 | Pinkus et al. |
| 7,657,252 B2 | 2/2010 | Futami |
| 7,707,592 B2 | 4/2010 | Wesslen et al. |
| 7,707,602 B2 | 4/2010 | Cragun et al. |
| 7,725,077 B2 | 5/2010 | Jung et al. |
| 7,769,364 B2 | 8/2010 | Logan et al. |
| 7,787,857 B2 | 8/2010 | Peterman |
| 7,787,887 B2 | 8/2010 | Gupta et al. |
| 7,853,295 B1 | 12/2010 | Fujisaki |
| 7,853,297 B1 | 12/2010 | Fujisaki |
| 7,865,567 B1 | 1/2011 | Hendricks et al. |
| 7,873,349 B1 | 1/2011 | Smith et al. |
| 7,890,089 B1 | 2/2011 | Fujisaki |
| 7,899,410 B2 | 3/2011 | Rakshani et al. |
| 7,922,086 B2 | 4/2011 | Jung et al. |
| 7,941,141 B2 | 5/2011 | Shoykhet et al. |
| 7,953,439 B2 | 5/2011 | Rofougaran |
| 7,970,414 B1 | 6/2011 | Werden et al. |
| 8,126,400 B2 | 2/2012 | Jung et al. |
| 8,208,954 B1 | 6/2012 | Fujisaki |
| 2001/0000249 A1 | 4/2001 | Oba et al. |
| 2001/0005826 A1 | 6/2001 | Shibuya |
| 2001/0011293 A1 | 8/2001 | Murakami et al. |
| 2001/0029425 A1 | 10/2001 | Myr |
| 2001/0035829 A1 | 11/2001 | Yu et al. |
| 2001/0037191 A1 | 11/2001 | Furuta et al. |
| 2001/0041590 A1 | 11/2001 | Silberfenig et al. |
| 2001/0048364 A1 | 12/2001 | Kalthoff et al. |
| 2001/0049470 A1 | 12/2001 | Mault et al. |
| 2002/0002044 A1 | 1/2002 | Naruse et al. |
| 2002/0002705 A1 | 1/2002 | Byrnes et al. |
| 2002/0004701 A1 | 1/2002 | Nakano |
| 2002/0006804 A1 | 1/2002 | Mukai et al. |
| 2002/0009978 A1 | 1/2002 | Dukach et al. |
| 2002/0016724 A1 | 2/2002 | Yang et al. |
| 2002/0019225 A1 | 2/2002 | Miyashita |
| 2002/0026348 A1 | 2/2002 | Fowler et al. |
| 2002/0028690 A1 | 3/2002 | McKenna et al. |
| 2002/0031120 A1 | 3/2002 | Rakib |
| 2002/0034292 A1 | 3/2002 | Tuoriniemi et al. |
| 2002/0036231 A1 | 3/2002 | Monaghan et al. |
| 2002/0036642 A1 | 3/2002 | Kwon et al. |
| 2002/0037738 A1 | 3/2002 | Wycherley et al. |
| 2002/0038219 A1 | 3/2002 | Yanay et al. |
| 2002/0039914 A1 | 4/2002 | Hama et al. |
| 2002/0041262 A1 | 4/2002 | Mukai et al. |
| 2002/0047787 A1 | 4/2002 | Mikkola et al. |
| 2002/0049630 A1 | 4/2002 | Furuta et al. |
| 2002/0049742 A1 | 4/2002 | Chan et al. |
| 2002/0052754 A1* | 5/2002 | Joyce et al. ............... 705/1 |
| 2002/0054068 A1 | 5/2002 | Ellis et al. |
| 2002/0055350 A1 | 5/2002 | Gupte et al. |
| 2002/0055872 A1 | 5/2002 | LaBrie et al. |
| 2002/0058497 A1 | 5/2002 | Jeong |
| 2002/0058531 A1 | 5/2002 | Terasaki et al. |
| 2002/0061767 A1 | 5/2002 | Sladen et al. |
| 2002/0065037 A1 | 5/2002 | Messina et al. |
| 2002/0065604 A1 | 5/2002 | Sekiyama |
| 2002/0066115 A1 | 5/2002 | Wendelrup |
| 2002/0068558 A1 | 6/2002 | Janik |
| 2002/0068585 A1 | 6/2002 | Chan et al. |
| 2002/0068599 A1 | 6/2002 | Rodriguez et al. |
| 2002/0072395 A1 | 6/2002 | Miramontes |
| 2002/0077808 A1 | 6/2002 | Liu et al. |
| 2002/0080163 A1 | 6/2002 | Morey |
| 2002/0082059 A1 | 6/2002 | Nariai et al. |
| 2002/0085700 A1 | 7/2002 | Metcalf |
| 2002/0094806 A1 | 7/2002 | Kamimura |
| 2002/0097984 A1 | 7/2002 | Abecassis |
| 2002/0098857 A1 | 7/2002 | Ishii |
| 2002/0102960 A1 | 8/2002 | Lechner |
| 2002/0103872 A1 | 8/2002 | Watanabe |
| 2002/0104095 A1 | 8/2002 | Nguyen et al. |
| 2002/0110246 A1 | 8/2002 | Gosior et al. |
| 2002/0115469 A1 | 8/2002 | Rekimoto et al. |
| 2002/0120589 A1 | 8/2002 | Aoki |
| 2002/0120718 A1 | 8/2002 | Lee |
| 2002/0123336 A1 | 9/2002 | Kamada |
| 2002/0127997 A1 | 9/2002 | Karlstedt et al. |
| 2002/0128000 A1 | 9/2002 | do Nascimento |
| 2002/0133342 A1 | 9/2002 | McKenna |
| 2002/0137470 A1 | 9/2002 | Baron et al. |
| 2002/0137503 A1 | 9/2002 | Roderique |
| 2002/0137526 A1 | 9/2002 | Shinohara |
| 2002/0141086 A1 | 10/2002 | Lang et al. |
| 2002/0142763 A1 | 10/2002 | Kolsky |
| 2002/0147645 A1 | 10/2002 | Alao et al. |
| 2002/0151326 A1 | 10/2002 | Awada et al. |
| 2002/0151327 A1 | 10/2002 | Levitt |
| 2002/0154632 A1 | 10/2002 | Wang et al. |
| 2002/0157101 A1 | 10/2002 | Schrader et al. |
| 2002/0164975 A1 | 11/2002 | Lu |
| 2002/0164996 A1 | 11/2002 | Dorenbosch |
| 2002/0165850 A1 | 11/2002 | Roberts et al. |
| 2002/0168959 A1 | 11/2002 | Noguchi et al. |
| 2002/0173344 A1 | 11/2002 | Cupps et al. |
| 2002/0177407 A1 | 11/2002 | Mitsumoto |
| 2002/0178009 A1 | 11/2002 | Firman |
| 2002/0178225 A1 | 11/2002 | Madenberg et al. |
| 2002/0183045 A1 | 12/2002 | Emmerson et al. |
| 2002/0183098 A1 | 12/2002 | Lee et al. |
| 2002/0191951 A1 | 12/2002 | Sodeyama et al. |
| 2002/0196378 A1 | 12/2002 | Slobodin et al. |
| 2002/0198813 A1 | 12/2002 | Patterson, Jr. et al. |
| 2002/0198936 A1 | 12/2002 | McIntyre et al. |

(56) References Cited

U.S. PATENT DOCUMENTS

| | | |
|---|---|---|
| 2003/0003967 A1 | 1/2003 | Ito |
| 2003/0005056 A1 | 1/2003 | Yamamoto et al. |
| 2003/0006879 A1 | 1/2003 | Kang et al. |
| 2003/0007556 A1 | 1/2003 | Oura et al. |
| 2003/0013483 A1 | 1/2003 | Ausems et al. |
| 2003/0014286 A1 | 1/2003 | Cappellini |
| 2003/0016189 A1 | 1/2003 | Abe et al. |
| 2003/0017857 A1 | 1/2003 | Kitson et al. |
| 2003/0018744 A1 | 1/2003 | Johanson et al. |
| 2003/0018748 A1 | 1/2003 | McKenna, Jr. |
| 2003/0032389 A1 | 2/2003 | Kim et al. |
| 2003/0032406 A1 | 2/2003 | Minear et al. |
| 2003/0033214 A1 | 2/2003 | Mikkelsen et al. |
| 2003/0037265 A1 | 2/2003 | Sameshima et al. |
| 2003/0038800 A1 | 2/2003 | Kawahara |
| 2003/0038893 A1 | 2/2003 | Rajamaki et al. |
| 2003/0045301 A1 | 3/2003 | Wollrab |
| 2003/0045311 A1 | 3/2003 | Larikka et al. |
| 2003/0045329 A1 | 3/2003 | Kinoshita |
| 2003/0045996 A1 | 3/2003 | Yamazaki et al. |
| 2003/0050776 A1 | 3/2003 | Blair |
| 2003/0052964 A1 | 3/2003 | Priestman et al. |
| 2003/0054830 A1 | 3/2003 | Williams et al. |
| 2003/0055994 A1 | 3/2003 | Herrmann et al. |
| 2003/0061606 A1 | 3/2003 | Hartwig et al. |
| 2003/0063580 A1 | 4/2003 | Pond |
| 2003/0063732 A1 | 4/2003 | Mcknight |
| 2003/0065784 A1 | 4/2003 | Herrod |
| 2003/0065805 A1 | 4/2003 | Barnes, Jr. |
| 2003/0069693 A1 | 4/2003 | Snapp et al. |
| 2003/0070162 A1 | 4/2003 | Oshima et al. |
| 2003/0073432 A1 | 4/2003 | Meade, II |
| 2003/0083055 A1 | 5/2003 | Riordan et al. |
| 2003/0083873 A1 | 5/2003 | Ross et al. |
| 2003/0084104 A1 | 5/2003 | Salem et al. |
| 2003/0084121 A1 | 5/2003 | De Boor et al. |
| 2003/0093503 A1 | 5/2003 | Yamaki et al. |
| 2003/0093790 A1 | 5/2003 | Logan et al. |
| 2003/0099367 A1 | 5/2003 | Okamura |
| 2003/0100326 A1 | 5/2003 | Grube et al. |
| 2003/0107580 A1 | 6/2003 | Egawa et al. |
| 2003/0109251 A1 | 6/2003 | Fujito et al. |
| 2003/0110450 A1 | 6/2003 | Sakai |
| 2003/0114191 A1 | 6/2003 | Nishimura |
| 2003/0115240 A1 | 6/2003 | Cho |
| 2003/0117316 A1 | 6/2003 | Tischer |
| 2003/0117376 A1 | 6/2003 | Ghulam |
| 2003/0119479 A1 | 6/2003 | Arima et al. |
| 2003/0119485 A1 | 6/2003 | Ogasawara |
| 2003/0119562 A1 | 6/2003 | Kokubo |
| 2003/0120784 A1 | 6/2003 | Johnson et al. |
| 2003/0122779 A1 | 7/2003 | Martin et al. |
| 2003/0125008 A1 | 7/2003 | Shimamura |
| 2003/0132928 A1 | 7/2003 | Kori |
| 2003/0135563 A1 | 7/2003 | Bodin et al. |
| 2003/0137970 A1 | 7/2003 | Odman |
| 2003/0142957 A1 | 7/2003 | Young et al. |
| 2003/0144024 A1 | 7/2003 | Luo |
| 2003/0148772 A1 | 8/2003 | Ben-Ari |
| 2003/0153310 A1 | 8/2003 | Ishii |
| 2003/0153355 A1 | 8/2003 | Warren |
| 2003/0153364 A1 | 8/2003 | Osann, Jr. |
| 2003/0155413 A1 | 8/2003 | Kovesdi et al. |
| 2003/0156208 A1 | 8/2003 | Obradovich |
| 2003/0157929 A1 | 8/2003 | Janssen et al. |
| 2003/0166399 A1 | 9/2003 | Tokkonen et al. |
| 2003/0169329 A1 | 9/2003 | Parker et al. |
| 2003/0171113 A1 | 9/2003 | Choi |
| 2003/0174685 A1 | 9/2003 | Hasebe |
| 2003/0181201 A1 | 9/2003 | Bomze et al. |
| 2003/0201982 A1 | 10/2003 | Iesaka |
| 2003/0204562 A1 | 10/2003 | Hwang |
| 2003/0208541 A1 | 11/2003 | Musa |
| 2003/0220835 A1 | 11/2003 | Barnes, Jr. |
| 2003/0222762 A1 | 12/2003 | Beigl et al. |
| 2003/0222982 A1 | 12/2003 | Hamdan et al. |
| 2003/0223554 A1 | 12/2003 | Zhang |
| 2003/0224760 A1 | 12/2003 | Day |
| 2003/0227570 A1 | 12/2003 | Kim et al. |
| 2003/0229900 A1 | 12/2003 | Reisman |
| 2003/0236709 A1 | 12/2003 | Hendra et al. |
| 2003/0236866 A1 | 12/2003 | Light |
| 2004/0003307 A1 | 1/2004 | Tsuji |
| 2004/0027369 A1 | 2/2004 | Kellock et al. |
| 2004/0029640 A1 | 2/2004 | Masuyama et al. |
| 2004/0033795 A1 | 2/2004 | Walsh et al. |
| 2004/0034692 A1 | 2/2004 | Eguchi et al. |
| 2004/0052504 A1 | 3/2004 | Yamada et al. |
| 2004/0068399 A1 | 4/2004 | Ding |
| 2004/0072595 A1 | 4/2004 | Anson et al. |
| 2004/0082321 A1 | 4/2004 | Kontianinen |
| 2004/0087326 A1 | 5/2004 | Dunko et al. |
| 2004/0092255 A1 | 5/2004 | Ji et al. |
| 2004/0103303 A1 | 5/2004 | Yamauchi et al. |
| 2004/0107072 A1 | 6/2004 | Dietrich et al. |
| 2004/0114732 A1 | 6/2004 | Choe et al. |
| 2004/0117108 A1 | 6/2004 | Nemeth |
| 2004/0128359 A1 | 7/2004 | Horvitz et al. |
| 2004/0132445 A1 | 7/2004 | Rogalski et al. |
| 2004/0137893 A1 | 7/2004 | Muthuswamy et al. |
| 2004/0137983 A1 | 7/2004 | Kerr et al. |
| 2004/0139208 A1 | 7/2004 | Tuli |
| 2004/0142678 A1 | 7/2004 | Krasner |
| 2004/0150725 A1 | 8/2004 | Taguchi |
| 2004/0157664 A1 | 8/2004 | Link |
| 2004/0166832 A1 | 8/2004 | Portman et al. |
| 2004/0166879 A1 | 8/2004 | Meadows et al. |
| 2004/0174863 A1 | 9/2004 | Caspi et al. |
| 2004/0183937 A1 | 9/2004 | Viinikanoja et al. |
| 2004/0185865 A1 | 9/2004 | Maanoja |
| 2004/0189827 A1 | 9/2004 | Kim et al. |
| 2004/0198374 A1 | 10/2004 | Bajikar |
| 2004/0203490 A1 | 10/2004 | Kaplan |
| 2004/0203520 A1 | 10/2004 | Schirtzinger et al. |
| 2004/0203577 A1 | 10/2004 | Forman et al. |
| 2004/0203904 A1 | 10/2004 | Gwon et al. |
| 2004/0203909 A1 | 10/2004 | Koster |
| 2004/0204018 A1 | 10/2004 | Kuo |
| 2004/0204035 A1 | 10/2004 | Raghuram et al. |
| 2004/0204126 A1 | 10/2004 | Reyes et al. |
| 2004/0204821 A1 | 10/2004 | Tu |
| 2004/0204848 A1 | 10/2004 | Matsuo et al. |
| 2004/0209649 A1 | 10/2004 | Lord |
| 2004/0216037 A1 | 10/2004 | Hishida et al. |
| 2004/0218738 A1 | 11/2004 | Arai et al. |
| 2004/0219951 A1 | 11/2004 | Holder |
| 2004/0222988 A1 | 11/2004 | Donnelly |
| 2004/0235513 A1 | 11/2004 | O'Connell |
| 2004/0235520 A1 | 11/2004 | Cadiz et al. |
| 2004/0242240 A1 | 12/2004 | Lin |
| 2004/0242269 A1 | 12/2004 | Fadell |
| 2004/0248586 A1 | 12/2004 | Patel et al. |
| 2004/0252197 A1 | 12/2004 | Fraley et al. |
| 2004/0257208 A1 | 12/2004 | Huang et al. |
| 2004/0266418 A1 | 12/2004 | Kotzin |
| 2004/0267628 A1* | 12/2004 | Stillman ........................ 705/26 |
| 2005/0004749 A1 | 1/2005 | Park |
| 2005/0020301 A1 | 1/2005 | Lee |
| 2005/0026629 A1 | 2/2005 | Contractor |
| 2005/0036509 A1 | 2/2005 | Acharya et al. |
| 2005/0046584 A1 | 3/2005 | Breed |
| 2005/0048987 A1 | 3/2005 | Glass |
| 2005/0070257 A1 | 3/2005 | Saarinen et al. |
| 2005/0075097 A1 | 4/2005 | Lehikoinen et al. |
| 2005/0090768 A1 | 4/2005 | Brattesani et al. |
| 2005/0097038 A1 | 5/2005 | Yu et al. |
| 2005/0107119 A1 | 5/2005 | Lee et al. |
| 2005/0113080 A1 | 5/2005 | Nishimura |
| 2005/0113113 A1 | 5/2005 | Reed |
| 2005/0120225 A1 | 6/2005 | Kirsch et al. |
| 2005/0136949 A1 | 6/2005 | Barnes et al. |
| 2005/0144560 A1 | 6/2005 | Gruen et al. |
| 2005/0151877 A1 | 7/2005 | Fisher |
| 2005/0153681 A1 | 7/2005 | Hanson |

(56) References Cited

U.S. PATENT DOCUMENTS

| | | |
|---|---|---|
| 2005/0153745 A1 | 7/2005 | Smethers |
| 2005/0159189 A1 | 7/2005 | Iyer |
| 2005/0164684 A1 | 7/2005 | Chen et al. |
| 2005/0165871 A1 | 7/2005 | Barrs et al. |
| 2005/0166242 A1 | 7/2005 | Matsumoto et al. |
| 2005/0186954 A1 | 8/2005 | Kenney |
| 2005/0191969 A1 | 9/2005 | Mousseau |
| 2005/0192030 A1 | 9/2005 | Asthana et al. |
| 2005/0235312 A1 | 10/2005 | Karaoguz et al. |
| 2005/0257149 A1 | 11/2005 | Kamiya et al. |
| 2005/0261945 A1 | 11/2005 | Mougin et al. |
| 2005/0272504 A1 | 12/2005 | Eguchi et al. |
| 2005/0282582 A1 | 12/2005 | Slotznick |
| 2006/0003813 A1 | 1/2006 | Seligmann et al. |
| 2006/0015819 A1 | 1/2006 | Hawkins et al. |
| 2006/0031407 A1 | 2/2006 | Dispensa et al. |
| 2006/0033809 A1 | 2/2006 | Farley |
| 2006/0041923 A1 | 2/2006 | McQuaide, Jr. |
| 2006/0052100 A1 | 3/2006 | Almgren |
| 2006/0059038 A1* | 3/2006 | Iuchi et al. ............... 705/14 |
| 2006/0073820 A1 | 4/2006 | Craswell et al. |
| 2006/0114100 A1 | 6/2006 | Ghabra et al. |
| 2006/0126284 A1 | 6/2006 | Moscovitch |
| 2006/0133590 A1 | 6/2006 | Jiang |
| 2006/0140173 A1 | 6/2006 | Hoover |
| 2006/0140387 A1 | 6/2006 | Boldt |
| 2006/0143655 A1 | 6/2006 | Ellis et al. |
| 2006/0166650 A1 | 7/2006 | Berger et al. |
| 2006/0167677 A1 | 7/2006 | Bitzer |
| 2006/0199571 A1 | 9/2006 | Chin et al. |
| 2006/0206913 A1 | 9/2006 | Jerding et al. |
| 2006/0229114 A2 | 10/2006 | Kim |
| 2006/0234693 A1 | 10/2006 | Isidore et al. |
| 2006/0234758 A1 | 10/2006 | Parupudi et al. |
| 2006/0276172 A1 | 12/2006 | Rydgren et al. |
| 2006/0284732 A1 | 12/2006 | Brock-Fisher |
| 2007/0005809 A1 | 1/2007 | Kobayashi et al. |
| 2007/0015550 A1 | 1/2007 | Kayanuma |
| 2007/0037605 A1 | 2/2007 | Logan |
| 2007/0050832 A1 | 3/2007 | Wright et al. |
| 2007/0061845 A1 | 3/2007 | Barnes, Jr. |
| 2007/0109262 A1 | 5/2007 | Oshima et al. |
| 2007/0121596 A1 | 5/2007 | Kurapati et al. |
| 2007/0135145 A1 | 6/2007 | Lee et al. |
| 2007/0135150 A1 | 6/2007 | Ushiki et al. |
| 2007/0142047 A1 | 6/2007 | Heeschen et al. |
| 2007/0190944 A1 | 8/2007 | Doan et al. |
| 2007/0191029 A1 | 8/2007 | Zarem et al. |
| 2007/0204014 A1 | 8/2007 | Greer et al. |
| 2007/0216760 A1 | 9/2007 | Kondo et al. |
| 2007/0218891 A1 | 9/2007 | Cox |
| 2007/0260456 A1 | 11/2007 | Proux et al. |
| 2007/0262848 A1 | 11/2007 | Berstis et al. |
| 2007/0293240 A1 | 12/2007 | Drennan |
| 2008/0014917 A1 | 1/2008 | Rhoads et al. |
| 2008/0016526 A1 | 1/2008 | Asmussen |
| 2008/0016534 A1 | 1/2008 | Ortiz et al. |
| 2008/0021728 A1 | 1/2008 | Khoo |
| 2008/0058005 A1 | 3/2008 | Zicker et al. |
| 2008/0146272 A1 | 6/2008 | Rao et al. |
| 2008/0151696 A1* | 6/2008 | Giroud et al. ............... 368/10 |
| 2008/0172173 A1 | 7/2008 | Chang et al. |
| 2008/0176545 A1* | 7/2008 | Dicke et al. ............... 455/418 |
| 2008/0194273 A1 | 8/2008 | Kansal et al. |
| 2008/0242271 A1 | 10/2008 | Schmidt et al. |
| 2008/0242283 A1 | 10/2008 | Ruckart |
| 2008/0250459 A1 | 10/2008 | Roman |
| 2008/0254811 A1 | 10/2008 | Stewart |
| 2008/0299989 A1 | 12/2008 | King et al. |
| 2009/0047972 A1 | 2/2009 | Neeraj |
| 2009/0111486 A1 | 4/2009 | Burstrom |
| 2009/0124243 A1 | 5/2009 | Routley et al. |
| 2009/0153490 A1 | 6/2009 | Nymark et al. |
| 2009/0186628 A1 | 7/2009 | Yonker et al. |
| 2009/0197641 A1 | 8/2009 | Rofougaran et al. |
| 2009/0221330 A1 | 9/2009 | Tomimori |
| 2009/0290369 A1 | 11/2009 | Schofield et al. |
| 2010/0030557 A1 | 2/2010 | Molloy et al. |
| 2010/0062740 A1 | 3/2010 | Ellis et al. |
| 2010/0099457 A1 | 4/2010 | Kim |
| 2010/0145700 A1 | 6/2010 | Kennewick et al. |
| 2011/0136508 A1 | 6/2011 | Fomukong et al. |

OTHER PUBLICATIONS

Audiovox, "POcket PC Phone User Manual", published on Mar. 19, 2004.
Gamespot, "Super Mario Bros. 3", Feb. 12, 1990, <http://www.gamespot.com/nes/action/supermariobros3/index.html?tag=tabs%3Bsummary>.
HI Corporation's company history (http://www.hicorp.co.jp/english/corporate/history.html).

* cited by examiner

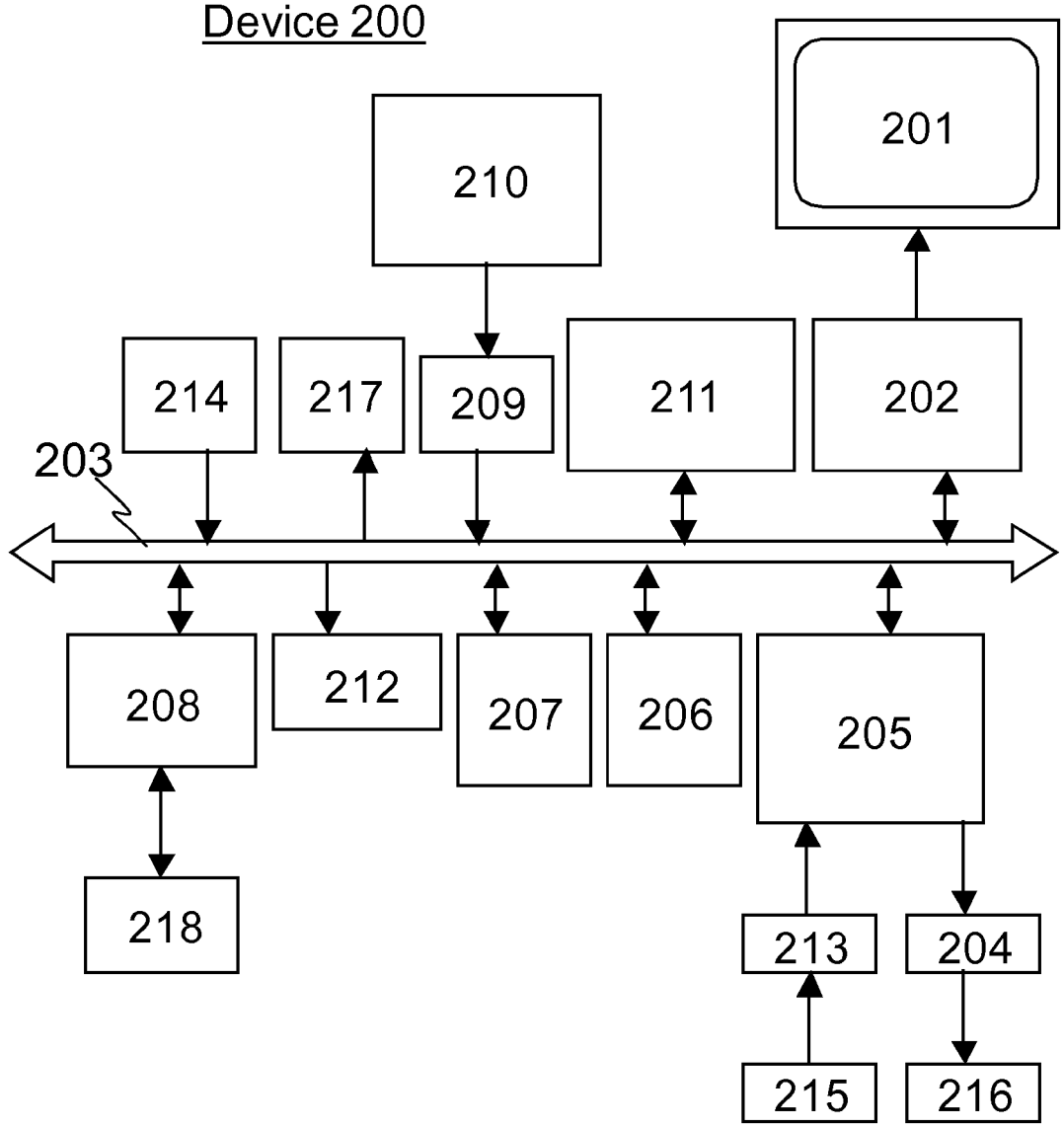

US 8,639,214 B1

COMMUNICATION DEVICE

CROSS REFERENCE TO RELATED APPLICATIONS

None.

BACKGROUND OF INVENTION

The invention relates to communication device and more particularly to the communication device which is capable to communicate with another communication device in a wireless fashion.

U.S. Pat. No. 6,763,226 is introduced as a prior art of the present invention of which the summary is the following: "World-Wide-Walkie-Talkie, a high speed multifunction interstellar wireless computer/instant messenger communicator, Personal Digital Assistant (PDA), coupled with a resilient, robust, VoIP data network and internet server method, deploying multiple wireless networks and protocols such as Voice Over IP, GPRS, WAP, Bluetooth, PCS, I-Mode, comprising a high speed Intel Pentium 4 Mobile™ or compatible Processor, to formulate a internet gateway system (99) and network bridge (150) for establishing instant low cost, real time global communications to the Public Switched Telephone Network via the internet (54). A PUSH-TO-TALK-WORLDWIDE button (21) instantly initiates global bisynchronous communications, or videoconferencing sessions. Fax, VideoMail, and unified messaging services are immediately available. GPS and mass memory provides global navigational tracking and data storage. Internet users, telephones, and cellular/satellite phone users can intercommunicate with the invention via VoIP/IM services. The invention provides uniformed global wireless communications, eliminates traditional long distance costs, and operates anywhere on earth." However, this prior art does not disclose the communication device comprising a voice communicating implementer, a payment monetary value data transmitting implementer, a remaining monetary value data updating implementer, an automated supplementary monetary value data adding implementer, and a simultaneous implementation implementer.

For the avoidance of doubt, the number of the prior arts introduced herein (and/or in IDS) may be of a large one, however, applicant has no intent to hide the more relevant prior art(s) in the less relevant ones.

SUMMARY OF INVENTION

It is an object of the present invention to provide a device capable to implement a plurality of functions.

It is another object of the present invention to provide merchandise to merchants attractive to the customers in the U.S.

It is another object of the present invention to provide mobility to the users of communication device.

It is another object of the present invention to provide more convenience to the customers in the U.S.

It is another object of the present invention to provide more convenience to the users of communication device or any tangible thing in which the communication device is fixedly or detachably (i.e., removably) installed.

It is another object of the present invention to overcome the shortcomings associated with the foregoing prior arts.

It is another object of the present invention to provide a device capable to implement a plurality of functions.

The present invention introduces the communication device comprising a voice communicating implementer, a payment monetary value data transmitting implementer, a remaining monetary value data updating implementer, an automated supplementary monetary value data adding implementer, and a simultaneous implementation implementer.

BRIEF DESCRIPTION OF DRAWINGS

The above and other aspects, features, and advantages of the invention will be better understood by reading the following more particular description of the invention, presented in conjunction with the following drawing, wherein:

FIG. 1 is a block diagram illustrating an exemplary embodiment of the present invention.

DETAILED DESCRIPTION

The following description is of the best presently contemplated mode of carrying out the present invention. This description is not to be taken in a limiting sense but is made merely for the purpose of describing the general principles of the invention. For example, each description of random access memory in this specification illustrate(s) only one function or mode in order to avoid complexity in its explanation, however, such description does not mean that only one function or mode can be implemented at a time. In other words, more than one function or mode can be implemented simultaneously by way of utilizing the same random access memory. In addition, the figure number is cited after the elements in parenthesis in a manner for example 'RAM 206 (FIG. 1)'. It is done so merely to assist the readers to have a better understanding of this specification, and must not be used to limit the scope of the claims in any manner since the figure numbers cited are not exclusive. There are only few data stored in each storage area described in this specification. This is done so merely to simplify the explanation and, thereby, to enable the reader of this specification to understand the content of each function with less confusion. Therefore, more than few data (hundreds and thousands of data, if necessary) of the same kind, not to mention, are preferred to be stored in each storage area to fully implement each function described herein. The scope of the invention should be determined by referencing the appended claims.

FIG. 1 is a simplified block diagram of the Communication Device 200 utilized in the present invention. Referring to FIG. 1, Communication Device 200 includes CPU 211 which controls and administers the overall function and operation of Communication Device 200. CPU 211 uses RAM 206 to temporarily store data and/or to perform calculation to perform its function, and to implement the present invention, modes, functions, and systems explained hereinafter. Video Processor 202 generates analog and/or digital video signals which are displayed on LCD 201. ROM 207 stores the data and programs which are essential to operate Communication Device 200. Wireless signals are received by Antenna 218 and processed by Signal Processor 208. Input signals are input by Input Device 210, such as a dial pad, a joystick, and/or a keypad, and the signals are transferred via Input Interface 209 and Data Bus 203 to CPU 211. Indicator 212 is an LED lamp which is designed to output different colors (e.g., red, blue, green, etc). Analog audio data is input to Microphone 215. A/D 213 converts the analog audio data into a digital format. Speaker 216 outputs analog audio data which is converted into an analog format from digital format by D/A 204. Sound Processor 205 produces digital audio signals that are transferred to D/A 204 and also processes the digital audio signals transferred from A/D 213. CCD Unit 214 captures video image which is stored in RAM 206 in a digital format. Vibrator 217 vibrates the entire device by the command from CPU 211.

As another embodiment, LCD 201 or LCD 201/Video Processor 202 may be separated from the other elements described in FIG. 1, and be connected in a wireless fashion to be wearable and/or head-mountable.

When Communication Device 200 is in the voice communication mode, the analog audio data input to Microphone 215 is converted to a digital format by A/D 213 and transmitted to another device via Antenna 218 in a wireless fashion after being processed by Signal Processor 208, and the wireless signal representing audio data which is received via Antenna 218 is output from Speaker 216 after being processed by Signal Processor 208 and converted to analog signal by D/A 204. For the avoidance of doubt, the definition of Communication Device 200 in this specification includes so-called 'PDA'. The definition of Communication Device 200 also includes in this specification any device which is mobile and/or portable and which is capable to send and/or receive audio data, text data, image data, video data, and/or other types of data in a wireless fashion via Antenna 218. The definition of Communication Device 200 further includes any micro device embedded or installed into devices and equipments (e.g., VCR, TV, tape recorder, heater, air conditioner, fan, clock, micro wave oven, dish washer, refrigerator, oven, washing machine, dryer, door, window, automobile, motorcycle, and modem) to remotely control these devices and equipments. The size of Communication Device 200 is irrelevant. Communication Device 200 may be installed in houses, buildings, bridges, boats, ships, submarines, airplanes, and spaceships, and firmly fixed therein.

This paragraph illustrate(s) the elements of Communication Device 200. The elements of Communication Device 200 described in this paragraph is identical to the ones described in FIG. 1, except Communication Device 200 has new element, i.e., LED 219. Here, LED 219 receives infra red signals from other wireless devices, which are transferred to CPU 211 via Data Bus 203. LED 219 also sends infra red signals in a wireless fashion which are composed by CPU 211 and transferred via Data Bus 203. As the second embodiment, LED 219 may be connected to Signal Processor 208. Here, LED 219 transfers the received infra red signals to Signal Processor 208, and Signal Processor 208 processes and converts the signals to a CPU readable format which are transferred to CPU 211 via Data Bus 203. The data produced by CPU 211 are processed by Signal Processor 208 and transferred to another device via LED 219 in a wireless fashion. The task of LED 219 is as same as that of Antenna 218 described in FIG. 1 except that LED 219 utilizes infra red signals for implementing wireless communication in the second embodiment. For the avoidance of doubt, the reference to FIG. 1 (e.g., referring to FIG. 1 in parenthesis) automatically refers to this paragraph in this specification.

This paragraph illustrate(s) the data stored in Host H. In the present embodiment, Host H includes Host Information Storage Area H00a which stores various types of data to assist and/or co-operate with Communication Device 200 to implement all modes, functions, and systems described in this specification. As another embodiment, Host H may be composed of a plurality of computers, i.e., one master computer and a plurality of slave computers, wherein the master computer is connected to the plurality of slave computers. As another embodiment, Host H may also be composed of a plurality of master computers by way of utilizing peer-to-peer connection.

<<Monetary Value Data Auto Charging Function>>

The following paragraphs illustrate the monetary value data auto charging mode implementor which sends a paying monetary value data via said wireless communication system in a wireless fashion, said paying monetary value data indicates a certain amount of monetary value of a certain currency utilized for payment, a remaining monetary value data is updated by subtracting said paying monetary value data therefrom, said remaining monetary value data is the total amount of monetary value of said certain currency capable to be utilized by said user, when said remaining monetary value data is below a certain value, said remaining monetary value data is automatically charged in a wireless fashion, an auto charged message data which is the message indicating that said remaining monetary value data is charged is displayed on said display, and when a payment log displaying command is input via said input device, said remaining monetary value data, a payment time log data which indicates the time and date at which the payment was made by utilizing said paying monetary value data, and a payment amount log data which indicates the amount of said paying monetary value data utilized for payment are displayed on said display, and a 1st location which indicates the geographic location at which the payment was made by utilizing said paying monetary value data and a 2nd location which indicates the current geographic location of said communication device are indicated on the map displayed on said display.

This paragraph illustrates the storage area included in Host H. In this embodiment, Host H includes Monetary Value Data Auto Charging Information Storage Area H634a of which the data and the software program(s) stored therein are described hereinafter.

This paragraph illustrates the storage area(s) included in Monetary Value Data Auto Charging Information Storage Area H634a. In this embodiment, Monetary Value Data Auto Charging Information Storage Area H634a includes Monetary Value Data Auto Charging Data Storage Area H634b and Monetary Value Data Auto Charging Software Storage Area H634c. Monetary Value Data Auto Charging Data Storage Area H634b stores the data necessary to implement the present function on the side of Host H, such as the one(s) described hereinafter. Monetary Value Data Auto Charging Software Storage Area H634c stores the software program(s) necessary to implement the present function on the side of Host H, such as the one(s) described hereinafter.

This paragraph illustrates the storage area(s) included in Monetary Value Data Auto Charging Data Storage Area H634b. In this embodiment, Monetary Value Data Auto Charging Data Storage Area H634b includes Monetary Value Relating Data Storage Area H634b1, Current Location Data Storage Area H634b2, Payment Log Relating Data Storage Area H634b3, and Work Area H634b4. Monetary Value Relating Data Storage Area H634b1 stores the data described hereinafter. Current Location Data Storage Area H634b2 stores the current location data which indicates the current geographic location of Communication Device 200 in (x,y,z) format. Payment Log Relating Data Storage Area H634b3 stores the data described hereinafter. Work Area H634b4 is utilized as a work area to perform calculation and temporarily store data.

This paragraph illustrates the storage area(s) included in Monetary Value Relating Data Storage Area H634b1. In this embodiment, Monetary Value Relating Data Storage Area H634b1 includes Remaining Monetary Value Data Storage Area H634b1a, Paying Monetary Value Data Storage Area H634b1b, Auto Charging Criteria Data Storage Area H634b1c, Charge Requesting Monetary Value Data Storage Area H634b1d, Charging Monetary Value Data Storage Area H634b1e, and Auto Charged Message Data Storage Area H634b1f. Remaining Monetary Value Data Storage Area H634b1a stores the remaining monetary value data which indicates the total amount of the monetary value data (e.g., $100) owned by the user of Communication Device 200. Here, the monetary value data is the numeric data which indicates the monetary value of a certain currency (e.g., U.S. dollars). Paying Monetary Value Data Storage Area H634b1b stores the paying monetary value data which indicates the amount of the monetary value data paid (e.g., $80). Auto Charging Criteria Data Storage Area H634b1c stores the auto charging criteria data which indicates a certain amount of monetary value data ($50). Charge Requesting Monetary Value Data Storage Area H634b1d stores the charge requesting monetary value data which indicates the amount of monetary value data requested to be charged (i.e., added) to the remaining monetary value data (e.g., $30). Charging Monetary Value Data Storage Area H634b1e stores the charging monetary value data which indicates the amount of monetary value data charged (i.e., added) to the remaining monetary value data (e.g., $30). Auto Charged Message Data Storage Area H634b1f stores the auto charged message data which is the message indicating that the remaining monetary value data is charged and the total amount thereof is increased.

This paragraph illustrates the storage area(s) included in Payment Log Relating Data Storage Area H634b3. In this embodiment, Payment Log Relating Data Storage Area H634b3 includes Payment Time Log Data Storage Area H634b3a, Payment Amount Log Data Storage Area H634b3b, Payment Location Log Data Storage Area H634b3c, Map Data Storage Area H634b3d, Current Location Icon Data Storage Area H634b3e, and Payment Location Icon Data Storage Area H634b3f. Payment Time Log Data Storage Area H634b3a stores the payment time log data which indicates the time and date at which a payment was made by utilizing the monetary value data. Payment Amount Log Data Storage Area H634b3b stores the payment amount log data which indicates the amount of the monetary value data which was utilized for payment (e.g., $80). Payment Location Log Data Storage Area H634b3c stores the payment location log data which indicates the geographic location at which the payment was made by utilizing the monetary value data. Map Data Storage Area H634b3d stores the map data which is the image data indicating a map. Current Location Icon Data Storage Area H634b3e stores the current location icon data which is the image of the icon utilized to indicate the current location data on the map data. Payment Location Icon Data Storage Area H634b3f stores the payment location icon data which is the image of the icon utilized to indicate the payment location log data on the map data.

This paragraph illustrates the software program(s) stored in Monetary Value Data Auto Charging Software Storage Area H634c. In this embodiment, Monetary Value Data Auto Charging Software Storage Area H634c stores Auto Charging Criteria Data Producing Software H634c1, Current Location Data Producing Software H634c2, Paying Monetary Value Data Transferring Software H634c3, Remaining Monetary Value Data Auto Charging Software H634c4, and Payment Log Displaying Software H634c5. Auto Charging Criteria Data Producing Software H634c1 is the software program described hereinafter. Current Location Data Producing Software H634c2 is the software program described hereinafter. Paying Monetary Value Data Transferring Software H634c3 is the software program described hereinafter. Remaining Monetary Value Data Auto Charging Software H634c4 is the software program described hereinafter. Payment Log Displaying Software H634c5 is the software program described hereinafter.

This paragraph illustrates the storage area included in RAM 206 (FIG. 1) of Communication Device 200. In this embodiment, RAM 206 includes Monetary Value Data Auto Charging Information Storage Area 206634a of which the data and the software program(s) stored therein are described hereinafter.

The data and/or the software program(s) necessary to implement the present function may be downloaded from Host H to Communication Device 200.

This paragraph illustrates the storage area(s) included in Monetary Value Data Auto Charging Information Storage Area 206634a. In this embodiment, Monetary Value Data Auto Charging Information Storage Area 206634a includes Monetary Value Data Auto Charging Data Storage Area 206634b and Monetary Value Data Auto Charging Software Storage Area 206634c. Monetary Value Data Auto Charging Data Storage Area 206634b stores the data necessary to implement the present function on the side of Communication Device 200, such as the one(s) described hereinafter. Monetary Value Data Auto Charging Software Storage Area 206634c stores the software program(s) necessary to implement the present function on the side of Communication Device 200, such as the one(s) described hereinafter.

This paragraph illustrates the storage area(s) included in Monetary Value Data Auto Charging Data Storage Area 206634b. In this embodiment, Monetary Value Data Auto Charging Data Storage Area 206634b includes Monetary Value Relating Data Storage Area 206634b1, Current Location Data Storage Area 206634b2, Payment Log Relating Data Storage Area 206634b3, and Work Area 206634b4. Monetary Value Relating Data Storage Area 206634b1 stores the data described hereinafter. Current Location Data Storage Area 206634b2 stores the current location data which indicates the current geographic location of Communication Device 200 in (x,y,z) format. Payment Log Relating Data Storage Area 206634b3 stores the data described hereinafter. Work Area 206634b4 is utilized as a work area to perform calculation and temporarily store data.

This paragraph illustrates the storage area(s) included in Monetary Value Relating Data Storage Area 206634b1. In this embodiment, Monetary Value Relating Data Storage Area 206634b1 includes Remaining Monetary Value Data Storage Area 206634b1a, Paying Monetary Value Data Storage Area 206634b1b, Auto Charging Criteria Data Storage Area 206634b1c, Charge Requesting Monetary Value Data Storage Area 206634b1d, Charging Monetary Value Data Storage Area 206634b1e, and Auto Charged Message Data Storage Area 206634b1f. Remaining Monetary Value Data Storage Area 206634b1a stores the remaining monetary value data which indicates the total amount of the monetary value data (e.g., $100) owned by the user of Communication Device 200. Here, the monetary value data is the numeric data which indicates the monetary value of a certain currency (e.g., U.S. dollars). Paying Monetary Value Data Storage Area 206634b1b stores the paying monetary value data which indicates the amount of the monetary value data paid (e.g., $80). Auto Charging Criteria Data Storage Area 206634b1c stores the auto charging criteria data which indicates a certain amount of monetary value data ($50). Charge Requesting Monetary Value Data Storage Area 206634b1d stores the charge requesting monetary value data which indicates the amount of monetary value data requested to be charged (i.e., added) to the remaining monetary value data (e.g., $30). Charging Monetary Value Data Storage Area 206634b1e stores the charging monetary value data which indicates the amount of monetary value data charged (i.e., added) to the remaining monetary value data (e.g., $30). Auto Charged Message Data Storage Area 206634b1f stores the auto charged message data which is the message indicating that the remaining monetary value data is charged and the total amount thereof is increased.

This paragraph illustrates the storage area(s) included in Payment Log Relating Data Storage Area 206634b3. In this embodiment, Payment Log Relating Data Storage Area 206634b3 includes Payment Time Log Data Storage Area 206634b3a, Payment Amount Log Data Storage Area 206634b3b, Payment Location Log Data Storage Area 206634b3c, Map Data Storage Area 206634b3d, Current Location Icon Data Storage Area 206634b3e, and Payment Location Icon Data Storage Area 206634b3f Payment Time Log Data Storage Area 206634b3a stores the payment time log data which indicates the time and date at which a payment was made by utilizing the monetary value data. Payment Amount Log Data Storage Area 206634b3b stores the payment amount log data which indicates the amount of the monetary value data which was utilized for payment (e.g., $80). Payment Location Log Data Storage Area 206634b3c stores the payment location log data which indicates the geographic location at which the payment was made by utilizing the monetary value data. Map Data Storage Area 206634b3d stores the map data which is the image data indicating a map. Current Location Icon Data Storage Area 206634b3e stores the current location icon data which is the image of the icon utilized to indicate the current location data on the map data. Payment Location Icon Data Storage Area 206634b3f stores the payment location icon data which is the image of the icon utilized to indicate the payment location log data on the map data.

This paragraph illustrates the software program(s) stored in Monetary Value Data Auto Charging Software Storage Area 206634c. In this embodiment, Monetary Value Data Auto Charging Software Storage Area 206634c stores Auto Charging Criteria Data Producing Software 206634c1, Current Location Data Producing Software 206634c2, Paying Monetary Value Data Transferring Software 206634c3, Remaining Monetary Value Data Auto Charging Software 206634c4, and Payment Log Displaying Software 206634c5. Auto Charging Criteria Data Producing Software 206634c1 is the software program described hereinafter. Current Location Data Producing Software 206634c2 is the software program described hereinafter. Paying Monetary Value Data Transferring Software 206634c3 is the software program described hereinafter. Remaining Monetary Value Data Auto Charging Software 206634c4 is the software program described hereinafter. Payment Log Displaying Software 206634c5 is the software program described hereinafter.

This paragraph illustrate(s) Auto Charging Criteria Data Producing Software H634c1 of Host H and Auto Charging Criteria Data Producing Software 206634c1 of Communication Device 200, which produce(s) the auto charging criteria data. In this embodiment, the user of Communication Device 200 inputs, by utilizing Input Device 210 (FIG. 1) or via voice recognition system, a numeric data (S1). CPU 211 (FIG. 1) produces the auto charging criteria data by referring to the numeric data input in the previous step and sends the data to Host H in a wireless fashion (S2). Host H receives the auto charging criteria data from Communication Device 200 and stores the data in Auto Charging Criteria Data Storage Area H634b1c (S3).

This paragraph illustrate(s) Current Location Data Producing Software H634c2 of Host H and Current Location Data Producing Software 206634c2 of Communication Device 200, which produce(s) the current location data. In this embodiment, CPU 211 (FIG. 1) identifies the current location of Communication Device 200 (S1). CPU 211 (FIG. 1) produces the current location data by referring to the current location identified in the previous step and sends the data to Host H in a wireless fashion (S2). Host H receives the current location data from Communication Device 200 and stores the data in Current Location Data Storage Area H634b2 (S3). The foregoing sequence is repeated periodically.

This paragraph illustrate(s) Paying Monetary Value Data Transferring Software H634c3 of Host H and Paying Monetary Value Data Transferring Software 206634c3 of Communication Device 200, which transfer(s) the paying monetary value data. The paying monetary value data is transferred to the payee's device in a wireless fashion for purposes of paying the price. In this embodiment, CPU 211 (FIG. 1) identifies the paying monetary value data (S1). Here, the paying monetary value data may be automatically identified by Communication Device 200 or another device, or manually identified by the user of Communication Device 200. CPU 211 (FIG. 1) sends the paying monetary value data identified in the previous step to Host H in a wireless fashion (S2). Host H receives the paying monetary value data from Communication Device 200 and stores the data in Paying Monetary Value Data Storage Area H634b1b (S3). Host H retrieves the paying monetary value data from Paying Monetary Value Data Storage Area H634b1b and sends the data to Communication Device 200 (S4). CPU 211 (FIG. 1) receives the paying monetary value data from Host H in a wireless fashion and sends the data to the payee's device (not shown) in a wireless fashion (S5). Here, the payee's device may be any type of device. The payee's device may be located in the store where the user purchases the product by utilizing the present function. Host H retrieves the remaining monetary value data from Remaining Monetary Value Data Storage Area H634b1a (S6). Host H updates the remaining monetary value data retrieved in the previous step by subtracting the paying monetary value data retrieved in S4 therefrom (S7). Host H stores the remaining monetary value data updated in the previous step in Remaining Monetary Value Data Storage Area H634b1a (S8). Host H identifies the current time (S9). Host H produces the payment time log data by referring to the current time identified in the previous step (S10). Host H stores the payment time log data produced in the previous step in Payment Time Log Data Storage Area H634b3a (S11). Host H retrieves the paying monetary value data from Paying Monetary Value Data Storage Area H634b1b (S12). Host H stores the paying monetary value data retrieved in the previous step as the payment amount log data in Payment Amount Log Data Storage Area H634b3b (S13). Host H retrieves the current location data from Current Location Data Storage Area H634b2 (S14). Host H stores the current location data retrieved in the previous step as the payment location log data in Payment Location Log Data Storage Area H634b3c (S15).

This paragraph illustrate(s) Remaining Monetary Value Data Auto Charging Software H634c4 of Host H and Remaining Monetary Value Data Auto Charging Software 206634c4 of Communication Device 200, which automatically charge(s) the remaining monetary value data. In this embodiment, Host H retrieves the remaining monetary value data from Remaining Monetary Value Data Storage Area H634b1a (S1). Assuming that the remaining monetary value data indicates $20. Host H retrieves the auto charging criteria data from Auto Charging Criteria Data Storage Area H634b1c (S2). Assuming that the auto charging criteria data indicates $50. If the remaining monetary value data retrieved in S1 is below the auto charging criteria data retrieved in the previous step, Host H proceeds to the next step (S3). Host H identifies the difference between the remaining monetary value data retrieved in S1 and the auto charging criteria data retrieved in S2(S4). Here, the difference is $30. Host H produces the charge requesting monetary value data by referring to the difference identified in the previous step (S5). Host H stores the charge requesting monetary value data produced in the previous step in Charge Requesting Monetary Value Data Storage Area H634b1d (S6). Host H retrieves the charge requesting monetary value data from Charge Requesting Monetary Value Data Storage Area H634b1d (S7). Host H sends the remaining monetary value data charging request to another device (not shown) (S8). Here, the remaining monetary value data charging request is the request to charge the remaining monetary value data with the monetary value data equivalent to the charge requesting monetary value data (e.g., $30) retrieved in the previous step. Here, another device may be any device (e.g., another Communication Device 200 or a server). The charging monetary value data is transferred from another device to Communication Device 200 in response. Host H receives the charging monetary value data from another device (not shown) in a wireless fashion (S9). Host H stores the charging monetary value data received in the previous step in Charging Monetary Value Data Storage Area H634b1e (S10). Host H retrieves the remaining monetary value data from Remaining Monetary Value Data Storage Area H634b1a (S11). Host H retrieves the charging monetary value data from Charging Monetary Value Data Storage Area H634b1e (S12). Host H updates the remaining monetary value data retrieved in S11 by adding the charging monetary value data retrieved in the previous step thereto (S13). Host H retrieves the remaining monetary value data from Remaining Monetary Value Data Storage Area H634b1a and sends the data to Communication Device 200 (S14). CPU 211 (FIG. 1) receives the remaining monetary value data from Host H in a wireless fashion and displays the data on LCD 201 (FIG. 1) (S15). Host H retrieves the auto charged message data from Auto Charged Message Data Storage Area H634b1f and sends the data to Communication Device 200 (S16). CPU 211 (FIG. 1) receives the auto charged message data from Host H in a wireless fashion and displays the data on LCD 201 (FIG. 1) (S17). The foregoing sequence is repeated periodically.

This paragraph illustrate(s) Payment Log Displaying Software H634c5 of Host H and Payment Log Displaying Software 206634c5 of Communication Device 200, which display(s) the log of payment by utilizing the monetary value data. In this embodiment, the user of Communication Device 200 inputs, by utilizing Input Device 210 (FIG. 1) or via voice recognition system, the payment log displaying command (S1). Here, the payment log displaying command is the command to display the log of payment by utilizing the monetary value data. CPU 211 (FIG. 1) sends the payment log displaying command input in the previous step to Host H in a wireless fashion (S2). Host H receives the payment log displaying command from Communication Device 200 (S3). Host H retrieves the remaining monetary value data from Remaining Monetary Value Data Storage Area H634b1a and sends the data to Communication Device 200 (S4). CPU 211 (FIG. 1) receives the remaining monetary value data from Host H in a wireless fashion and displays the data on LCD 201 (FIG. 1) (S5). Host H retrieves the payment time log data from Payment Time Log Data Storage Area H634b3a and sends the data to Communication Device 200 (S6). CPU 211 (FIG. 1) receives the payment time log data from Host H in a wireless fashion and displays the data on LCD 201 (FIG. 1) (S7). Host H retrieves the payment amount log data from Payment Amount Log Data Storage Area H634b3b and sends the data to Communication Device 200 (S8). CPU 211 (FIG. 1) receives the payment amount log data from Host H in a wireless fashion and displays the data on LCD 201 (FIG. 1) (S9). Host H retrieves the map data from Map Data Storage Area H634b3d and sends the data to Communication Device 200 (S10). CPU 211 (FIG. 1) receives the map data from Host H in a wireless fashion and displays the data on LCD 201 (FIG. 1) (S11). Host H retrieves the current location data from Current Location Data Storage Area H634b2 and sends the data to Communication Device 200 (S12). CPU 211 (FIG. 1) receives the current location data from Host H in a wireless fashion (S13). Host H retrieves the current location icon data from Current Location Icon Data Storage Area H634b3e and sends the data to Communication Device 200 (S14). CPU 211 (FIG. 1) receives the current location icon data from Host H in a wireless fashion (S15). CPU 211 (FIG. 1) displays the current location icon data received in the previous step at the location corresponding to the current location data received in S13 on the map data displayed in S11(S16). Host H retrieves the payment location log data from Payment Location Log Data Storage Area H634b3e and sends the data to Communication Device 200 (S17). CPU 211 (FIG. 1) receives the payment location log data from Host H in a wireless fashion (S18). Host H retrieves the payment location icon data from Payment Location Icon Data Storage Area H634b3f and sends the data to Communication Device 200 (S19). CPU 211 (FIG. 1) receives the payment location icon data from Host H in a wireless fashion (S20). CPU 211 (FIG. 1) displays the payment location icon data received in the previous step at the location corresponding to the payment location log data received in S18 on the map data displayed in S11(S21).

The following paragraphs illustrate another embodiment wherein Communication Device 200 plays the major role in implementing the present function.

This paragraph illustrate(s) Auto Charging Criteria Data Producing Software 206634c1 of Communication Device 200, which produce(s) the auto charging criteria data. In this embodiment, the user of Communication Device 200 inputs, by utilizing Input Device 210 (FIG. 1) or via voice recognition system, a numeric data (S1). CPU 211 (FIG. 1) produces the auto charging criteria data by referring to the numeric data input in the previous step (S2). CPU 211 (FIG. 1) stores the auto charging criteria data produced in the previous step in Auto Charging Criteria Data Storage Area 206634b1c (S3).

This paragraph illustrate(s) Current Location Data Producing Software 206634c2 of Communication Device 200, which produce(s) the current location data. In this embodiment, CPU 211 (FIG. 1) identifies the current location of Communication Device 200 (S1). CPU 211 (FIG. 1) produces the current location data by referring to the current location identified in the previous step (S2). CPU 211 (FIG. 1) stores the current location data produced in the previous step in Current Location Data Storage Area 206634b2 (S3). The foregoing sequence is repeated periodically.

This paragraph illustrate(s) Paying Monetary Value Data Transferring Software 206634c3 of Communication Device 200, which transfer(s) the paying monetary value data. The paying monetary value data is transferred to the payee's device in a wireless fashion for purposes of paying the price. In this embodiment, CPU 211 (FIG. 1) identifies the paying monetary value data (S1). Here, the paying monetary value data may be automatically identified by Communication Device 200 or another device, or manually identified by the user of Communication Device 200. CPU 211 (FIG. 1) stores the paying monetary value data identified in the previous step in Paying Monetary Value Data Storage Area 206634b1b (S2). CPU 211 (FIG. 1) retrieves the paying monetary value data from Paying Monetary Value Data Storage Area 206634b1b and sends the data to the payee's device (not shown) in a wireless fashion (S3). Here, the payee's device may be any type of device. The payee's device may be located in the store where the user purchases the product by utilizing the present function. CPU 211 (FIG. 1) retrieves the remaining monetary value data from Remaining Monetary Value Data Storage Area 206634b1a (S4). CPU 211 (FIG. 1) updates the remaining monetary value data retrieved in the previous step by subtracting the paying monetary value data retrieved in S3 therefrom (S5). CPU 211 (FIG. 1) stores the remaining monetary value data updated in the previous step in Remaining Monetary Value Data Storage Area 206634b1a (S6). CPU 211 (FIG. 1) identifies the current time (S7). CPU 211 (FIG. 1) produces the payment time log data by referring to the current time identified in the previous step (S8). CPU 211 (FIG. 1) stores the payment time log data produced in the previous step in Payment Time Log Data Storage Area 206634b3a (S9). CPU 211 (FIG. 1) retrieves the paying monetary value data from Paying Monetary Value Data Storage Area 206634b1b (S10). CPU 211 (FIG. 1) stores the paying monetary value data retrieved in the previous step as the payment amount log data in Payment Amount Log Data Storage Area 206634b3b (S11). CPU 211 (FIG. 1) retrieves the current location data from Current Location Data Storage Area 206634b2 (S12). CPU 211 (FIG. 1) stores the current location data retrieved in the previous step as the payment location log data in Payment Location Log Data Storage Area 206634b3c (S13).

This paragraph illustrate(s) Remaining Monetary Value Data Auto Charging Software 206634c4 of Communication Device 200, which automatically charge(s) the remaining monetary value data. In this embodiment, CPU 211 (FIG. 1) retrieves the remaining monetary value data from Remaining Monetary Value Data Storage Area 206634b1a (S1). Assuming that the remaining monetary value data indicates $20. CPU 211 (FIG. 1) retrieves the auto charging criteria data from Auto Charging Criteria Data Storage Area 206634b1c (S2). Assuming that the auto charging criteria data indicates $50. If the remaining monetary value data retrieved in S1 is below the auto charging criteria data retrieved in the previous step, CPU 211 (FIG. 1) proceeds to the next step (S3). CPU 211 (FIG. 1) identifies the difference between the remaining monetary value data retrieved in S1 and the auto charging criteria data retrieved in S2(S4). Here, the difference is $30. CPU 211 (FIG. 1) produces the charge requesting monetary value data by referring to the difference identified in the previous step (S5). CPU 211 (FIG. 1) stores the charge requesting monetary value data produced in the previous step in Charge Requesting Monetary Value Data Storage Area 206634b1d (S6). CPU 211 (FIG. 1) retrieves the charge requesting monetary value data from Charge Requesting Monetary Value Data Storage Area 206634b1d (S7). CPU 211 (FIG. 1) sends the remaining monetary value data charging request to another device (not shown) in a wireless fashion (S8). Here, the remaining monetary value data charging request is the request to charge the remaining monetary value data with the monetary value data equivalent to the charge requesting monetary value data (e.g., $30) retrieved in the previous step. Here, another device may be any device (e.g., another Communication Device 200 or a server). The charging monetary value data is transferred from another device to Communication Device 200 in response. CPU 211 (FIG. 1) receives the charging monetary value data from another device (not shown) in a wireless fashion (S9). CPU 211 (FIG. 1) stores the charging monetary value data received in the previous step in Charging Monetary Value Data Storage Area 206634b1e (S10). CPU 211 (FIG. 1) retrieves the remaining monetary value data from Remaining Monetary Value Data Storage Area 206634b1a (S11). CPU 211 (FIG. 1) retrieves the charging monetary value data from Charging Monetary Value Data Storage Area 206634b1e (S12). CPU 211 (FIG. 1) updates the remaining monetary value data retrieved in S11 by adding the charging monetary value data retrieved in the previous step thereto (S13). CPU 211 (FIG. 1) retrieves the remaining monetary value data from Remaining Monetary Value Data Storage Area 206634b1a (S14). CPU 211 (FIG. 1) displays the remaining monetary value data retrieved in the previous step on LCD 201 (FIG. 1) (S15). CPU 211 (FIG. 1) retrieves the auto charged message data from Auto Charged Message Data Storage Area 206634b1f (S16). CPU 211 (FIG. 1) displays the auto charged message data retrieved in the previous step on LCD 201 (FIG. 1) (S17). The foregoing sequence is repeated periodically.

This paragraph illustrate(s) Payment Log Displaying Software 206634c5 of Communication Device 200, which display(s) the log of payment by utilizing the monetary value data. In this embodiment, the user of Communication Device 200 inputs, by utilizing Input Device 210 (FIG. 1) or via voice recognition system, the payment log displaying command (S1). Here, the payment log displaying command is the command to display the log of payment by utilizing the monetary value data. CPU 211 (FIG. 1) retrieves the remaining monetary value data from Remaining Monetary Value Data Storage Area 206634b1a (S2). CPU 211 (FIG. 1) displays the remaining monetary value data retrieved in the previous step on LCD 201 (FIG. 1) (S3). CPU 211 (FIG. 1) retrieves the payment time log data from Payment Time Log Data Storage Area 206634b3a (S4). CPU 211 (FIG. 1) displays the payment time log data retrieved in the previous step on LCD 201 (FIG. 1) (S5). CPU 211 (FIG. 1) retrieves the payment amount log data from Payment Amount Log Data Storage Area 206634b3b (S6). CPU 211 (FIG. 1) displays the payment amount log data retrieved in the previous step on LCD 201 (FIG. 1) (S7). CPU 211 (FIG. 1) retrieves the map data from Map Data Storage Area 206634b3d (S8). CPU 211 (FIG. 1) displays the map data retrieved in the previous step on LCD 201 (FIG. 1) (S9). CPU 211 (FIG. 1) retrieves the current location data from Current Location Data Storage Area 206634b2 (S10). CPU 211 (FIG. 1) retrieves the current location icon data from Current Location Icon Data Storage Area 206634b3e (S11). CPU 211 (FIG. 1) displays the current location icon data retrieved in the previous step at the location corresponding to the current location data retrieved in S10 on the map data displayed in S9(S12). CPU 211 (FIG. 1) retrieves the payment location log data from Payment Location Log Data Storage Area 206634b3c (S13). CPU 211 (FIG. 1) retrieves the payment location icon data from Payment Location Icon Data Storage Area 206634b3f (S14). CPU 211 (FIG. 1) displays the payment location icon data retrieved in the previous step at the location corresponding to the payment location log data retrieved in S13 on the map data displayed in S9(S15).

<<Multiple Mode Implementing Function>>

The following paragraphs illustrate the multiple mode implementing function of Communication Device 200 which enables to activate and implement a plurality of modes, functions, and/or systems described in this specification simultaneously.

This paragraph illustrates the software programs stored in RAM 206 (FIG. 1) to implement the multiple mode implementing function (FIG. 1). RAM 206 includes Multiple Mode Implementer Storage Area 20690a. Multiple Mode Implementer Storage Area 20690a stores Multiple Mode Implementer 20690b, Mode List Displaying Software 20690c, Mode Selecting Software 20690d, Mode Activating Software 20690e, and Mode Implementation Repeater 20690f, all of which are software programs. Multiple Mode Implementer 20690b administers the overall implementation of the present function. One of the major tasks of Multiple Mode Implementer 20690b is to administer and control the timing and sequence of Mode List Displaying Software 20690c, Mode Selecting Software 20690d, Mode Activating Software 20690e, and Mode Implementation Repeater 20690f. For example, Multiple Mode Implementer 20690b executes them in the following order: Mode List Displaying Software 20690c, Mode Selecting Software 20690d, Mode Activating Software 20690e, and Mode Implementation Repeater 20690f. Mode List Displaying Software 20690c displays on LCD 201 (FIG. 1) a list of a certain amount or all modes, functions, and/or systems explained in this specification of which the sequence is explained hereinafter. Mode Selecting Software 20690d selects a certain amount or all modes, functions, and/or systems explained in this specification of which the sequence is explained hereinafter. Mode Activating Software 20690e activates a certain amount or all modes, functions, and/or systems selected by the Mode Selecting Software 20690d of which the sequence is explained hereinafter. Mode Implementation Repeater 20690f executes Multiple Mode Implementer 20690b which reactivates Mode List Displaying Software 20690c, Mode Selecting Software 20690d, Mode Activating Software 20690e of which the sequence is explained hereinafter.

This paragraph illustrates the sequence of Mode List Displaying Software 20690c. CPU 211 (FIG. 1), under the command of Mode List Displaying Software 20690c, displays a list of a certain amount or all modes, functions, and/or systems described in this specification on LCD 201 (FIG. 1).

This paragraph illustrates the sequence of Mode Selecting Software 20690d. The user of Communication Device 200 inputs an input signal by utilizing Input Device 210 (FIG. 1) or via voice recognition system identifying one of the modes, functions, and/or systems displayed on LCD 201 (FIG. 1) (S1), and CPU 211 (FIG. 1), under the command of Mode Selecting Software 20690d, interprets the input signal and selects the corresponding mode, function, or system (S2).

This paragraph illustrates the sequence of Mode Activating Software 20690e. CPU 211 (FIG. 1), under the command of Mode Activating Software 20690e, activates the mode, function, or, system selected in S2 described hereinbefore. CPU 211 thereafter implements the activated mode, function, or system as described in the relevant section of this specification.

This paragraph illustrates the sequence of Mode Implementation Repeater 20690f. The user of Communication Device 200 inputs an input signal by utilizing Input Device 210 (FIG. 1) or via voice recognition system (S1). Once the activation of the selected mode, function, or system described hereinbefore is completed, and if the input signal indicates to repeat the process to activate another mode, function, or system (S2), CPU 211 (FIG. 1), under the command of Mode Implementation Repeater 20690f, executes Multiple Mode Implementer 20690b, which reactivates Mode List Displaying Software 20690c, Mode Selecting Software 20690d, and Mode Activating Software 20690e to activate the second mode, function, or system while the first mode, function, or system is implemented by utilizing the method of so-called 'time sharing' (S3). Mode List Displaying Software 20690c, Mode Selecting Software 20690d, and Mode Activating Software 20690e can be repeatedly executed until all modes, function, and systems displayed on LCD 201 (FIG. 1) are selected and activated. The activation of modes, functions, and/or systems is not repeated if the input signal explained in S2 so indicates.

As another embodiment, Multiple Mode Implementer 20690b, Mode List Displaying Software 20690c, Mode Selecting Software 20690d, Mode Activating Software 20690e, and Mode Implementation Repeater 20690f described hereinbefore may be integrated into one software program, Multiple Mode Implementer 20690b. CPU 211 (FIG. 1), first of all, displays a list of a certain amount or all modes, functions, and/or systems described in this specification on LCD 201 (FIG. 1) (S1). Next, the user of Communication Device 200 inputs an input signal by utilizing Input Device 210 (FIG. 1) or via voice recognition system identifying one of the modes, functions, and/or systems displayed on LCD 201 (S2), and CPU 211 interprets the input signal and selects the corresponding mode, function, or system (S3). CPU 211 activates the mode, function, or system selected in S3, and thereafter implements the activated mode, function, or system as described in the relevant section of this specification (S4). Once the activation of the selected mode, function, or system described in S4 is completed, the user of Communication Device 200 inputs an input signal by utilizing Input Device 210 or via voice recognition system (S5). If the input signal indicates to repeat the process to activate another mode, function, or system (S6), CPU 211 repeats the steps S1 through S4 to activate the second mode, function, or system while the first mode, function, or system is implemented by utilizing the method so-called 'time sharing'. The steps of S1 though S4 can be repeatedly executed until all modes, function, and systems displayed on LCD 201 are selected and activated. The activation of modes, functions, and/or systems is not repeated if the input signal explained in S5 so indicates. As another embodiment, before or at the time one software program is activated, CPU 211 may, either automatically or manually (i.e., by a signal input by the user of Communication Device), terminate the other software programs already activated or prohibit other software programs to be activated while one software program is implemented in order to save the limited space of RAM 206, thereby allowing only one software program implemented at a time. For the avoidance of doubt, the meaning of each term 'mode(s)', 'function(s)', and 'system(s)' is equivalent to the others in this specification. Namely, the meaning of 'mode(s)' includes and is equivalent to that of 'function(s)' and 'system(s)', the meaning of 'function(s)' includes and is equivalent to that of 'mode(s)' and 'system(s)', and the meaning of 'system(s)' includes and is equivalent to that of 'mode(s)' and 'function(s)'. Therefore, even only mode(s) is expressly utilized in this specification, it impliedly includes function(s) and/or system(s) by its definition.

<<Functions/Modes Capable to be Implemented by Communication Device 200>>

For the avoidance of doubt, Communication Device 200 is capable to implement the following functions, modes, and systems: a voice communication function which transfers a 1st voice data input from said microphone via said wireless communicating system and outputs a 2nd voice data received via said wireless communicating system from said speaker; an auto backup function, wherein the data identified by the user is automatically retrieved from a data storage area of said communication device and transferred to another computing system in a wireless fashion periodically for purposes of storing a backup data therein; a stock purchase function which outputs a notice signal from said communication device when said communication device receives a notice data wherein said notice data is produced by a computing system and sent to said communication device when a stock price of a predetermined stock brand meets a predetermined criteria; a timer email function which sends an email data to a predetermined email address at the time indicated by an email data sending time data; an online payment function which sends a payment data indicating a certain amount of currency to a certain computing system or device in a wireless fashion in order for said certain computing system or device to deduct the amount indicated by said payment data from a certain account stored in said certain computing system or device; a navigation system which produces a map indicating the shortest route from a first location to a second location by referring to an attribution data; a remote controlling system which sends a 1st remote control signal in a wireless fashion by which a 1st device is controlled via a network, a 2nd remote control signal in a wireless fashion by which a 2nd device is controlled via a network, and a 3rd remote control signal in a wireless fashion by which a 3rd device is controlled via a network; a cellular TV function which receives a TV data, which is a series of digital data indicating a TV program, via said wireless communicating system in a wireless fashion and outputs said TV data from said communication device; a TV email received message displaying function, wherein an email received message is shown on said display indicating that a new email has arrived while a TV monitoring function is implemented; a TV audiovisual data recording function, wherein a TV audiovisual data is recorded; a TV screen shot function, wherein a screen shot of a TV screen displayed on said display is captured and stored as a still image; a timer video recording function, wherein a channel number to which a recording TV program pertains, a recording starting time from which a recording process is initiated, and a recording ending time until which said recording process is continued are identified, said recording TV program indicates the TV program to be recorded, and a recording TV program audiovisual data which is the audiovisual data corresponding to said recording TV program is recorded in accordance with a TV program data recording quality identified by the user, when said cellular TV recording function is implemented; and a cellular TV multiple recording function, wherein a TV listing is displayed on said display, said TV listing describes a plurality of TV programs, a 1st recording TV program is identified by an identifier displayed on said display, said 1st recording TV program is one of said plurality of TV programs included in said TV listing, a 2nd recording TV program is identified by said identifier displayed on said display, said 2nd recording TV program is one of said plurality of TV programs included in said TV listing, a 1st channel number to which said 1st recording TV program pertains, a 1st recording starting time from which a 1st recording process is initiated, and a 1st recording ending time until which said 1st recording process is continued are identified, a 1st recording TV program audiovisual data which is the audiovisual data corresponding to said 1st recording TV program is recorded in accordance with a 1st TV program data recording quality identified by the user, a 2nd channel number to which said 2nd recording TV program pertains, a 2nd recording starting time from which a 2nd recording process is initiated, and a 2nd recording ending time until which said 2nd recording process is continued are identified, and a 2nd recording TV program audiovisual data which is the audiovisual data corresponding to said 2nd recording TV program is recorded in accordance with a 2nd TV program data recording quality identified by the user, when said cellular TV multiple recording function is implemented; a recording TV program audiovisual data transferring function, wherein a recording TV program audiovisual data is recorded and transferred to another device via said wireless communicating system in a wireless fashion; a recording TV program audiovisual data email sending function, wherein a recording TV program audiovisual data is recorded and attached to an email and sent to another device via said wireless communicating system in a wireless fashion; a TV listing is displayed on said display, a TV listing describes a plurality of TV programs, a recording TV program is identified by an identifier displayed on said display, said recording TV program is one of said plurality of TV programs included in said TV listing, a channel number to which said recording TV program pertains, a recording starting time from which a recording process is initiated, and a recording ending time until which said recording process is continued are identified, and a recording TV program audiovisual data which is the audiovisual data corresponding to said recording TV program is received via said wireless communicating system in a wireless fashion and recorded in accordance with a TV program data recording quality identified by the user, when said cellular TV recording function is implemented; a subtitle data displaying function, wherein when a subtitle data displaying command is input via said input device, a subtitle data is displayed on said display; a pay per view function, wherein an authentication process is implemented and if a TV program data is authenticated, a TV program data is output from said communication device; a remote cellular TV recording function, wherein a recording TV program audiovisual data is recorded in another device; a call taxi function, wherein a pick up location which indicates the location for said taxi to pick up the user, a pick up time which indicates the time to pick up the user by said taxi, a passenger number which indicates the number of the passenger boarding said taxi, and a destination location which indicates the destination of said taxi are identified by the user; when said taxi is proceeding to said pick up location, a taxi current location which indicates the current geographic location of said taxi, an estimated waiting time which indicates the duration of time until which said taxi arrives at said pick up location, an estimated price which indicates the estimated price from said pick up location to said destination location, an estimated best route which indicates the estimated best route from said pick up location to said destination location, and an approaching route data which indicates the route from said taxi current location to said pick up location are displayed on said display; and when said taxi is proceeding to said destination location, said taxi current location and an estimated destination arrival time data which indicates the estimated time at which said taxi arrives at said destination location are displayed on said display; an address book updating function which updates the address book stored in said communication device by personal computer via network; a batch address book updating function which updates all address books of a plurality of devices including said communication device in one action; a batch scheduler updating function which updates all schedulers of a plurality of devices including said communication device in one action; a CD/PC inter-communicating function which retrieves the data stored in a data storage area and transfers said data directly to another computer by utilizing infra-red signal in a wireless fashion; a pre-dialing/dialing/waiting sound selecting function, wherein a selected pre-dialing sound which is one of the plurality of pre-dialing sound is registered, a selected dialing sound which is one of the plurality of dialing sound is registered, and a selected waiting sound which is one of the plurality of waiting sound is registered by the user of said communication device, and during the process of implementing a voice communication mode, said selected pre-dialing sound is output from said speaker before a dialing process is initiated, said selected dialing sound is output from said speaker during said dialing process is initiated, and said selected waiting sound is output from said speaker after said dialing process is completed; a multiple signal processing function, wherein said communication implements wireless communication under a 1st mode and a 2nd mode, said wireless communication is implemented by utilizing cdma2000 signal under said 1st mode, and said wireless communication is implemented by utilizing W-CDMA signal under said 2nd mode; a pin-pointing function, wherein a plurality of in-door access points are installed in an artificial structure, a target device location data which indicates the current geographic location of another device is identified by the geographical relation between said plurality of in-door access points and said another device, and said target device location data is indicated on said display; a CCD bar code reader function, wherein a bar code image data is retrieved via a camera and an alphanumeric data corresponding to said bar code image data is retrieved and displayed on said display; an online renting function which enables the user of communication device to download from another computing system and rent digital information for a certain period of time; an SOS calling function, wherein when a specific call is made from said communication device, a current geographic location data indicating the current geographic location of said communication device and a personal information data which indicates the information regarding the user of said communication device are sent to a specific device in a wireless fashion; a PC remote controlling function, wherein an image data is produced by a personal computer, said image data is displayed on said personal computer, said image data is transferred to said communication device, said image data is received via said wireless communicating system in a wireless fashion and displayed on said display, a remote control signal input via said input device is transferred to said personal computer via said wireless communicating system in a wireless fashion, and said personal computer is controlled in accordance with said remote control signal; a PC remote downloading function, wherein said communication device sends a data transferring instruction signal to a 1st computer via said wireless communicating system in a wireless fashion, wherein said data transferring instruction signal indicates an instruction to said 1st computer to transfer a specific data stored therein to a 2nd computer which is a computer different from said 1st computer; a ticket purchasing function which enables said communication device to purchase tickets in a wireless fashion; a remote data erasing function, wherein a data storage area stores a plurality of data, said remote data erasing function deletes a portion or all data stored in said data storage area in accordance with a data erasing command received from another computer via said wireless communicating system in a wireless fashion, said data erasing command identifies the data to be erased selected by the user; a part-timer finding function which enables the user of said communication device to find a part-time job in a specified manner by utilizing said communication device; a parking lot finding function which enables said communication device to display the closest parking lot with vacant spaces on said display with the best route thereto; an on demand TV function which enables said communication device to display TV program on said display in accordance with the user's demand; an inter-communicating TV function which enables said communication device to send answer data to host computing system at which said answer data from a plurality of communication devices including said communication device are counted and the counting data is produced; a display controlling function which enables said communication device to control the brightness and/or the contrast of said display per file opened or software program executed; a multiple party communicating function which enables the user of said communication device to voice communicate with more than one person via said communication device; a display brightness controlling function which controls the brightness of said display in accordance with the brightness detected by a photometer of the surrounding area of the user of said communication device; a multiple party pin-pointing function which enables said communication device to display the current locations of a plurality of devices in artificial structure; a phone number linking function which displays a phone number link and dials a phone number indicated by said phone number link when said phone number link is selected; a multiple window displaying function which displays a plurality of windows simultaneously on said display; a house item pin-pointing function which enables the user of said communication device to find the location of the house items for which the user is looking in a house, wherein the house items are the tangible objects placed in a house which are movable by human being; a membership administrating function in which host computing system allows only the users of said communication device who have paid the monthly fee to access host computing system to implement a certain function; a keyword search timer recording function which enables to timer record TV programs which meet a certain criteria set by the user of said communication device; a weather forecast displaying function which displays on said display the weather forecast of the current location of said communication device; a multiple language displaying function, wherein a selected language is selected from a plurality of languages, and said selected language is utilized to operate said communication device; a caller's information displaying function which displays personal information regarding caller on said display when said communication device receives a phone call; a communication device remote controlling function which enables said communication device to be remotely controlled via conventional telephone; a communication device remote controlling function which enables said communication device to be remotely controlled by a computer via a network; a shortcut icon displaying function, wherein a shortcut icon is displayed on said display, and a software program indicated by said shortcut icon is activated when said shortcut icon is selected; a task tray icon displaying function, wherein a task tray icon is displayed on said display, and a software program indicated by said task tray icon is executed in background; a multiple channel processing function which enables said communication device to send and receive a large amount of data in a short period of time by utilizing multiple channels; a solar battery charging function which enables to charge battery of said communication device by utilizing solar panel; a OS updating function which updates operating system of said communication device in a wireless fashion via said wireless communicating system; a device managing function which adds and deletes device controllers attached to or installed in said communication device; an automobile controlling function wherein said communication device remotely controls, in response to an automobile controlling command input via said input device, an automobile; an OCR function wherein an image data is input to a camera of said communication device, alphanumeric data is extracted from said image data; a realtime GPS function wherein the current geographic location of said communication device is calculated and if a corner is within a predetermined distance from said current location, a corresponding navigation sound data is output from said speaker; a CCD video stabilizing function, wherein a video data retrieved via said camera is stabilized in an electronic fashion; a DVD remote controlling function, wherein a chapter menu selecting signal is sent from said communication device in a wireless fashion which selects a chapter menu displayed on a DVD monitor, a chapter selecting signal is sent from said communication device in a wireless fashion which selects a chapter from a chapter list displayed on said DVD monitor, and a movie starting signal is sent from said communication device in a wireless fashion, thereby a movie is started and displayed on said DVD monitor; a dual frame buffer implementing function, wherein memory of said communication device includes 1st frame buffer and 2nd frame buffer, 1st video game data is written into said 1st frame buffer while 2nd video game data is read from said 2nd frame buffer and displayed on said display, and said 1st video game data is read from said 1st frame buffer and displayed on said display while 3rd video game data is written into said 2nd frame buffer; a mouse pointer image auto changing function, wherein mouse pointer image displayed on said display changes from 1st image to 2nd image when a predetermined condition is met; a dual CCD camera function which inputs two video data via two CCD cameras of said communication device, respectively; a radio tuner function which enables said communication device to receive a radio signal from said wireless communicating system, and output audio data indicated by said radio signal; a registered voice recognizing function which permits only the registered voice data to implement the voice recognition system; a TV resolution converting system of host computing system wherein host computing system converts the resolution of TV program data received from TV broadcast centers to a certain resolution adaptable to be displayed on said display of said communication device; a voice shortcut recognizing function which operates said communication device by a voice shortcut data input via said microphone; a vital sign monitoring function which senses and indicates on said display a vital sign data of the user of said communication device; an attached file emailing function, wherein an email is email is sent with a file attached thereto; a movie eticket function, wherein a certain movie is selected by said input device, a movie eticket indicating said certain movie is stored in a movie eticket data storage area, said movie eticket is retrieved from said movie eticket data storage area and output from said communication device, thereby the user of said communication device is admitted to enter a theater to watch a movie; a prepaid ecard function, wherein a certain amount of credit is stored in said communication device, when said communication device is within a certain distance from a charging device, a fare is charged to said communication device and the amount charged thereto is displayed on said display; a carrier epass function which enables the user of said communication device to board a carrier by utilizing a carrier pass formed by digital data; an in-carrier notifying function, wherein when said communication device is identified to be located in a carrier while implementing said voice communicating function, a predetermined message which indicates that the user is currently in an inappropriate location to implement a voice communication is transferred to another party; a station name notifying function, wherein when said communication device is located in a carrier, a station name data which indicates the name of the station at which said carrier is to arrive is output from said communication device; an emenu function, wherein a menu list data is displayed on said display, said menu list data indicates a menu list, when the user of said communication device selects a certain menu from said menu list data, a selected menu data indicating said certain menu selected by the user is transferred via said wireless communicating system to order said certain menu; a geographic location function, wherein a geographic location data which indicates the geographic location of said communication device is recorded, which is indicated on a map displayed on said display, a corresponding street address data which corresponds to said geographic location data is displayed on said display, and a corresponding phone number data which corresponds to said geographic location data is displayed on said display, and said geographic location data is operable to be indicated on another device; a dictionary function, wherein an image is retrieved via a camera of said communication device, an alphanumeric data is retrieved from said image, said alphanumeric data is compared to the data stored in a dictionary data storage area, and an explanation data corresponding to said alphanumeric data is retrieved from said dictionary data storage area and displayed on said display; a schedule notifying function which enables the user of said communication device to register his/her schedule via his/her personal computer and display a notice on said communication device when the registered schedule is about to start; a multiple type TV program function, wherein a satellite TV program data is received via said wireless communicating system and output from said speaker and said display under a 1st mode, and a ground wave TV program data is received via said wireless communicating system and output from said speaker and said display under a 2nd mode; a multiple TV screen displaying function, wherein a multiple TV screen is displayed on said display, said multiple TV screen includes a 1st cell, a 2nd cell, and a 3rd cell, a 1st TV program data, a 2nd TV program data, and a 3rd TV program data are received via said wireless communicating system, and said 1st TV program data of a shrunk version is displayed in said 1st cell, said 2nd TV program data of a shrunk version is displayed in said 2nd cell, and said 3rd TV program data of a shrunk version is displayed in said 3rd cell, simultaneously, when said 1st cell is selected by said input device, said 1st TV program data of a non-shrunk version is displayed on said display, when said 2nd cell is selected by said input device, said 2nd TV program data of a non-shrunk version is displayed on said display, and when said 3rd cell is selected by said input device, said 3rd TV program data of a non-shrunk version is displayed on said display; a touch panel function which enables the user to operate said communication device via a touch panel instead of said input device or a voice recognition system; a communication device finding function, wherein when said communication device detects the user's predetermined audio data via said microphone, said communication device responds by outputting a responding sound data from said speaker in order to assist the user to find the location of said communication device; a carrier safety measure controlling function, wherein a warning message is output from said display and the traveling speed of a carrier in which said communication device is installed is decreased when said carrier is no longer within a safety distance with another carrier; a product information retrieving function, wherein an image data attached to a product is input via a camera, a product data relating to said product is displayed on said display; a product information stored chip function, wherein a chip is attached to or embedded in a product and a data relating to said product is retrieved by utilizing said chip and a set of information regarding said product is displayed on said display; a karaoke playing function which enables said communication device to be utilized as a karaoke playing device; an anti-virus function which identifies a computer virus installed in said communication device; a continue enabled video game function which enables a video game to be continued from the point said video game ended; a resume enabled video game function which enables a video game to be resumed from the point said video game ended last time; a signal forwarding function, wherein a wireless signal received via said wireless communicating system from a 1st wireless communication device is forwarded to a 2nd wireless communication device; an in-carrier auto implementing function which implements a mode or function selected by the user of said communication device while said communication device is identified to be located in a carrier; a voice message displaying function, wherein a caller's voice message, which is an audio data, is retrieved and converted to a text data, and said text data is displayed on said display; a remote parameter setting function, wherein a parameter of said communication device is remotely set by another device; a multiple sender's email address function, wherein said communication device sends emails with a 1st sender's email address and a 2nd sender's email address which is different from said 1st sender's email address; a multiple phone number function, wherein said communication device possesses a first phone number and a second phone number which is different from said first phone number, said communication device answers a phone call dialed to said first phone number and also said second phone number; a TV program displaying function and a TV commercial customizing function, a TV program is displayed on said display by said TV program displaying function, and TV commercials which appear during intervals or breaks of said TV program are customized by said TV commercial customizing function; a common video game platform function which enables the user of said communication device to play video game software programs not compatible with the platform of said communication device; a directory displaying function which displays folders and subfolders on said display; a directory customizing function, wherein the appearance of folders and subfolders displayed on said display are customized; a host's directory customizing function which customizes folders, subfolders, and/or file names stored in a host computing system and displays said folders, subfolders, and/or file names on said display; a trash can function, wherein said communication device includes a trash can folder, a deleted data is stored in said trash can folder, which is restored therefrom; a motion character displaying function, wherein at least a portion of a sentence displayed on said display is displayed in motion; a bookmark displaying function which displays a list bookmarks in a first display area of said display, wherein when selecting a bookmark, a website represented by said bookmark is displayed in a second display area of said display; a CCD/LCD function, wherein said communication device comprises a camera, said camera is installed behind said display and said camera is located in the manner to face the same direction with said display; a pop up window blocking function which automatically blocks pop up windows to be displayed on said display; a map heading up function, wherein a map is displayed on said display and said map faces a certain direction regardless of the direction to which said communication device is currently facing; a copy once function which grants to duplicate a predetermined data only for one time; a copy restricted software integrated data, wherein said copy restricted software integrated data includes a software program which prohibits said copy restricted software integrated data to be duplicated; a folder sharing function which shares folders, subfolders, and data stored in said communication device with another device; an email folder managing function which displays a first display area, a second display area, and a third display area, wherein an email folder is displayed in said first display area, said email folder is capable to include an email subfolder, email titles of email files stored in said email folder are displayed in said second display area, when an email title from said email titles displayed in said second display area is selected, a corresponding email message is displayed in said third display area; a power on auto software executing function which automatically executes a software program, which was running at the time said communication device was powered off, when said communication device is powered on; an enhanced TV remote controlling function, wherein at the time a TV channel of a TV tuner is selected by utilizing said communication device, a TV program related data describing the TV program currently displayed on said TV channel is displayed on said display; a 3 CCD unit function, wherein a first CCD camera, a second CCD camera, and a third CCD camera are included in said camera, a first color value input via said camera is retrieved by said first CCD camera, a second color value input via said camera is retrieved by said second CCD camera, and a third color value input via said camera is retrieved by said third CCD camera; a multiple direction scrolling function which scrolls a display data displayed on said display in multiple directions; a radio frequency soft handover function, wherein when a first radio frequency being utilized for wireless communication becomes crowded due to having other wireless communication devices utilizing the same radio frequency, a second radio frequency is utilized for wireless communication, wherein, firstly, both said first radio frequency and said second frequency are utilized for wireless communication, and in the next step, said first radio frequency is ceased from being utilized for wireless communication and only said second radio frequency is utilized for wireless communication; an inter com function, wherein upon receiving a phone call from another device, said communication device initiates a voice communication without ringing said communication device, thereby the user of said communication device is capable to immediately answer said phone call; a website history recording function, wherein a history of web pages accessed by the user of said communication device is recorded and displayed on said display; a motion picture thumbnail displaying function, wherein a plurality of motion pictures are displayed on said display in thumbnail size; a 2D/3D map displaying function, wherein a 2D map and a 3D map are displayed simultaneously on said display; a remote schedule notifying function, wherein at the time said communication device detects that a scheduled event is about to occur, a notification is displayed on another device; an email notifying function, wherein at the time said communication device receives a new email, said new email is displayed on another device; a remote document printing function, wherein a document stored in said communication device which is selected by another device is printed by said another device; an anti-virus protection identifying function, wherein in advance of said communication device allowing another device to access data stored in said communication device, said communication device searches said another device for computer virus; an alphanumeric phone number dialing function, wherein a phone dialing process is implemented by utilizing alphabetical data; an automobile license number dialing function, wherein a phone dialing process is implemented by utilizing an automobile license number which is the number shown on the license plate attached to an automobile or a motorcycle; a point card function which accumulates a purchase price proportional credit data in said communication device, wherein said purchase price proportional credit data is the amount in points indicating a certain percentage of the purchase price of the product purchased by the user of said communication device; a display sharing function, wherein a display data displayed on said communication device is also displayed on and shared with another device; an email filtering function which rejects receiving emails including specified email addresses and/or grants receiving emails including specified email addresses; a received email auto sorting function which sorts the received emails in accordance with a criteria identified by the user of said communication device; a sent email auto sorting function which sorts the sending emails in accordance with a criteria identified by the user of said communication device; a country name displaying function which displays the name of the country where said communication device is currently located; an email attached file splitting function which splits the file attached to a sending email into fragments if said file exceeds a certain size; an auto TV starting function, wherein a TV program of a predetermined TV channel is automatically displayed on said display in response to a signal received from a computing system in a wireless fashion; an enhanced TV program replaying function which replays a TV program which is currently being recorded in said communication device; an enhanced TV program replaying function which replays a TV program which is currently being recorded in a host computing system; an enhanced TV program replaying function which replays a TV program which is currently being recorded in another device; an enhanced TV program replaying function which replays a TV program which is currently being recorded in said communication device under the control of a host computing system; a TV commercial skipping function which refrains from displaying TV commercials when replaying a recorded TV program; a timer schedule auto changing function which automatically changes a timer recording schedule of a TV program; a remote alarm setting function wherein said communication device remotely sets an alarm schedule data of another device, and an alarm of said another device is activated in accordance with said alarm schedule data; a current location non-notifying function, wherein the current geographic location of the user of said communication device is not disclosed to another device when said communication device is currently located in a specific area; a device remotely locking function by which said communication device is locked and/or unlocked in a remote fashion; an EZ macro function, wherein a pre-recorded key stroke is implemented when a predetermined shortcut key is input by utilizing said input device or via voice recognition system; an alcohol level identifying function which identifies the level of alcohol included in the breath of the user of said communication device; a displayed visual data size modifying function which displays a visual data displayed on said display of said communication device on a display another device, wherein the size of said display of said communication device is different from the size of said display of said another device; a button size changing function, wherein a plurality of buttons are displayed on said display, and the size of each of said plurality of buttons is changed by the user of said communication device; an epayment sound selecting function, wherein at the time an epayment which is a payment implemented in an electronic fashion is made, an epayment sound selected by the user of said communication device is output from said speaker and/or another device; a multiple TV program recording function, wherein a plurality of TV programs are recorded simultaneously; a TV program data trashcan function, wherein an audiovisual data of a TV program which is deleted by the user of said communication device is stored in a trashcan from which said audiovisual data is operable to be restored; an ereceipt producing function, wherein a gate is installed in a store, when the user of said communication device proceeds through said gate with a product, a product data regarding said product is sent to said gate in a wireless fashion, and a receipt in an electronic form is sent to said communication device in a wireless fashion; a memo sharing function, wherein a memo displayed on said communication device is displayed on another device, and editing said memo by said communication device is reflected to said memo displayed on said another device, and vice versa; a selected function remotely freezing function, wherein a function pre-selected by the user of said communication device is ceased to be implemented when said communication device receives a certain number of rings or a certain command via a network; a selected software remotely activating function, wherein a software program pre-selected by the user of said communication device is activated when said communication device receives a certain number of rings or a certain command via a network; a selected function remotely activating function, wherein a function pre-selected by the user of said communication device is activated when said communication device receives a certain number of rings or a certain command via a network; a selected software remotely freezing software, wherein a software program pre-selected by the user of said communication device is locked when said communication device receives a certain number of rings or a certain command via a network; a selected data remotely deleting data, wherein a data pre-selected by the user of said communication device is deleted when said communication device receives a certain number of rings or a certain command via a network; a web cash memory function, wherein an internet data is retrieved from the Internet and is displayed on said display, and said internet data previously retrieved and once displayed on said display is displayed again on said display; a keypad auto unlocking function, wherein during said input device is locked and thereby the input signals input via said input device are nullified, a predetermined input signal is valid even though said input device is locked; a voice recognition system auto unlocking function, wherein during a voice recognition system is locked and thereby a voice data input via said microphone is nullified, a predetermined voice data is valid even though said voice recognition system is locked; a voice recognition system auto unlocking function, wherein during a voice recognition system is locked and thereby a voice data input via said microphone is nullified, a predetermined voice data is valid even though said voice recognition system is locked; a TV program info displaying function, wherein a TV program related data is displayed on said display while said TV program is output from said speaker and said display; a best signal auto selecting function, wherein when said communication device is in a situation to implement wireless communication by W-LAN signal, mobile phone signal, and cordless signal, said communication device automatically selects one of them in accordance with a pre-determined priority data; a software timer activating function which activates a specific software program stored in a host computing system and/or said communication device at a predetermined time; a software timer terminating function which terminates a specific software program stored in a host computing system and/or said communication device at a predetermined time; a software timer deleting function which deletes a specific software program stored in a host computing system and/or said communication device at a predetermined time; a TV phone recording function, wherein an audiovisual data of a participant is recorded while a TV phone function is implemented; a hybrid GPS function which identifies the current geographic location of said communication device by utilizing one or more GPS artificial satellites, one or more mobile phone base stations, one or more W-LAN access points, and/or one or more mobile phones; an elevator controlling function which controls an elevator in a wireless fashion; a device migrating function which transfers data and software program stored in said communication device to another device; a cordless phone connection function, wherein when a main phone receives a phone call, said communication device is utilized as a cordless handset of said main phone; a cash deposit function which deposits to and/or withdraws money from an ATM machine; a highway fee auto paying function which pays a highway fee or toll automatically in a wireless fashion when an automobile is entering a highway; a by distance auto action function, wherein at the time said communication device is at a predetermined distance with another device, said communication device implements a predetermined action; an emoney transferring function, wherein an emoney data which is stored in said communication device is retrieved and sent to another device in a wireless fashion; a coupon disposing function, wherein said communication device sends a coupon data to a coupon disposing system, wherein said coupon disposing system discounts a price of a specific goods by applying said coupon data to a sales price; a multiple device searching function, wherein said communication device searches the data stored in a plurality of devices for a particular data and/or software program; a battery meter notifying function which calculates and displays a charge remaining time and a battery remaining time of a battery; a software infrared transmitting function, wherein said communication device transmits a software program to another device via an LED device; an electronic key function, wherein said communication device sends in a wireless fashion a key code data to an electronic key operated door to lock or unlock a door, wherein said key code data is operable to be duplicated another device in order for said another device to utilize said key code data; an automobile status monitoring function, wherein the current status of an automobile is displayed on said display; an enhanced business card transferring function, wherein said communication device sends a business card in an electronic form to another device in a wireless fashion; a removal media data transferring function which directly transfers a data stored in a removal media of said communication device to another device in a wireless fashion; an audiovisual data sharing function, wherein an audiovisual data output from said communication device is also output from and shared with another device; an email attachment supplementing function which subsequently add and/or replace a file attached to an email previously sent; an other device file emailing function which attaches a file stored in another device to an email sent by said communication device; a slide authoring function which enables the user of said communication device to author one or more slides; a remote/local credit card transaction function which transfers a credit card data indicating a credit card number of the user of said communication device via said wireless communicating system, wherein said credit card number is selected from a list of credit card numbers; an unread email sorting function, wherein if an unread email is detected, a shortcut icon indicating said unread email is displayed on a desktop displayed on said display of said communication device, and upon said shortcut icon is selected, an unread email is displayed on said display; a TV program replying function which displays a web address data and an email address data relating to a TV program displayed on said display while said TV program is displayed on said display or on-aired; a PC keyboard function which enables said communication device to be utilized as a keyboard of a personal computing system; an antenna mark displaying function which displays a signal type data and a signal strength data thereof on said display, wherein said signal type data indicates the type of the wireless signal utilized for wireless communication and said signal strength data indicates the strength of the foregoing wireless signal, and when two wireless signals are utilized for wireless communication, said signal type data and said signal strength data for each wireless signal are displayed on said display; an enhanced caller ID displaying function which displays a phone number data and a personal data of the caller upon receiving a phone call, and if said personal data of the caller is not found in said communication device, a public data stored in a host computing system is displayed instead; an enhanced call waiting function which displays a phone number data and a personal data of the caller upon receiving a phone call while the user of said communication device is on the phone by utilizing a voice communication function, and if said personal data of the caller is not found in said communication device, a public data stored in a host computing system is displayed instead; a phonebook auto icon displaying function, wherein a phone book is displayed on said display, and an icon indicating the type of phone number which is either a mobile phone type number or a fixed phone type number is displayed with each phone number data; a one click call back function, wherein when a caller's voice message is output from said speaker, a caller's phone number is displayed on said display, and upon selecting said caller's phone number, a phone call is implemented to the caller; a phone conversation storing function which stores an audiovisual data indicating the voice data of both the user and the other party on the other side of phone line, wherein said audiovisual data is stored in a host computing system from which said audiovisual data is replayed by another device; a caller ID requesting function, wherein when said communication device receives a phone call from a caller and the caller's phone number can not be identified, said communication device prompts the caller to input the caller's phone number, and if said communication device receives the caller's phone number, the phone line is connected between said communication device and the caller; a phone call audio notifying function, wherein when said communication device receives a phone call, the audio message indicating the caller's name and the caller's phone number is output from said speaker; an entry phone function which enables said communication device to receive phone calls from a entry phone, wherein said entry phone is the phone located at the entrance door and/or the gate of an artificial structure; a FAX sending/receiving function which sends and receives documents via FAX; an other device's phone book utilizing function which displays a phone book stored in another device; a multiple program executing function, wherein an icon is displayed on said display, when said icon is selected, a plurality of software programs associated with said icon are executed; a removal medium operating function which stores data and software programs in a medium of said communication device; a removal medium audiovisual data recording function which enables to directly record audiovisual data to a removal media included in said communication device and replay said audiovisual data therefrom; a nearest printer selecting function which selects the nearest printer from said communication device; an in-cabin com function which enables wireless communication between said communication device and another device in a carrier; a carrier current condition notifying function which displays a carrier current condition data which includes a destination current time data, a current speed data, a destination distance data, an estimated arrival time data, and a map data produced by a carrier on said display; a virtual space creating function, wherein a virtual 3D space is displayed on said display, a plurality of data are displayed in said virtual 3D space, and the user selects one of said data by a pointer movable in said virtual 3D space; a security camera function which enables to utilize said communication device as a security camera remotely controllable by another device; a remote camera controlling function which enables to remotely control said camera of said communication device by another device; a night vision camera function which retrieves visual data at night or in a dark place via a night vision camera; a multiple wireless signal handover function which handovers wireless communication among a 1st type signal, a 2nd type signal, and a 3rd type signal, wherein each of said 1st type signal, said 2nd type signal, and said 3rd type signal is a 2G signal, a 3G signal, a 3.xG signal, a 4G signal, a 4.xG signal, a W-LAN signal, a cordless phone signal, or an infrared signal; a multiple tab web browsing function, wherein when a plurality of web content data are retrieved from the Internet, a tab corresponding to each web content data is displayed in a browser, and a web content data corresponding to the selected tab is displayed on said browser; a multiple tab visual data viewing function, wherein when a plurality of visual data are retrieved from said communication device or host computing system, a tab corresponding to each visual data is displayed in a viewer, and the visual data corresponding to the selected tab is displayed in said viewer; a multiple tab document data viewing function, wherein when a plurality of document data are retrieved from said communication device or host computing system, the tab corresponding to each document data is displayed in a viewer, and a document data corresponding to the selected tab is displayed in said viewer; a multiple tab email data viewing function, wherein when a plurality of email data are retrieved from said communication device or host computing system, the tab corresponding to each email data is displayed in a viewer, and the email data corresponding to the selected tab is displayed in said viewer; a convenient TV remote controlling function which enables the user of said communication device to utilize said communication device as a TV remote controller; a form auto filling function which automatically fills in a form displayed on said display; a hybrid carrier function, wherein said communication device is installed in a hybrid carrier which runs on electricity and gasoline or any type of liquid fuel, and controls the electric motor and gas engine thereof; a carrier current condition monitoring function, wherein said communication device is installed in a carrier, said carrier monitors the amount of battery, gasoline, and oil left, and when one of the foregoing is below certain level, the closest gas station location and the shortest route thereto is displayed on said display; a memory defragmenting function, wherein a data storing device included in said communication device is defragmented, thereby said data storing device is optimized; a memory formatting function, wherein a data storing device included in said communication device is formatted; a memory partitioning function, wherein a data storing device included in said communication device is partitioned; a TV phone pausing function, wherein when a TV phone pausing command is input while a TV phone function is implemented, a pausing audiovisual data selected by the user is output from another device until said TV phone pausing command is canceled by said communication device; a reflecting object displaying function which displays a transparent object which implements a mirror-like property in a virtual three dimensional space produced by a computing system graphic generating technology; an alternative TV program receiving function, wherein said communication device is capable to receive a TV program from both a host computing system via a network and a broadcast center, and if the quality of said TV program received from said host computing system is below a certain level, said communication device receives the same TV program from said broadcast center instead, and vice versa; an alternative radio program receiving function, wherein said communication device is capable to receive a radio program from both a host computing system and a broadcast center, and if the quality of said radio program received from said host computing system is below a certain level, said communication device receives the same radio program from said broadcast center instead, and vice versa; an audiovisual auto fading function, wherein an audiovisual data replayed by said communication device automatically fades out and is paused to be replayed when said communication device receives a phone call, and said audiovisual data resumes to be replayed and fades in when said phone call ends; an audio auto fading function, wherein an audio data replayed by said communication device automatically fades out and is paused to be replayed when said communication device receives a phone call, and said audio data resumes to be replayed and fades in when said phone call ends; a video-in-video displaying function, wherein a main video display area is displayed on said display, a sub video display area is displayed in said main video display area, a first visual data is displayed in said main video display area, and a second visual data is displayed in said sub video display area; a pre-installed item purchasing function, wherein a pre-installed item data is stored in said communication device, said pre-installed item data is permitted to be utilized by said communication device if said pre-installed item data is purchased by the user; a multiple CPU function which performs data process simultaneously by utilizing multiple CPUs; a radio music downloading function which downloads a radio music data distributed by a radio broadcast center and replays said radio music data; a file auto saving function which automatically produces a backup file data of a object file data, wherein said backup file data is stored in said communication device, a host computing system, or another device; a TV tuner function, wherein said communication device outputs a TV program data from said display and said speaker in accordance with a TV remote controlling signal received in a wireless fashion, wherein said TV remote controlling signal includes a TV channel selecting signal, a TV previous channel selecting signal, a TV sound volume selecting signal, a TV previous sound volume selecting signal, a TV sound volume muting on signal, and/or a TV sound volume muting off signal; a GPS receiver's log function which produces a receiver's log data whenever the current location data indicating the geographic location of said communication device is sent to another device, wherein said receiver's log data includes the current location data of said communication device, a personal ID, and/or a date/time data; a remote room light controlling function which remotely turns on and off a room light installed in a room of an artificial structure; a remote kitchen stove controlling function which remotely turns on and off a kitchen stove installed in an artificial structure, wherein said kitchen stove is a device which is utilized to warm and/or cook food materials by gas and/or electricity; a remote refrigerator controlling function which remotely turns on and off a refrigerator, wherein said refrigerator is a device which is utilized to cool and/or freeze food materials by gas and/or electricity; a remote washing machine controlling function which remotely turns on and off a washing machine, wherein said washing machine is a device which is utilized to wash a certain type of materials; a remote faucet controlling function which remotely turns on and off the faucet, wherein said faucet is a device which provides hot and/or cold water and/or any type of liquid; a remote door lock controlling function which remotely locks and unlocks a door lock, wherein said door lock is a device which is capable to lock and unlock a door; a remote air conditioner controlling function which remotely turns on and off an air conditioner, wherein said air conditioner is a device which provides warm and/or cold air; a remote vending machine controlling function which remotely turns on and off the power of a vending machine, wherein said vending machine is a device which sells foods, soft drinks, alcohols, tickets, and/or news papers; a remote video recorder controlling function which remotely turns on and off the power of a video recorder, wherein said video recorder is a device which records and/or replays audiovisual data; a remote printer controlling function which remotely turns on and off the power of a printer, wherein said printer is a device which prints out data on papers; a remote camera controlling function which remotely turns on and off a camera, wherein said camera is a device which takes photos and/or videos; a remote TV tuner controlling function which remotely turns on and off a TV tuner, wherein said TV tuner is a device which outputs a TV program received from a TV broadcast center; a remote radio tuner controlling function which remotely turns on and off a radio tuner, wherein said radio tuner is a device which outputs radio programs received from a radio broadcast center; a remote computing system controlling function which remotely turns on and off the power of a computer; a remote carrier controlling function which remotely turns on and off the power of a carrier, wherein said carrier is a carrier or transportation system designed to carry passenger(s); a remote food processor controlling function which remotely turns on and off the power of a food processor; a remote dryer controlling function which remotely turns on and off the power of a dryer; a remote rice cooker controlling function which remotely turns on and off the rice cooker, wherein said rice cooker is a device which cooks rice; a remote sound outputting device controlling function which remotely turns on and off a sound outputting device, wherein said sound outputting device is a device which outputs audio data; a remote vacuum cleaner controlling function which remotely turns on and off the vacuum cleaner; a remote FAX machine controlling function which remotely turns on and off a FAX machine; a remote copying machine controlling function which remotely turns on and off a copying machine; a remote coffee maker controlling function which remotely turns on and off a coffee maker; a remote scanner controlling function which remotely turns on and off a scanner; a remote clothes iron controlling function which remotely turns on and off a clothes iron; a remote escalator controlling function which remotely turns on and off the escalator; a vending machine accessing function, wherein a plurality product name data are displayed on said display, when a certain product name data is selected from said plurality product name data, a product corresponding to said certain product name data is provided from said vending machine; an audiovisual data shuffling function, wherein said communication device replays a plurality of audiovisual data, and the order of replaying said plurality of audiovisual data is shuffled, and said plurality of audiovisual data are replayed in the order which is shuffled; an unknown file icon displaying function, wherein an identification of a file data and a linked icon are displayed on said display, and if said file data is not linked to any software program, a predetermined icon is displayed in lieu of said linked icon; an audiovisual document producing function, wherein an audiovisual data is pasted in a document, and said audiovisual data is replayed via said speaker and said display; an audiovisual data searching function, wherein an audio data is input via said microphone, an an audiovisual data including said audio data is output from said speaker and said display; a finger print log-on function, wherein a finger print is scanned, and if said finger print is authenticated, said communication device is granted to be utilized; a voice print log-on function, wherein a voice print is retrieved, and if said voice print is authenticated, said communication device is granted to be utilized; a finger print screen saver deactivating function, wherein a finger print is scanned, and if said finger print is authenticated, a screen saver displayed on said display is deactivated and said communication device is granted to be utilized; a voice print screen saver deactivating function, wherein a voice print is retrieved, and if said voice print is authenticated, a screen saver displayed on said display is deactivated and said communication device is granted to be utilized; a finger print folder accessing function, wherein a finger print is scanned, and if said finger print is authenticated, the user is granted to access a specific folder, wherein said specific folder is a directory capable to store one or more files and/or subfolders; a voice print folder accessing function, wherein a voice print is retrieved, and if said voice print is authenticated, the user is granted to access a specific folder, wherein said specific folder is a directory capable to store one or more files and subfolders; a finger print file accessing function, wherein a finger print is scanned, and if said finger print is authenticated, the user is granted to access a specific file; a voice print file accessing function, wherein a voice print is retrieved, and if said voice print is authenticated, the user is granted to access a specific file; a finger print internet accessing function, wherein a finger print is scanned, and if said finger print is authenticated, the user is granted to access the Internet; a voice print internet accessing function, wherein a voice print is retrieved, and if said voice print is authenticated, the user is granted to access the internet; a finger print PC log-on function, wherein a finger print is scanned, and if said finger print is authenticated, the user of said communication device is granted to utilize a personal computing system; a voice print PC log-on function, wherein a voice print is retrieved, and if said voice print is authenticated, the user of said communication device is granted to utilize a personal computing system; a finger print PC screen saver deactivating function, wherein a finger print is scanned, and if said finger print is authenticated, a screen saver displayed on a personal computing system is deactivated; a voice print PC screen saver deactivating function, wherein a voice print is retrieved, and if the voice print is authenticated, a screen saver displayed on a personal computing system is deactivated; a finger print PC folder accessing function, wherein a finger print is scanned, and if said finger print is authenticated, the user is granted to access a specific folder of a personal computing system, wherein said specific folder is a directory capable to store one or more files and subfolders; a voice print PC folder accessing function, wherein a voice print is retrieved, and if said voice print is authenticated, the user is granted to access a specific folder of a personal computing system, wherein said specific folder is a directory capable to store one or more files and subfolders; a finger print PC file accessing function, wherein a finger print is scanned, and if said finger print is authenticated, the user is granted to access a specific file of a personal computing system; a voice print PC file accessing function, wherein a voice print is retrieved, and if said voice print is authenticated, the user is granted to access a specific file of a personal computing system; a finger print PC internet accessing function, wherein a finger print is scanned, and if said finger print is authenticated, the user is granted to access the Internet by utilizing a personal computing system; a voice print PC internet accessing function, wherein a voice print is retrieved, and if said voice print is authenticated, the user is granted to access the Internet by utilizing a personal computing system; a shock proof memory function, wherein a current shock level data which indicates the level of physical shock posed to said communication device is monitored, and if said current shock level data exceeds a certain level, a data storing device included in said communication device is protected; a remote audiovisual device controlling function, wherein an audiovisual data is transferred to another device and said communication device remotely controls said another device by sending a command when said another device replays said audiovisual data; a direct TV-audio phone switching function, wherein an audio communication mode and audiovisual communication mode are implemented, a first audio data input from said microphone is transmitted via said wireless communicating system and a second audio data received via said antenna is output from said speaker when said audio communication mode is implemented, and a first audio data input from said microphone and a first visual data input from said camera are transmitted via said wireless communicating system and a second audio data and a second visual data received via said wireless communicating system are output from said speaker and said display respectively when said audiovisual communication mode is implemented, and when an audiovisual phone command is input via said input device during said audio communication mode is implemented, said audiovisual communication mode is initiated, and when an audio phone command is input via said input device during said audiovisual communication mode is implemented, said audio communication mode is initiated; an audiovisual data downloading function, wherein said communication device is included in an audiovisual data outputting device capable to receive and output audiovisual data distributed by a TV broadcast center, and another device is capable to receive said audiovisual data from said communication device, and said another device is capable to replay, pause, resume, and stop replaying said audiovisual data and control and/or mute the sound volume of said audiovisual data; an audio data downloading function, wherein said communication device is included in an audio data outputting device capable to receive and output audio data distributed by a radio broadcast center, another device is capable to receive said audio data from said communication device, and said another device is capable to replay, pause, resume, and stop replaying said audio data and control and mute the sound volume of said audio data; a self-active encrypted image reader function, wherein when a camera is activated, said communication device automatically detects an encrypted data included in an image data retrieved via said camera, if any, and identifies the alphanumeric data, audio data, visual data, and/or audiovisual data indicated by said encrypted data, wherein said encrypted data includes at least two colors or stripes, dots, and/or specific patterns; a robot remote controlling function, wherein a robot includes said communication device which is remotely controlled by another device, wherein said robot is controlled by a remote controlling command sent from another device, said remote controlling command indicates said robot to walk, sit down, stand up, run, turn left, turn right, lay down, wake up, dance, bring a specific item to the user of another device, take said specific item to a specific location, go to said specific location, and/or come to the user of said another device; a home page displaying function, wherein when a web browser is activated, a web page of a predetermined web address is automatically retrieved from the Internet and displayed on said display; a multiple OS operating function, wherein a plurality of operating systems are installed in said communication device, wherein a data produced by one OS is recognized and utilized by another OS; an audiovisual conversation data forwarding function, wherein an audiovisual data transmitted from a phone terminal is received by said communication device and said communication device forwards said audiovisual data to another device, and another audiovisual data transmitted from said another device is received by said communication device, and said communication device forwards said another audiovisual data to said phone terminal; an audio conversation data forwarding function, wherein an audio data transmitted from a phone terminal is received by said communication device and said communication device forwards said audio data to another device, another audio data transmitted from said another device is received by said communication device, and said communication device forwards said another audio data to said phone terminal; a phone call auto forwarding function, wherein when said communication device receives a phone call, the distance between said communication device and another device is identified, and if said distance exceeds a certain value, said communication device forwards said phone call to another device; a wireless communication method switching function, wherein when the quality of signal directly sent and received between said communication device and another device is below a certain level, said communication device implements wireless communication with said another device indirectly via a host computing system and/or a network; a drafted email viewing function, wherein the user is capable to draft an email by utilizing said communication device and review and continue to draft said email by another device; an email replying function, wherein when a reply email is produced, an attached file attached to a received email is automatically attached to said reply email, and said reply email is sent together with said attached file via a network; an attached file editing function, wherein a reply email corresponding to a received email sent to said communication device is produced, an attached file attached to said received email is automatically attached to said reply email, said attached file is capable to be edited, and said reply email is sent together with said attached file to the sender of said received email; an email audiovisual data auto blocking function, wherein an alphanumeric data included in a received email and an email received from another user via the Internet are displayed on said display along with an audiovisual data blocked notice indicating that said audiovisual data included in said received email is refrained from being displayed on said display, said audiovisual data included in said received email is displayed on said display when an audiovisual data viewing command indicating to output said audiovisual data is input via said input device; a HDD stored TV program replaying function, wherein said communication device includes a harddisk, a TV program data distributed by a TV broadcast center is stored in a data storing device, and said V program data is retrieved from said harddisk and output from said speaker and said display; a cooking menu auto implementing function, wherein said communication device is included in a micro wave oven, a list of cooking menu title data is displayed on said micro wave oven, when a cooking menu title data is selected from said list of cooking menu title data, said micro wave oven implements a cooking menu corresponding to the selected cooking menu title data, wherein said list of cooking menu title data is downloaded from a host computing system; a micro wave oven auto alarm function, wherein when an oven emits heat or micro wave for a predetermined period of time, a warning is output from said speaker and said display of said communication device and/or another device; an oven temperature remote controlling function, wherein an oven emits micro wave and/or heat in accordance with the temperature data, a timer data is set by said communication device, and said oven emits micro wave and/or heat in accordance with said timer data; an audio amplifying function, wherein an audio data is input via said microphone, and said audio data is output from said speaker in an amplified fashion; a calorie calculating function, wherein when one or more food products displayed on said display is/are selected by the user of said communication device, a total calorie which indicates the calories corresponding to said food products selected by the user is displayed on said display; a sickness identifying function, wherein when a sickness symptom is identified by the user of said communication device, and a sickness name corresponding to said sickness symptom is displayed on said display, a cure method to cure said sickness identified by said sickness name is displayed on said display, a medicine name effective to cure said sickness identified by said sickness name is displayed on said display, the name of the drug store closest to the current geographic location of said communication device is displayed on said display, and a map is displayed on said display, and a closest drug store icon and a current location icon are displayed on said map; a weather hazard auto notifying function, wherein when said communication device receives a weather hazard notice from a weather forecast center, said communication device displays a weather hazard warning on said display; a phone call auto forwarding function, wherein when said communication device receives a phone call, the distance between said communication device and another device is calculated, and if the distance exceeds a certain value in length, said phone call is forwarded to said another device and phone conversation is implemented between the caller and said another device; a multiple massaging function, wherein said communication device implements massage by emitting electromagnetic wave and/or electronic wave of low frequency; a microscope function, wherein a plurality of microscope units are included in said communication device, and a motion picture of an object which is magnified by one of said microscope units is displayed on said display; a door auto lock/unlock function, wherein said communication device is capable to lock and unlock a door, when another device recedes from said door and a distance data which indicates the distance between said door and said another device equals to a certain value, a door lock of said door is locked, and when said another device approaches said door and said distance data equals to a certain value, said door lock of said door is unlocked; a door auto close/open function, wherein said communication device is capable to close and open a door, when another device recedes from said door and a distance data which indicates the distance between said door and said another device equals to a certain value, said door is closed, and when said another device approaches said door and said distance data equals to a certain value, said door is opened; a room light auto on/off function, wherein said communication device is capable to turn on and off a room light, when another device recedes from a room light and a distance data which indicates the distance between said room light and another device equals to a certain value, said room light is turned off, and when said another device approaches said room light and said distance data equals to a certain value, said room light is turned on; an air conditioner auto on/off function, wherein said communication device is capable to turn on and off an air conditioner, when another device recedes from said air conditioner and a distance data which indicates the distance between said air conditioner and said another device equals to a certain value, said air conditioner is turned off, and when said another device approaches said air conditioner and said distance data equals to a certain value, said air conditioner is turned on; a heater auto on/off function, wherein said communication device is capable to turn on and off a heater, when another device recedes from said heater and a distance data which indicates the distance between said heater and said another device equals to a certain value, said heater is turned off, and when said another device approaches said heater and said distance data equals to a certain value, said heater is turned on; a faucet auto on/off function, wherein said communication device is capable to turn on and off a faucet, when another device recedes from said faucet and a distance data which indicates the distance between said faucet and said another device equals to a certain value, said faucet is turned off, and when said another device approaches said faucet and said distance data equals to a certain value, said faucet is turned on; a sound outputting device auto on/off function, wherein said communication device is capable to turn on and off a sound outputting device, when another device recedes from said sound outputting device and a distance data which indicates the distance between said sound outputting device and said another device equals to a certain value, said sound outputting device is turned off, and when said another device approaches said sound outputting device and a distance data equals to a certain value, said sound outputting device is turned on, wherein said sound outputting device is a device which outputs audio data; a vein print log-on function, wherein a vein print is scanned, and if said vein print is authenticated, said communication device is granted to be utilized, wherein said vein print indicates a pattern of the veins of finger and/or palm; a vein print screen saver deactivating function, wherein a vein print is scanned, and if said vein print is authenticated, a screen saver displayed on said display is deactivated and said communication device is granted to be utilized, wherein said vein print indicates a pattern of the veins of finger and/or palm; a vein print folder accessing function, wherein a vein print is scanned, and if said vein print is authenticated, the user is granted to access a specific folder, wherein said specific folder is a directory capable to store one or more files and subfolders and said vein print indicates a pattern of the veins of finger and/or palm; a vein print file accessing function, wherein a vein print is scanned, and if said vein print is authenticated, the user is granted to access a specific file, wherein said vein print indicates a pattern of the veins of finger and/or palm; a vein print internet accessing function, wherein a vein print is scanned, and if said vein print is authenticated, the user is granted to access the Internet, wherein said vein print indicates a pattern of the veins of finger and/or palm; a vein print PC log-on function, wherein a vein print is scanned, and if said vein print is authenticated, the user of said communication device is granted to utilize a personal computing system, wherein said vein print indicates a pattern of the veins of finger and/or palm; a vein print PC screen saver deactivating function, wherein a vein print is scanned, and if said vein print is authenticated, a screen saver displayed on a personal computing system is deactivated, wherein said vein print indicates a pattern of the veins of finger and/or palm; a vein print PC folder accessing function, wherein a vein print is scanned, and if said vein print is authenticated, the user is granted to access a specific folder of a personal computing system, wherein said specific folder is a directory capable to store one or more files and subfolders and said vein print indicates a pattern of the veins of finger and/or palm; a vein print PC file accessing function, wherein a vein print is scanned, and if said vein print is authenticated, the user is granted to access a specific file of a personal computing system, wherein said vein print indicates a pattern of the veins of finger and/or palm; a vein print PC internet accessing function, wherein a vein print is scanned, and if said vein print is authenticated, the user is granted to access the Internet by utilizing a personal computing system, wherein said vein print indicates a pattern of the veins of finger and/or palm; a ringtone auto updating function, wherein when a new ring tone audiovisual data is released, said new ring tone audiovisual data is automatically utilized and output from said speaker and said display to notify that a phone call is received; a time limited current location identifying function which identifies whether the current time is within a predetermined time frame, if the current time is within said predetermined time frame, the current geographic location of said communication device is notified to another device, and if the current time is not within said predetermined time frame, the current geographic location of said communication device is not notified to said another device and a current location non-notifying message data is transferred to said another device; an electric cable networking function, wherein a 1st digital data is sent to an electric currency and a 2nd digital data which is different from said 1st digital data is retrieved from said electric currency; a shoe sole pressure adjusting function, wherein said communication device is installed in a shoe, the hardness of a shoe sole of said shoe is increased or decreased under the control of said communication device, a host computing system via a network, or another device; a finger print removal media accessing function, wherein a finger print is scanned, and if said finger print is authenticated, the user is granted to access a removal media connected to said communication device; a voice print removal media accessing function, wherein a voice print is scanned, and if said voice print is authenticated, the user is granted to access a removal media connected to said communication device; a vein print removal media accessing function, wherein a vein print is scanned, and if said vein print is authenticated, the user is granted to access a removal media connected to said communication device; a finger print PC removal media accessing function, wherein a finger print is scanned, and if said finger print is authenticated, the user is granted to access a removal media connected to a personal computing system; a voice print PC removal media accessing function, wherein a voice print is scanned, and if said voice print is authenticated, the user is granted to access a removal media connected to a personal computing system; a vein print PC removal media accessing function, wherein a vein print is scanned, and if said vein print is authenticated, the user is granted to access a removal media connected to a personal computing system; a printer function, wherein said communication device is fixedly or removably installed in a printer, a printer parameter is identified by said communication device, and said printer prints out a document in accordance with said printer parameter, wherein said printer parameter includes a paper size data, a page layout data, a printing resolution data, a printing number data, and/or a current date data; a scanner function, wherein said communication device is fixedly or removably installed in a scanner, a scanner parameter is identified by said communication device, said scanner scans a document in accordance with said scanner parameter, wherein said scanner parameter includes a scanning resolution data, a scanning rotation data, a saving file format data, and a saving document format data; a multiple signal transferring function, wherein said communication device implements wireless communication with another device by utilizing, among a plurality of types wireless signals, the type of wireless signal of the best quality thereof, and said communication device implements wireless communication with a different device, while communicating with said another device, by utilizing another type of wireless signal; a free access point function, wherein said communication device performs as an access point to the Internet, if a usage fee to utilize said communication device to access the Internet is paid, another device is granted to access the Internet via said communication device without an advertisement data being output from said another device, and if said usage fee is not paid, said another device is granted to access the Internet via said communication device with said advertisement data being output from said another device; a partial BCC email function, wherein an email is displayed on said display, a first portion of said email is selected, said first portion may be any portion of said email, a second portion of said email is selected, said second portion may be any portion of said email, said first portion and said second portion are emphasized on said email and displayed on said display, and said first portion is sent to a first email address and said second portion is sent to a second email address; a noise reversing function, wherein said communication device is installed in a carrier, said microphone is located adjacent to a propulsion system of said carrier, said speaker is also located adjacent to said propulsion system of said carrier, a microphone retrieved noise audio data is retrieved from said microphone, and the phase of said microphone retrieved noise audio data is reversed and output from said speaker, wherein said carrier is a carrier or transportation system designed to carry passenger(s); a door status sensing function, wherein when said communication device identifies a door current status of a door, another device outputs a door message in relation to said door current status of said door, wherein said door message indicates that said door is currently opened, currently closed, just opened, and/or just closed; a drawer status sensing function, wherein when said communication device identifies a drawer current status of a drawer, another device outputs a drawer message in relation to said drawer current status of said drawer, wherein said drawer message indicates that said drawer is currently opened, currently closed, just opened, and/or just closed; a window status sensing function, wherein when said communication device identifies a window current status of a window, another device outputs a window message in relation to said window current status of said window, wherein said window message indicates that said window is currently opened, currently closed, just opened, and/or just closed; a curtain status sensing function, wherein when said communication device identifies a curtain current status of a curtain, another device outputs a curtain message in relation to said curtain current status of said curtain, wherein said curtain message indicates that said curtain is currently opened, currently closed, just opened, and/or just closed; a gate status sensing function, wherein when said communication device identifies a gate current status of a gate, another device outputs a gate message in relation to said gate current status of said gate, wherein said gate message indicates that said gate is currently opened, currently closed, just opened, and/or just closed; a stop watch function, wherein when a stop watch starting command is input to said communication device, a numeric data which is currently incremented is displayed on said display, and when a lapse data displaying command is input to said communication device, a lapsed time data is displayed on said display; a decrementing time function, wherein when a time decrementing starting command is input to said communication device, a numeric data which is currently decremented is displayed on said display, and when a decrementing data displaying command is input to said communication device, a decremented time data is displayed on said display; an energy efficient multiple CPU function, wherein a CPU of said communication device includes a first sub CPU and a second sub CPU, said first sub CPU and said second sub CPU process a CPU processing data simultaneously in high and/or low performance in accordance with the size of said CPU processing data in an energy efficient manner; a content notifying function, wherein a container includes said communication device, said communication device retrieves a product data regarding a product stored in said container from another device installed in or attached to said product, and said product data is displayed on a different device as well as said communication device and said another device, wherein said product data is capable to be edited by said communication device, said another device, and said different device; a virtual tilting function, wherein an electrode is located adjacent to the three semicircular canals of the user, and a three semicircular canals controlling signal is provided to said electrode, thereby producing an illusion of motion of tilting to left or right, a 3D object is displayed on said display, and when said 3D object is displayed in a tilted fashion, the illusion of motion of tilting to left or right is produced in a synchronized manner, wherein said display includes a left LCD and a right LCD, and said 3D object is displayed on said left LCD and said right LCD in a stereo fashion; a virtual vehicle tilting function, wherein a 3D object is displayed on said display, said 3D object is capable to be maneuvered via said input device or via voice recognition system, an electrode is located adjacent to the three semicircular canals of the user, and a three semicircular canals controlling signal is provided to said electrode, thereby producing the illusion of motion of tilting to left or right in accordance with the degree of tilt to left or right of said 3D object; a device approach notifying function, wherein a map is displayed on said display, a first location indicating the current geographic location of said communication device and a second location indicating the current geographic location of another device are displayed on said map, when said another device is within a certain distance from said communication device, said communication device outputs an approach notice which indicates that said another device is approaching and is within a certain distance from said communication device; a clock alarm snooze function, wherein an alarm is output at a predetermined time, and after said alarm is turned off, said alarm is output after a certain time interval; a news auto outputting function, wherein a news data indicating a news received from another computing system is displayed on said display, and said news data is updated automatically; an advertisement auto outputting function, wherein an advertisement data indicating an advertisement received from another computing system is displayed on said display, and said advertisement data is updated automatically; an online RPG function, wherein a 1st game character, a 2nd game character, and a 3rd game character are located in a 3D space, said 1st game character is the game character which is capable to be controlled by a 1st player, said 2nd game character is the game character which is capable to be controlled by a 2nd player, said 3rd game character is the game character which is capable to be controlled by a 3rd player, the outfit of each of said 1st, 2nd and 3rd game characters is capable to be selected by said 1st, 2nd, and 3rd player respectively, each game character is capable to communicate with another by utilizing text data, audio data, each game character is capable to share file(s), the name of each game character is displayed adjacent to the corresponding game character, one player is capable to send email(s) to another player, the current geographic location of each player is capable to be shared with other players, and the profile of each player is capable to be shared with other players; an inter device distance notifying function, wherein when the distance between said communication device and another device is more than a certain value, a message is output from said communication device; a link embedded motion picture displaying function, wherein a motion picture is displayed on said display, a mouse pointer is displayed on said display, when an object described in said motion picture is identified by said mouse pointer, a data relating to said object is displayed on said display; an audiovisual meta data producing function, wherein an audio data is input via said microphone, a portion of an audiovisual data corresponding to said audio data is output from said speaker and said display, or a text data is input by utilizing said input device or voice recognition system, a portion of an audiovisual data corresponding to said text data is output from said speaker and said display; an audiovisual highlight producing function, wherein a highlighted audiovisual data of an audiovisual data is produced by utilizing a certain criteria; an enhanced audiovisual highlight producing function, wherein a highlighted audiovisual data of an audiovisual data is produced by utilizing a certain criteria; a wireless power off function, wherein when a specific wireless signal is received via said antenna, said communication device turns off its power; a screen layout changing function, wherein a 1st screen and a 2nd screen are displayed on said display, said 1st visual data is displayed on said 1st screen, said 2nd visual data is displayed on said 2nd screen, and said 1st screen and said 2nd screen are displayed on said display in accordance with a screen layout data, wherein said screen layout data indicates that said 2nd screen is displayed in said 1st screen, said 1st screen and said 2nd screen are displayed horizontally, or said 1st screen and said 2nd screen are displayed vertically, or said 1st screen is displayed in said 2nd screen; a face feature log-on function, wherein a face feature is retrieved, and if said face feature is authenticated, said communication device is granted to be utilized, wherein said face feature indicates the feature or characteristics of the user's face; a face feature screen saver deactivating function, wherein a face feature is retrieved, and if said face feature is authenticated, a screen saver displayed on said display is deactivated and said communication device is granted to be utilized, wherein said face feature indicates the feature or characteristics of the user's face; a face feature folder accessing function, wherein a face feature is retrieved, and if said face feature is authenticated, the user is granted to access a specific folder, wherein said specific folder is a directory capable to store one or more files and subfolders and said face feature indicates the feature or characteristics of the user's face; a face feature file accessing function, wherein a face feature is retrieved, and if said face feature is authenticated, the user is granted to access a specific file, wherein said face feature indicates the feature or characteristics of the user's face; a face feature internet accessing function, wherein a face feature is retrieved, and if said face feature is authenticated, the user is granted to access the internet, wherein said face feature indicates the feature or characteristics of the user's face; a face feature PC log-on function, wherein a face feature is retrieved, and if said face feature is authenticated, the user of said communication device is granted to utilize a personal computing system, wherein said face feature indicates the feature or characteristics of the user's face; a face feature PC screen saver deactivating function, wherein a face feature is retrieved, and if said face feature is authenticated, a screen saver displayed on a personal computing system is deactivated, wherein said face feature indicates the feature or characteristics of the user's face; a face feature PC folder accessing function, wherein a face feature is retrieved, and if said face feature is authenticated, the user is granted to access a specific folder of a personal computing system, wherein said specific folder is a directory capable to store one or more files and subfolders and said face feature indicates the feature or characteristics of the user's face; a face feature PC file accessing function, wherein a face feature is retrieved, and if said face feature is authenticated, the user is granted to access a specific file of a personal computing system, wherein said face feature indicates the feature or characteristics of the user's face; a face feature PC internet accessing function, wherein a face feature is retrieved, and if said face feature is authenticated, the user is granted to access the Internet by utilizing a personal computing system, wherein said face feature indicates the feature or characteristics of the user's face; a face feature removal media accessing function, wherein a face feature is retrieved, and if said face feature is authenticated, the user is granted to access a removal media connected to said communication device, wherein said face feature indicates the feature or characteristics of the user's face; a face feature PC removal media accessing function, wherein a face feature is retrieved, and if said face feature is authenticated, the user is granted to access a removal media connected to a personal computing system, wherein said face feature indicates the feature or characteristics of the user's face; a security formatted removal media function, wherein a removal media is connected to said communication device, the data stored in said communication device is granted to be transferred to a removal media if said removal media is formatted in a predetermined fashion; a lite security formatted removal media function, wherein a removal media is connected to said communication device, the type of format of said removal media is identified in a simple manner, if said removal media is formatted in a predetermined fashion, the data stored in said communication device is granted to be transferred to said removal media; a security formatted folder function, wherein a certain folder stored in said communication device is formatted in a predetermined fashion, the file stored in a certain folder is not granted to be transferred to any destination, a file transfer denying message is displayed on said display when the file stored in said certain folder is attempted to be transferred, the file stored in said certain folder is displayed with a specific color; a host host security formatted folder function, wherein a certain folder stored in a host computing system is formatted in a predetermined fashion, the file stored in said certain folder is not granted to be transferred to any destination, a file transfer denying message is displayed on said display when the file stored in said certain folder is attempted to be transferred, and the file stored in said certain folder is displayed with a specific color; an email security formatted folder function, wherein a certain folder stored in said communication device is formatted in a predetermined fashion, the file stored in a certain folder is not granted to be transferred via email to any destination, a file email transfer denying message is displayed on said display when the file stored in said certain folder is attempted to be transferred via email, and the file stored in said certain folder is displayed with a specific color; a host email security formatted folder function, wherein a certain folder stored in host computing system is formatted in a predetermined fashion, the file stored in said certain folder is not granted to be transferred via email to any destination, a file email transfer denying message is displayed on said display when the file stored in said certain folder is attempted to be transferred via email, the file stored in said certain folder is displayed with a specific color; a secured email sending function, wherein an email is not granted to be sent if said email does not include a digital signature; a secured email receiving function, wherein when said communication device receives an email, said communication device identifies whether a digital signature is included therein, if said digital signature is included in said email, said email is stored in said communication device, if said digital signature is not included in said email, said email is not stored in said communication device; a received email security auto sorting function, wherein when a new email is received, said new email is stored in a 1st data storage area if said new email includes a digital signature, and said new email is stored in a 2nd data storage area if said new email does not include said digital signature; a secured email opening function, wherein when an email is attempted to be opened, said email is not opened if a digital signature data is not included therein; a secured email attached file opening function, wherein when an attached file of an email is attempted to be opened, said attached file is not opened if a digital signature data is not included in said email; a secured email attached file deleting function, wherein when a new email is received, an attached file of said new email is stored if said new email includes a digital signature, said attached file of said new email is not stored if said new email does not include said digital signature; an unsafe email host handled function, wherein if an email addressed to said communication device includes a sender's digital signature, said email is capable to be opened by said communication device, and if said email addressed to said communication device does not include said sender's digital signature, said email is capable to be opened by a host computing system; an unsafe attached file host handled function, wherein if an email addressed to said communication device includes a sender's digital signature, an attached file attached to said email is capable to be opened by said communication device, and if said email addressed to said communication device does not include said sender's digital signature, said attached file attached to the email is capable to be opened by a host computing system; a com stored email viewing function, wherein if an email stored in said communication device includes a sender's digital signature, said email is capable to be opened by said communication device, and if said email stored in said communication device does not include said sender's digital signature, said email is opened by a host computing system and the visual data of said email is displayed on said communication device; a non-secured email forwarding function, wherein if an email addressed to said communication device includes a sender's digital signature, said email is stored in said communication device, and if said email addressed to said communication device does not include said sender's digital signature, said email is forwarded to a predetermined email address; an electronic money transferring function, wherein an electronic money is transferred to another device in a wireless fashion, a total electronic money data which indicates the balance remaining in said communication device and a transferring electronic money data which indicates the amount transferred to said another device are displayed on said display, a message data is capable to be transferred with said electronic money to another device in a wireless fashion, and a response message is received from said another device; an electronic money time identified transferring function, wherein an electronic money is transferred to another device in the wireless fashion at a predetermined time, wherein a total electronic money data which indicates the balance remaining in said communication device and a transferring electronic money data which indicates the amount transferred to said another device are displayed on said display, a message data is capable to be transferred with said electronic money to another device in a wireless fashion, and a response message is received from said another device; an electronic money repeatedly transferring function, wherein an electronic money is transferred to another device in the wireless fashion repeatedly with a predetermined interval, wherein a total electronic money data which indicates the balance remaining in said communication device and a transferring electronic money data which indicates the amount transferred to said another device are displayed on said display, a message data is capable to be transferred with said electronic money to another device in a wireless fashion, and a response message is received from said another device; an electronic money transfer canceling function, wherein an electronic money is transferred to another device in a wireless fashion, and said electronic money is canceled after being transferred to said another device; an electronic money email transferring function, wherein an electronic money is transferred to another device via email in a wireless fashion; an electronic money email time identified transferring function, wherein an electronic money is transferred to another device via email in a wireless fashion at a predetermined time, wherein a total electronic money data which indicates the balance remaining in said communication device and a transferring electronic money data which indicates the amount transferred to said another device are displayed on said display; an electronic money email repeatedly transferring function, wherein an electronic money is transferred to another device via email in a wireless fashion repeatedly with a predetermined interval, wherein a total electronic money data which indicates the balance remaining in said communication device and a transferring electronic money data which indicates the amount transferred to said another device are displayed on said display; an electronic money email transfer canceling function, wherein an electronic money is transferred to another device via email in a wireless fashion, and said electronic money is capable to be canceled via email after being transferred to said another device; an address book administrating function, wherein a 1st address book and a 2nd address book are stored in said communication device, said 1st address book and said 2nd address book are capable to be permanently erased from said communication device, an address book erased message data is output from said communication device, said 1st address book and/or said 2nd address book are capable to be permanently erased from said communication device under the control of another device or a host computing system; a file synchronizing function, wherein a duplicate of a folder stored in said communication device is produced and stored in host computing system and/or another device including the file data stored in said folder, wherein said folder and said file are recovered from said host computing system and/or said another device; a file synchronizing function, wherein a folder stored in said communication device is identified, and said folder and one or more of file data included in said folder are duplicated in a host computing system and/or another device, wherein said folder and said file are recovered from said host computing system and/or said another device; an area dependent software activating function, wherein when said communication device is in a specific area, a specific software program is executed and a message indicating that said specific software program is executed is output from said communication device; an area dependent message displaying function, wherein when said communication device is in a specific area, a specific message indicating that said communication device is in said certain area is output from said communication device; a visible light schedule communicating function, wherein said communication device includes a visible light communicating device, a schedule data is sent and/or received in the form of visible light via said visible light communicating device; a visible light web address communicating function, wherein said communication device includes a visible light communicating device, a web address data is sent and/or received in the form of visible light via said visible light communicating device; a visible light software program communicating function, wherein said communication device includes a visible light communicating device, a software program data is sent and/or received in the form of visible light via the visible light communicating device; a visible light restaurant menu communicating function, wherein said communication device includes a visible light communicating device, a restaurant menu data is sent and/or received in the form of visible light via said visible light communicating device; a visible light TV listing communicating function, wherein said communication device includes a visible light communicating device, a TV listing data is sent and/or received in the form of visible light via said visible light communicating device; a visible light movie listing communicating function, wherein said communication device includes a visible light communicating device, a movie listing data is sent and/or received in the form of visible light via said visible light communicating device; a visible light product advertisement communicating function, wherein said communication device includes a visible light communicating device, a product advertisement data is sent and/or received in the form of visible light via said visible light communicating device; a visible light message communicating function, wherein said communication device includes a visible light communicating device, a message data is sent and/or received in the form of visible light via said visible light communicating device; a visible light visual clip communicating function, wherein said communication device includes a visible light communicating device, a visual clip data is sent and/or received in the form of visible light via said visible light communicating device; a visible light weather forecast communicating function, wherein said communication device includes a visible light communicating device, a weather forecast data is sent and/or received in the form of visible light via said visible light communicating device; a visible light news clip communicating function, wherein said communication device includes a visible light communicating device, a news clip data is sent and/or received in the form of visible light via said visible light communicating device; a visible light map clip communicating function, wherein said communication device includes a visible light communicating device, a map clip data is sent and/or received in the form of visible light via said visible light communicating device; a file thumbnail preview function, wherein a list of files is displayed on said display, when a file is selected from said list, a thumbnail of one or more pages of the selected file is displayed on said display without opening said file; a taxi fare credit card payment function, wherein a credit card data is sent from said communication device in a wireless fashion to pay taxi fare and a receipt sent to said communication device in a wireless fashion is displayed on said display; a taxi fare electronic money payment function, wherein an electronic money data is sent from said communication device in a wireless fashion to pay taxi fare and a receipt sent to said communication device in a wireless fashion is displayed on said display; a taxi destination identifying function, wherein a list of destination data is displayed on said display, a destination data selected from said list is transferred to another device installed in a taxi in order for said taxi to proceed to the location indicated by said destination data; a taxi destination map displaying function, wherein a destination data is provided from said communication device to a taxi, a map indicating the destination indicated by said destination data, an origin, and the current location of said taxi are displayed on said display; a QR code schedule communicating function, wherein when a QR code is perceived via said camera, a schedule data corresponding to said QR code is displayed on said display, wherein said data may be stored in said communication device, a host computing system, or another device; a QR code web address communicating function, wherein when a QR code is perceived via said camera, a web address data corresponding to said QR code is displayed on said display, wherein said data may be stored in said communication device, a host computing system, or another device; a QR code software program communicating function, wherein when a QR code is perceived via said camera, a software program data corresponding to said QR code is displayed on said display, wherein said data may be stored in said communication device, a host computing system, or another device; a QR code restaurant menu communicating function, wherein when a QR code is perceived via said camera, a restaurant menu data corresponding to said QR code is displayed on said display, wherein said data may be stored in said communication device, a host computing system, or another device; a QR code TV listing communicating function, wherein when a QR code is perceived via said camera, a TV listing data corresponding to said QR code is displayed on said display, wherein said data may be stored in said communication device, a host computing system, or another device; a QR code movie listing communicating function, wherein when a QR code is perceived via said camera, a movie listing data corresponding to said QR code is displayed on said display, wherein said data may be stored in said communication device, a host computing system, or another device; a QR code product advertisement communicating function, wherein when a QR code is perceived via said camera, a product advertisement data corresponding to said QR code is displayed on said display, wherein said data may be stored in said communication device, a host computing system, or another device; a QR code message communicating function, wherein when a QR code is perceived via said camera, a message data corresponding to said QR code is displayed on said display, wherein said data may be stored in said communication device, a host computing system, or another device; a QR code visual clip communicating function, wherein when a QR code is perceived via said camera, a visual clip data corresponding to said QR code is displayed on said display, wherein said data may be stored in said communication device, a host computing system, or another device; a QR code weather forecast communicating function, wherein when a QR code is perceived via said camera, a weather forecast data corresponding to said QR code is displayed on said display, wherein said data may be stored in said communication device, a host computing system, or another device; a QR code news clip communicating function, wherein when a QR code is perceived via said camera, a news clip data corresponding to said QR code is displayed on said display, wherein said data may be stored in said communication device, a host computing system, or another device; a QR code map clip communicating function, wherein when a QR code is perceived via said camera, a map clip data corresponding to said QR code is displayed on said display, wherein said data may be stored in said communication device, a host computing system, or another device; a QR code software activating function, wherein when a QR code is perceived via said camera, a software program data corresponding to said QR code is executed, wherein said data may be stored in said communication device, a host computing system, or another device; a RFID schedule communicating function, wherein said communication device further comprises a RFID communicator, said RFID communicator sends and receives RFID signals, when a RFID signal corresponding to a schedule data is received via said RFID communicator, said schedule data is displayed on said display, wherein said data may be stored in said communication device, a host computing system, or another device; a RFID web address communicating function, wherein said communication device further comprises a RFID communicator, said RFID communicator sends and receives RFID signals, when a RFID signal corresponding to a web address data is received via said RFID communicator, said web address data is displayed on said display, wherein said data may be stored in said communication device, a host computing system, or another device; a RFID software program communicating function, wherein said communication device further comprises a RFID communicator, said RFID communicator sends and receives RFID signals, when a RFID signal corresponding to a software program data is received via said RFID communicator, said software program data is displayed on said display, wherein said data may be stored in said communication device, a host computing system, or another device; a RFID restaurant menu communicating function, wherein said communication device further comprises a RFID communicator, said RFID communicator sends and receives RFID signals, when a RFID signal corresponding to a restaurant menu data is received via said RFID communicator, said restaurant menu data is displayed on said display, wherein said data may be stored in said communication device, a host computing system, or another device; a RFID TV listing communicating function, wherein said communication device further comprises a RFID communicator, said RFID communicator sends and receives RFID signals, when a RFID signal corresponding to a TV listing data is received via said RFID communicator, said TV listing data is displayed on said display, wherein said data may be stored in said communication device, a host computing system, or another device; a RFID movie listing communicating function, wherein said communication device further comprises a RFID communicator, said RFID communicator sends and receives RFID signals, when a RFID signal corresponding to a movie listing data is received via said RFID communicator, said movie listing data is displayed on said display, wherein said data may be stored in said communication device, a host computing system, or another device; a RFID product advertisement communicating function, wherein said communication device further comprises a RFID communicator, said RFID communicator sends and receives RFID signals, when a RFID signal corresponding to a product advertisement data is received via said RFID communicator, said product advertisement data is displayed on said display, wherein said data may be stored in said communication device, a host computing system, or another device; a RFID message communicating function, wherein said communication device further comprises a RFID communicator, said RFID communicator sends and receives RFID signals, when a RFID signal corresponding to a message data is received via said RFID communicator, said message data is displayed on said display, wherein said data may be stored in said communication device, a host computing system, or another device; a RFID visual clip communicating function, wherein said communication device further comprises a RFID communicator, said RFID communicator sends and receives RFID signals, when a RFID signal corresponding to a visual clip data is received via said RFID communicator, said visual clip data is displayed on said display, wherein said data may be stored in said communication device, a host computing system, or another device; a RFID weather forecast communicating function, wherein said communication device further comprises a RFID communicator, said RFID communicator sends and receives RFID signals, when a RFID signal corresponding to a weather forecast data is received via said RFID communicator, said weather forecast data is displayed on said display, wherein said data may be stored in said communication device, a host computing system, or another device; a RFID news clip communicating function, wherein said communication device further comprises a RFID communicator, said RFID communicator sends and receives RFID signals, when a RFID signal corresponding to a news clip data is received via said RFID communicator, said news clip data is displayed on said display, wherein said data may be stored in said communication device, a host computing system, or another device; a RFID map clip communicating function, wherein said communication device further comprises a RFID communicator, said RFID communicator sends and receives RFID signals, when a RFID signal corresponding to a map clip data is received via said RFID communicator, said map clip data is displayed on said display, wherein said data may be stored in said communication device, a host computing system, or another device; a RFID software activating function, wherein said communication device further comprises a RFID communicator, said RFID communicator sends and receives RFID signals, when a RFID signal corresponding to a software data is received via said RFID communicator, said software data corresponding to the RFID signal is executed, wherein said data may be stored in said communication device, a host computing system, or another device; a RFID software auto activating function, wherein said communication device further comprises a RFID communicator, said RFID communicator sends and receives RFID signals, when a RFID signal corresponding to a software data is received via said RFID communicator, said software data corresponding to said RFID signal is automatically executed, wherein said data may be stored in said communication device, a host computing system, or another device; a carrier arrival time displaying function, wherein an estimated arrival time of a carrier at a carrier station, the current location of said carrier, a carrier station distance data, an estimated arrival remaining time data are displayed on said display; a multiple audio outputting function, wherein a foreground audio data and a background audio data are replayed simultaneously, wherein said foreground audio data and said background audio data are capable to be selected by the user of said communication device, wherein said background audio data is an audio data of a low frequency; a closest device notifying function, wherein the device closest to said communication device is notified and a map is displayed on said display, and the current location of said communication device and the closest device thereto are indicated on said map; a print screen function, wherein the image of the entire screen displayed on said display of said communication device is printed out by said communication device, the image of a window displayed on said display of said communication device is printed out by another device, the image of the entire screen displayed on said display of said communication device is printed out by said another device, the image of a window displayed on said display of said communication device, which is selected by the user of said another device, is printed out by said another device; a caller answering machine activating function, wherein when said communication device makes a phone call to another device and said another device does not answer the phone call, a message is recorded by said communication device, and the message is sent from said communication device to said another device for the message to be replayed by said another device, wherein a pre-recorded caller's message data is sent with said message from said communication device to said another device; an audiovisual answering machine function, wherein when said communication device does not answer the phone call received from another device, a 1st audiovisual message is retrieved from said communication device and output from said another device and a 2nd audiovisual message is retrieved from said another device and output from said communication device, wherein said 1st audiovisual message is retrieved from a host computing system and sent to said another device; an answering machine message forwarding function, wherein when said communication device does not answer the phone call received from another device, a left message which indicates the message left by said another device is forwarded to a different device, wherein said left message is replayed by said different device, wherein a message left notice which indicates that a phone call was received and/or the caller left a message is indicated; an area map displaying function, wherein an area map which is the map of a specific geographic area indicating the surrounding area of the location said communication device is currently located is displayed on said display, and one or more items are displayed in said area map, wherein each of said one or more items indicates an artificial structure or premises located in said specific geographic area and an item relating data corresponding to each of one or more items is displayed on said area map; a road map displaying function, wherein a road map which is the map of a specific geographic area indicating the surrounding area of the location said communication device is currently located is displayed on said display, and one or more items are displayed in said road map, wherein each of said one or more items indicates an artificial structure or premises located in said specific geographic area, each of one or more items indicates a traffic light, pedestrian street, or traffic sign, and an item relating data corresponding to each of one or more items is displayed on said road map; an email reading function, wherein an animated character is displayed on said display, and said animated character reads out an email, wherein said animated character is a three dimensional image; a stand alone email function, wherein said communication device sends an email and an animated character to another device, in order for said animated character be displayed on said another device to read out said email, wherein said animated character is a three dimensional image, wherein said another device is capable to change said animated character to another character and the type of voice by which said email is read out; a TV seamless viewing function, wherein a TV program output from a TV tuner is automatically output from said communication device without manually identifying the channel number thereof; a multiple movable tab web browsing function, wherein when a plurality of website content data are retrieved from the Internet, a plurality of tabs are displayed on said display, each tab corresponds to each website content data, each tab is movable, when one of said tabs is selected, the website content data corresponding thereto is displayed on a browser, wherein said plurality of tabs are displayed in a tab display area, wherein said tab display area is displayed in said browser, said website content data corresponding to the selected tab is displayed in said website content data displaying area displayed in said browser; a multiple movable tab visual data viewing function, wherein when a plurality of visual data are retrieved, a plurality of tabs are displayed on said display, each tab corresponds to each visual data, each tab is movable, when one of said tabs is selected, the visual data corresponding thereto is displayed on a viewer, wherein said plurality of tabs are displayed in said tab display area, wherein said tab display area is displayed in said viewer and the visual data corresponding to the selected tab is displayed in said visual data displaying area displayed in said viewer; a multiple movable tab document data viewing function, wherein when a plurality of document data are retrieved, a plurality of tabs are displayed on said display, each tab corresponds to each document data, each tab is movable, when one of said tabs is selected, the document data corresponding thereto is displayed on a viewer, wherein said plurality of tabs are displayed in a tab display area, wherein said tab display area is displayed in said viewer, wherein the document data corresponding to the selected tab is displayed in said document data displaying area displayed in said viewer; a multiple movable tab email data viewing function, wherein when a plurality of email data are retrieved, a plurality of tabs are displayed on said display, each tab corresponds to each email data, each tab is movable, when one of said tabs is selected, the email data corresponding thereto is displayed on a viewer, wherein said plurality of tabs are displayed in a tab display area, wherein said tab display area is displayed in said viewer, wherein the email data corresponding to the selected tab is displayed in said email data displaying area displayed in said viewer; a lost com device memory erasing/rescuing function, wherein the data and/or software programs stored in another device are erased or transferred to said communication device by the command of said communication device, and the current location of said another device and/or a location history thereof are indicated on the map displayed on said display of said communication device; a lost com device beaconing function, wherein the location of a lost device is indicated on said display and said lost device emits a lost device beacon, wherein said lost device beacon indicates that said lost device is lost, and when a different device receives said lost device beacon from said lost device, said different device notifies said communication device the location of said lost device, and the locations of said communication device, said lost device, and said different device are displayed on said communication device, wherein said lost device emits said lost device beacon when receiving an instruction from said communication device or said lost device automatically emits said lost device beacon when the input device thereof is idle for a certain period of time; an area&country name displaying function, wherein a country name data and a state name data which indicates the name of the country and the name of the state in which said communication device is located is displayed on said communication device and/or another device; a 3D desktop function, wherein a 1st 3D desktop is produced, said 1st 3D desktop is the computer generated three-dimensional space, a plurality of 1st 3D icons are located in said 1st 3D desktop, a 3D mouse pointer is located in said 1st 3D desktop, when one of said plurality of 1st 3D icons is selected by said 3D mouse pointer, a software program corresponding thereto is executed, a 2nd 3D desktop is produced, said 2nd 3D desktop is the computer generated three-dimensional space, a plurality of 2nd 3D icons are located in said 2nd 3D desktop, said 3D mouse pointer is located in said 2nd 3D desktop, when one of said plurality of 2nd 3D icons is selected by said 3D mouse pointer, a software program corresponding thereto is executed, wherein each 1st 3D icon is movable in said 1st 3D desktop and each 2nd 3D icon is movable in said 2nd 3D desktop; a carrier auto announcing function, wherein a carrier comprises said communication device, when said carrier arrives at a predetermined location, an announcing data corresponding to said predetermined location is output from said communication device and/or another device located in said carrier; a virtual folder displaying function, wherein an actual folder and a virtual folder are displayed on said display, an actual data are stored in said actual folder, a virtual data of said actual data are stored in said virtual folder, wherein said virtual data is an imaginary data of the corresponding actual data, when a command to execute said virtual data stored in said virtual folder is input, the corresponding actual data stored in said actual folder is executed, when a command to execute said virtual data stored in said virtual folder is input, the corresponding actual data stored in said actual folder is executed, and a message indicating thereof is output from said communication device, when a command to delete said virtual data stored in said virtual folder is input, the corresponding actual data is deleted from said actual folder, when a command to delete said virtual data stored in said virtual folder is input, the corresponding actual data is deleted from said actual folder, and a message indicating thereof is output from said communication device; an in-carrier location notifying function, wherein the current location of a carrier and the current location of said communication device in said carrier are displayed on another device; an address map auto displaying function, wherein when an address searching data is received from another device, a map indicating the location corresponding to said address searching data is displayed on said display, wherein said address searching data is the searching address street data which indicates a street address, a phone number, an email address, or a geographic location, and the current locations of said communication device and said another device are indicated on said display; a brain wave device controlling function, wherein said communication device comprises a brain wave retrieving device, and said communication device is controlled by the brain wave retrieved by said brain wave retrieving device; a brain wave sentence composing function, wherein said communication device comprises a brain wave retrieving device, the brain wave of the user of said communication device is retrieved via said brain wave retrieving device, and the alphanumeric data corresponding to said brain wave is displayed on said display; a wheel standing function, wherein said communication device is installed in a body, said body is located on a wheel unit, when said body tilts to a certain direction, said wheel unit rotates to a certain direction in order for said body to balance; a robot body balancing function, wherein said communication device is installed in a robot, when said robot tilts to a certain direction, said robot rotates its body to the direction opposite to said certain direction to balance itself; a robot leg balancing function, wherein said communication device is installed in a robot, when said robot tilts to a certain direction, said robot rotates its leg unit(s) to the direction opposite to said certain direction to balance itself; a robot head balancing function, wherein said communication device is installed in a robot, when said robot tilts to a certain direction, said robot rotates its head to the direction opposite to said certain direction to balance itself; a robot upper body balancing function, wherein said communication device is installed in a robot, when said robot tilts to a certain direction, said robot rotates its upper body to the direction opposite to said certain direction to balance itself; a digital television function, wherein when a TV program is output from said communication device, a TV related data relating to said TV program is displayed on said display, and the content of said TV related data depends on the type of service subscribed by the user of said communication device; a total price calculating function, wherein a 1st price of a 1st product purchased by the user of said communication device, a 2nd price of a 2nd product purchased by the user of said communication device, and a total price of said 1st price and said 2nd price which are received from a store in a wireless fashion and displayed on said display, a product description data which indicates the data relating to each of said 1st product and said 2nd product and a store related data which indicates the data relating to said store, and the date and time at which said 1st product and said 2nd product are purchased are displayed on said display; a brain wave carrier controlling function, wherein said communication device comprises a brain wave retrieving device, said communication device is installed in a carrier, and said carrier is capable to be controlled by said brain wave retrieved by said brain wave retrieving device; an electronic billboard controlling function, wherein a message selected or composed by another device is transferred to said communication device in order to display said message on said display of said communication device, wherein the font type, the font size and/or the font color of said message are capable to be selected; a common phone number function, wherein when a first shared phone number and a second shared phone number are assigned to a first device and a second device respectively, when a phone call is made to said first shared phone number, a first ringtone is output from said first device and said second device respectively, and when a phone call is made to said second shared phone number, a second ringtone is output from said first device and said second device respectively, and when a phone call is made to a first individual phone number, a ringtone is output from said first device, and when a phone call is made to a second individual phone number, a ringtone is output from said second device; a hybrid common phone number function, wherein when a phone call is made to a shared phone number, a ringtone is output from a first device and a second device respectively, wherein said first device is a mobile phone and said second device is a fixed phone, a first shared phone number and a second shared phone number are assigned to said first device and said second device respectively, when a phone call is made to said first shared phone number, a first ringtone is output from said first device and said second device respectively, and when a phone call is made to said second shared phone number, a second ringtone is output from said first device and said second device respectively, when a phone call is made to a first individual phone number, a ringtone is output from said first device, and when a phone call is made to a second individual phone number, a ringtone is output from said second device; a ringtone volume auto adjusting function, wherein when said communication device receives a phone call, the sound volume of ringtone output from said communication device is varied in accordance with the level of surrounding noise; a ringtone type auto selecting function, wherein when said communication device receives a phone call, the type of ringtone output from said communication device is automatically selected in accordance with the level of surrounding noise; a television chatting function, wherein a television program data display area and a chat data display area are displayed on said display, said television program data is displayed in said television program data display area, a user's chat data which is the alphanumeric data input by the user of said communication device and a second person's chat data which is the alphanumeric data input to a second device by a second person are displayed in said chat data display area; a device battery charging function, wherein said communication device retrieves electricity from the battery of said communication device and converts said electricity to magnetic energy and transfers said magnetic energy to another device in a wireless fashion, wherein said another device receives said magnetic energy from said communication device and converts said magnetic energy to electricity and stores said electricity in the battery of said another device, and a 1st remaining battery notice data indicating the remaining battery level of said communication device is output from both said communication device and said another device and a 2nd remaining battery notice data indicating the remaining battery level of said another device is output from both said communication device and said another device; a hybrid battery solar operating function, wherein said communication device comprises a solar panel, a first battery, and a second battery, said first battery is charged by said solar panel, if said battery level of said first battery is below a certain level, said second battery is utilized to provide electricity to said communication device, the current battery level of said first battery and said second battery are displayed on said display of said communication device, the battery currently utilized is notified on said display of said communication device, the current battery level of said first battery and said second battery of said another device are displayed on said display of said communication device, the battery currently utilized by another device is notified on said display of said communication device; a backup solar battery operating function, wherein said communication device further comprises a solar panel, a first battery, and a second battery, said second battery is charged by said solar panel, if the battery level of said first battery is below a certain level, said second battery is utilized to provide electricity to said communication device, the current battery level of said first battery and said second battery are displayed on said display, the battery currently utilized is notified on said display, the current battery level of the first battery and the second battery of another device are displayed on said display, and the battery currently utilized by another device is notified on said display of said communication device; a hybrid access point function, wherein when said communication device sends a location identifying data which is the data utilized to identify the current geographic location of said communication device, a low frequency wireless signal is utilized, when said communication device sends a non-location identifying data which is the data utilized other than to identify the current geographic location of said communication device, a high frequency wireless signal is utilized, wherein said low frequency wireless signal is the wireless signal of which the frequency is lower than said high frequency wireless signal; a earphone location identifying function, wherein a 1st current location which indicates the current geographic location of a left cordless earphone of said communication device and a 2nd current location which indicates the current geographic location of a right cordless earphone of said communication device are displayed on said display, a 1st location notifying sound data is output from said left cordless earphone of said communication device, a 2nd location notifying sound data is output from said right cordless earphone of said communication device, the current location of said communication device is identified by said left cordless earphone and said right cordless earphone, said 1st current location is identified by said right cordless earphone, and said 2nd current location is identified by said left cordless earphone; a microphone location identifying function, wherein a 1st current location which indicates the current geographic location of a left cordless microphone of said communication device and a 2nd current location which indicates the current geographic location of a right cordless microphone of said communication device are displayed on said display, a 1st location notifying sound data is output from said left cordless microphone of said communication device, a 2nd location notifying sound data is output from said right cordless microphone of said communication device, the current location of said communication device is identified by said left cordless microphone and said right cordless microphone, said 1st current location is identified by said right cordless microphone, and said 2nd current location is identified by said left cordless microphone; an event triggered auto audiovisual recording function, wherein when an audiovisual data received from another device is output from said speaker and said display and a predetermined event occurs, said audiovisual data is ceased to be output and a recording process of said audiovisual data is automatically initiated, when said event triggered auto audiovisual recording mode is implemented, wherein said predetermined event is the reception of an email or a phone call, or the activation of a predetermined software program, a start time and an end time of said recording process is displayed on said display, and a geographic location of said communication device at which said recording process is implemented is displayed on said display; an event triggered auto audio recording function, wherein when an audio data received from another device is output from said speaker and said display and a predetermined event occurs, said audio data is ceased to be output and a recording process of said audio data is automatically initiated, when said event triggered auto audio recording mode is implemented, wherein said predetermined event is the reception of an email or a phone call, or the activation of a predetermined software program, a start time and an end time of said recording process is displayed on said display, and a geographic location of said communication device at which said recording process is implemented is displayed on said display; an audiovisual message bulk transferring function, wherein said communication device further comprises a camera, an audiovisual message data is produced by utilizing said microphone and said camera, and said audiovisual message data is transferred to a plurality of devices simultaneously, and when one of said plurality of devices replay said audiovisual message data, a replaying notice indicating that said audiovisual message data is replayed is output from said communication device; a multiple party conversing function, wherein when said communication device implements voice communication with a first device and a second device simultaneously in a wireless fashion, a personal data of each user is displayed on said display, said personal data indicates the name, the street address, the email address, the phone number of the corresponding user, and the current location of each user is displayed on said display, the voice data of each user is converted to text data and displayed on said display, and a conversing notice data is displayed when the corresponding user is conversing; a window monitoring function, wherein said communication device monitors the status of a window of an artificial structure, and if said window is broken, a window broken message is output from said communication device and another device; a window status monitoring function, wherein said communication device monitors the status of a window of an artificial structure, and if said window is opened, a window opened message is output from said communication device and another device; a door monitoring function, wherein said communication device monitors the status of a door of an artificial structure, and if the door is broken, a door broken message is output from said communication device and another device; a door monitoring function, wherein said communication device monitors the status of a door of an artificial structure, and if the door is opened, the door opened message is output from said communication device and another device; a push-to-talk function, wherein when another device is transferring audio data to said communication device, said communication device is not capable to transfer audio data to said another device, said communication device is further not capable to transfer audio data to a different device while another device is transferring audio data to said communication device, while another device is transferring audio data to said communication device and said communication device attempts to transfer audio data, a denying message is displayed on said display, a conversing notice data which indicates the device currently transferring audio data is displayed on said display, the message indicating that the device capable to transfer audio data is displayed on said display, the audio data of each device is converted to text data and displayed on said display, the current location of each device is displayed on said display, and the personal data of each user is displayed on said display; a door open monitoring function, wherein said communication device is connected to a door sensor, if a door is identified not to be opened for a certain period of time by utilizing said door sensor, a door not opened message indicating that said door is identified not to be opened for a certain period of time is output from said communication device and sent to another device in a wireless fashion, and if said door is identified to be opened by utilizing said door sensor, a door opened message indicating that said door is opened is output from said communication device and sent to another device in a wireless fashion; a window open monitoring function, wherein said communication device is connected to a window sensor, if a window is identified not to be opened for a certain period of time by utilizing said window sensor, a window not opened message indicating that said window is identified not to be opened for a certain period of time is output from said communication device and sent to another device in a wireless fashion, and if said window is identified to be opened by utilizing said window sensor, a window opened message indicating that said window is opened is output from said communication device and sent to another device in a wireless fashion; a lock open monitoring function, wherein said communication device is connected to a lock sensor, if a lock is identified not to be opened for a certain period of time by utilizing said lock sensor, a lock not opened message indicating that said lock is identified not to be opened for a certain period of time is output from said communication device and sent to another device in a wireless fashion, and if said lock is identified to be opened by utilizing said lock sensor, a lock opened message indicating that said lock is opened is output from said communication device and sent to another device in a wireless fashion; a destination proceeding function, wherein said communication device is included in a destination proceeding device, said destination proceeding device proceeds to the destination identified by said communication device, said destination is identified by another device, and a message is output from said communication device and said another device when said destination proceeding device arrives at said destination; a driver's eye monitoring safety function, wherein when the eyes of the user of said communication device blinks or closed for a predetermined times or more during a predetermined period of time, a wake up message and/or an audiovisual data selected by the user of said communication device is output from said communication device; a driver's head monitoring safety function, wherein when the head of the user of said communication device nods or tilted for a predetermined times or more during a predetermined period of time, a wake up message and/or an audiovisual data selected by the user of said communication device is output from said communication device; a drawer open monitoring function, wherein said communication device is connected to a drawer sensor, if a drawer is identified not to be opened for a certain period of time by utilizing said drawer sensor, a drawer not opened message indicating that said drawer is identified not to be opened for a certain period of time is output from said communication device and sent to another device in a wireless fashion, and if said drawer is identified to be opened by utilizing said drawer sensor, a drawer opened message indicating that said drawer is opened is output from said communication device and sent to another device in a wireless fashion; a curtain open monitoring function, wherein said communication device is connected to a curtain sensor, if a curtain is identified not to be opened for a certain period of time by utilizing said curtain sensor, a curtain not opened message indicating that said curtain is identified not to be opened for a certain period of time is output from said communication device and sent to another device in a wireless fashion, and if said curtain is identified to be opened by utilizing said curtain sensor, a curtain opened message indicating that said curtain is opened is output from said communication device and sent to another device in a wireless fashion; a gate open monitoring function, wherein said communication device is connected to a gate sensor, if a gate is identified not to be opened for a certain period of time by utilizing said gate sensor, a gate not opened message indicating that said gate is identified not to be opened for a certain period of time is output from said communication device and sent to another device in a wireless fashion, and if said gate is identified to be opened by utilizing said gate sensor, a gate opened message indicating that said gate is opened is output from said communication device and sent to another device in a wireless fashion; a faucet open monitoring function, wherein said communication device is connected to a faucet sensor, if a faucet is identified not to be opened for a certain period of time by utilizing said faucet sensor, a faucet not opened message indicating that said faucet is identified not to be opened for a certain period of time is output from said communication device and sent to another device in a wireless fashion, and if said faucet is identified to be opened by utilizing said faucet sensor, a faucet opened message indicating that said faucet is opened is output from said communication device and sent to another device in a wireless fashion; a hybrid refrigerator function, wherein said communication device is included in a refrigerator, said refrigerator implements a freezing process, a refrigerating process, and a 1st heating process by heat, a 2nd heating process by microwave, the process selected is displayed on said communication device and/or another device, said refrigerator is controlled by said another device, and the current temperature is displayed on said communication device and/or another device; a multiple purpose chamber function, wherein said communication device is included in a refrigerator, said refrigerator includes a multiple purpose chamber, said refrigerator implements a freezing mode, a refrigerating mode, a heating mode, and a microwave mode under the control of said communication device, said modes are implemented in the order determined by said communication device, the period of time for which each mode is determined by said communication device, and the temperature at which each mode is determined by said communication device, or said modes are implemented in the order determined by another device, the period of time for which each mode is determined by said another device, and the temperature at which each mode is determined by said another device; an audiovisual quality auto adjusting function, wherein the quality of wireless communication is identified, the audiovisual data of the quality corresponding to the quality of wireless communication is received and output from said speaker and said display, said audiovisual data is received from a host computer or another device via a network, and the quality of said audiovisual data is indicated on said display; an audio quality auto adjusting function, wherein the quality of wireless communication is identified, the audio data of the quality corresponding to the quality of wireless communication is received and output from said speaker and said display, said audio data is received from a host computer or another device via a network, and the quality of said audio data is indicated on said display; a TV phone quality auto adjusting function, wherein an audiovisual data retrieved from said microphone and a camera is transferred to another device in a wireless fashion, and the quality of said audiovisual data is adjusted in accordance with the quality of the wireless signal, and said quality of said audiovisual data is indicated on said display; a voice phone quality auto adjusting function, wherein an audio data retrieved from said microphone is transferred to another device in a wireless fashion, and the quality of said audio data is adjusted in accordance with the quality of the wireless signal, and said quality of said audio data is indicated on said display; a television related audiovisual downloading function, wherein when a TV program is output from said communication device, a related audiovisual data which is an audiovisual data relating to said TV program is downloaded from a host computer or another device, said related audiovisual data is output from said communication device, a downloadable message which is the message indicating that said related audiovisual data is capable to be downloaded is output from said communication device, and a download completed message which is the message indicating that downloading said related audiovisual data is completed is output from said communication device; a radio related audio downloading function, wherein when a radio program is output from said communication device, a related audio data which is an audio data relating to said radio program is downloaded from a host computer or another device, said related audio data is output from said communication device, a downloadable message which is the message indicating that said related audio data is capable to be downloaded is output from said communication device, and a download completed message which is the message indicating that downloading said related audio data is completed is output from said communication device; a header displaying function, wherein when a document is displayed on said display, a header is displayed in said document, a text, a font type, a font size, a font color, a location of said header displayed in said document is identified by said communication device, wherein said document and said text, said font type, said font size, said font color, and said location of said header are transferred to another device, and said another device displays said document with said header in accordance with said text, said font type, said font size, said font color, and said location received, wherein said header is said common text displayed at said upper portion of each page of said document; a footer displaying function, wherein when a document is displayed on said display, said footer is displayed in said document, a text, a font type, a font size, a font color, a location of said footer displayed in said document is identified by said communication device, wherein said document and said text, said font type, said font size, said font color, and said location of said footer are transferred to another device, and said another device displays said document with said footer in accordance with said text, said font type, said font size, said font color, and said location received, wherein said footer is said common text displayed at said upper portion of each page of said document; a location scheduled notifying function, wherein a 1st location which indicates the geographic location of said communication device is displayed on said communication device at the time and date identified by said communication device, and a 2nd location which indicates the geographic location of another device is displayed on said communication device at the time and date identified by said communication device; a zone leaving notifying function, wherein when said communication device leaves from a specific geographic zone identified by said communication device, a notice is output from said communication device and another device; a zone entering notifying function, wherein when said communication device enters a specific geographic zone identified by said communication device, a notice is output from said communication device and another device; a power off notifying function, wherein when said power of said communication device is being turned off, the geographic location of said communication device is notified to another device, a map is displayed on said another device and the geographic location of said communication device is indicated on said map, and a notification indicating that said power of said communication device is being turned off is output from said another device; a power on notifying function, wherein when said power of said communication device is being turned on, the geographic location of said communication device is notified to another device, a map is displayed on said another device and the geographic location of said communication device is indicated on said map, and a notification indicating that said power of said communication device is being turned on is output from said another device; a security alarm on notifying function, wherein when a security alarm of said communication device is activated, the geographic location of said communication device is notified to another device, a map is displayed on said another device and the geographic location of said communication device is indicated on said map, a notification indicating that said security alarm of said communication device is activated is output from said another device, a loud sound is output from said speaker when said security alarm is activated, and said communication device automatically makes an emergency call when said security alarm is activated; a security alarm off notifying function, wherein when a security alarm of said communication device is deactivated, the geographic location of said communication device is notified to another device, a map is displayed on said another device and the geographic location of said communication device is indicated on said map, a notification indicating that said security alarm of said communication device is deactivated is output from said another device, a loud sound is output from said speaker when said security alarm is activated, and said communication device automatically makes an emergency call when said security alarm is activated; an email transfer notifying function, wherein when an email is transferred via said wireless communicating system, the geographic location of said communication device is notified to another device, a map is displayed on said another device and the geographic location of said communication device is indicated on said map, and a notification indicating that email is transferred is output from said another device; an email reception notifying function, wherein when an email is received via said wireless communicating system, the geographic location of said communication device is notified to another device, a map is displayed on said another device and the geographic location of said communication device is indicated on said map, and a notification indicating that email is received is output from said another device; a making phone call notifying function, wherein when a phone call is implemented via said wireless communicating system, the geographic location of said communication device is notified to another device, a map is displayed on said another device and the geographic location of said communication device is indicated on said map, and a notification indicating that said phone call is implemented is output from said another device; a phone call reception notifying function, wherein when a phone call is received via said wireless communicating system, the geographic location of said communication device is notified to another device, a map is displayed on said another device and the geographic location of said communication device is indicated on said map, and a notification indicating that said phone call is received is output from said another device; a key pressed notifying function, wherein when a specific key of said input device is pressed, the geographic location of said communication device is notified to another device, a map is displayed on said another device and the geographic location of said communication device is indicated on said map, and a notification indicating that said specific key is pressed is output from said another device; a software activation notifying function, wherein when a specific software is activated, the geographic location of said communication device is notified to another device, a map is displayed on said another device and the geographic location of said communication device is indicated on said map, and a notification indicating that said specific software is activated is output from said another device; a document opening notifying function, wherein when a specific document is opened, the geographic location of said communication device is notified to another device, a map is displayed on said another device and the geographic location of said communication device is indicated on said map, and a notification indicating that a specific document is opened is output from said another device; a specified event notifying function, wherein when an event specified by the user of said communication device is occurred, the geographic location of said communication device is notified to another device, a map is displayed on said another device and the geographic location of said communication device is indicated on said map, and a notification indicating that said event specified by the user of said communication device is occurred is output from said another device; a television phone auto backup function, wherein a 1st audiovisual data which is the audiovisual data of the user of said communication device produced when implementing a television phone is automatically backed up and replayed afterwards, a 2nd audiovisual data which is the audiovisual data of the user of another device produced when implementing said television phone is automatically backed up and replayed afterwards, a 1st location data which indicates the geographic location of said communication device produced when implementing said television phone is automatically backed up and replayed afterwards, and a 2nd location data which indicates the geographic location of another device produced when implementing said television phone is automatically backed up and replayed afterwards, wherein said television phone is the function which enables the users of said communication device and said another device to converse with each other in an audiovisual fashion; a file auto saving function, wherein a file currently edited by the user of said communication device is automatically saved at a predetermined interval, a backup data of said file is produced at a predetermined interval, an original file data auto saving message data is output from said communication device and another device when said file is automatically saved, a backup file data auto saving message data is output from said communication device and said another device when said backup data of said file is produced, and said interval is capable to be identified by the user of said communication device and said another device; a file compressing function, wherein a file is compressed and a compressed file is produced by utilizing a specific format, said file is stored in a host computing system and another device, said specific format is capable to be selected by the user of said communication device, said message indicating that said file is compressed is displayed on said display, said compressed file is capable to be decompressed, when said compressed file is decompressed, a message indicating that said compressed file is decompressed is displayed on said display, and a password is required when decompressing said compressed file; a multiple phone number billing function, wherein said communication device is capable to make a phone call from a 1st phone number account and a 2nd phone number account, when a phone call is made from said 1st phone number account, a 1st phone bill is charged to said 1st phone number account, and when a phone call is made from said 2nd phone number account, a 2nd phone bill is charged to said 2nd phone number account; a multiple device door unlocking function, wherein a door is capable to be unlocked by said communication device and another device, when said door is unlocked by said communication device, a door unlocked message is displayed on said communication device and said another device, a door unlocking log is capable to be displayed on said communication device and said another device, wherein said door unlocking log includes the time and date at which said door is unlocked and an identification of the device which unlocked said door, a location data indicating the geographic locations of said communication device and said another device at which said door is unlocked is displayed on said communication device and said another device, said door is any type of door included in an artificial structure or carrier, wherein said artificial structure is a house or building, and said carrier is any type of carrier or transportation system designed to carry passenger(s); a multiple device door locking function, wherein a door is capable to be locked by said communication device and another device, when said door is locked by said communication device, a door locked message is displayed on said communication device and said another device, a door locking log is capable to be displayed on said communication device and said another device, wherein said door locking log includes the time and date at which said door is locked and an identification of the device which locked said door, a location data indicating the geographic locations of said communication device and said another device at which said door is locked is displayed on said communication device and said another device, said door is any type of door included in an artificial structure or carrier, wherein said artificial structure is a house or building, and said carrier is any type of carrier or transportation system designed to carry passenger(s); a phone call making log recording function, wherein when said voice communicating function is implemented, a phone call making log data is produced, said phone call making log data includes a selected phone number data to which said phone call was made, a current time data at which said phone call was made, a 1st location data at which said phone call was made, and/or a 2nd location data at which said phone call was made, wherein said 1st location data indicates the geographic location of said communication device, said 2nd location data indicates the geographic location of another device, when said phone call making log data is selected, said selected phone number data and said current time data are displayed on said display, and said 1st location data and said 2nd location data are indicated on said map displayed on said display of said communication device; a phone call receiving log recording function, wherein when said communication device receives a phone call, a phone call receiving log data is produced, said phone call receiving log data includes a phone number received data which indicates the phone number of a caller, a current time data at which said phone call was received, a 1st location data at which said phone call was received, a 2nd location data at which said phone call was received, and/or a personal data of said caller, when said phone call receiving log data is selected, said phone number received data, said current time data, said personal data are displayed on said display, and/or said 1st location data and said 2nd location data are indicated on said map displayed on said display; a phone call making log exporting function, wherein a phone call making log data is exported to another device, said phone call making log data includes a callee's phone number data, a phone call making time data, a callee's personal data, a 1st location data, and/or a 2nd location data, said callee's phone number data indicates the phone number of a callee, said phone call making time data indicates the time and date at which said phone call was made from said communication device, said callee's personal data indicates the data relating to said callee, said 1st location data indicates the geographic location of said communication device at which said phone call was made, said 2nd location data indicates the geographic location of said callee at which said phone call was made, and said phone call making log data is converted to a specific format when exported; a phone call receiving log exporting function, wherein a phone call receiving log data is exported to another device, said phone call receiving log data includes a caller's phone number data, a phone call receiving time data, a caller's personal data, a 1st location data, and/or a 2nd location data, said caller's phone number data indicates the phone number of a caller, said phone call receiving time data indicates the time and date at which said phone call was received by said communication device, said caller's personal data indicates the data relating to said caller, said 1st location data indicates the geographic location of said communication device at which said phone call was received, said 2nd location data indicates the geographic location of said caller at which said phone call was received, and said phone call receiving log data is converted to a specific format when exported; a phone call making log synchronizing function, wherein a phone call making log data is synchronized with another device, said phone call making log data includes a callee's phone number data, a phone call making time data, a callee's personal data, a 1st location data, and/or a 2nd location data, said callee's phone number data indicates the phone number of a callee, said phone call making time data indicates the time and date at which said phone call was made from said communication device, said callee's personal data indicates the data relating to said callee, said 1st location data indicates the geographic location of said communication device at which said phone call was made, said 2nd location data indicates the geographic location of said callee at which said phone call was made, said phone call making log data of said communication device is synchronized with said another device, and said phone call making log data of said communication device is synchronized with a host computing system; a phone call receiving log synchronizing function, wherein a phone call receiving log data is synchronized with another device, said phone call receiving log data includes a caller's phone number data, a phone call receiving time data, a caller's personal data, a 1st location data, and/or a 2nd location data, said caller's phone number data indicates the phone number of a caller, said phone call receiving time data indicates the time and date at which a phone call was received by said communication device, said caller's personal data indicates the data relating to said caller, said 1st location data indicates the geographic location of said communication device at which said phone call was received, said 2nd location data indicates the geographic location of said caller at which said phone call was received, said phone call receiving log data of said communication device is synchronized with said another device, said phone call receiving log data of said communication device is synchronized with a host computer; a 3D advertisement displaying function, wherein an advertisement is displayed in said computer generated three dimensional space, when said advertisement is selected, the website relating to said advertisement is displayed on said display, said advertisement is displayed by utilizing three dimensional image, said computer generated three dimensional space is a 3D game space, a 1st object, a game character, operated by the user of said communication device is located in said computer generated three dimensional space, a 2nd object, another game character, operated by the user of another device is located in said computer generated three dimensional space; an audiovisual location capability function, wherein when an audiovisual data is produced by utilizing said microphone and a camera of said communication device, the geographic location of said communication device is identified, and when said audiovisual data is output from said communication device, an audiovisual data geographic location which indicates the geographic location of said communication device at which said audiovisual data is produced is indicated on said display of said communication device, said audiovisual data geographic location is indicated on said display of said communication device by displaying the street address corresponding to said audiovisual data geographic location, said audiovisual data geographic location is indicated on said display of said communication device by identifying said audiovisual data geographic location on a map displayed on said display of said communication device, said audiovisual data is output from said another device, and said audiovisual data geographic location is indicated on the display of said another device by displaying the street address corresponding to said audiovisual data geographic location, said audiovisual data is output from said another device, and said audiovisual data geographic location is indicated on the display of said another device by identifying said audiovisual data geographic location on said map displayed on the display of said another device; a location audio notifying function, wherein a current location of said communication device is output in an audio fashion from said speaker, a street address corresponding to said current location is output in an audio fashion from said speaker, said street address corresponding to said current location is displayed on said display, and said current location is identified on a map displayed on said display; an answering machine location recording function, wherein when replaying a message left to the user of said communication device, a 1st location indicating the location of said communication device at which said message is left and a 2nd location indicating the location of another device at which said message is left are indicated on said communication device and said another device; a visual phone file sharing function, wherein a visual data of the user of said communication device is displayed on the display of another device, and a file displayed on said display of said communication device is displayed on the display of said another device, a mouse pointer controlled by the user of said communication device is displayed on the display of said another device, a personal data of the user of said communication device is displayed on the display of said another device, a street address corresponding to the current location of said communication device is displayed on the display of said another device, and the current locations of said communication device and said another device are indicated on said map displayed on said display; a visual phone magnifying function, wherein a 1st visual data and a 2nd visual data are displayed on said display of said communication device, said 1st visual data is the visual data retrieved via a camera of said communication device, said 2nd visual data is the visual data retrieved via the camera of another device, and a portion of said 1st visual data is magnified and displayed on said display of said communication device, a portion of said 2nd visual data is magnified and displayed on said display of said communication device, said portions of said 1st visual data and said 2nd visual data are identified by utilizing said mouse pointer; a multiple home page displaying function, wherein when an Internet browser is activated, a 1st home page and a 2nd home page are displayed on said display; a multiple visual phone party location identifying function, wherein when a personal data of the user of another device is displayed before implementing a visual phone, a 1st current location which indicates the current geographic location of said communication device and a 2nd current location which indicates the current geographic location of said another device are indicated on a map data displayed on said display of said communication device; an individual party conversation replaying function, wherein after implementing a visual phone between said communication device and another device, the audiovisual data of said communication device, the audiovisual data of said another device, or both are replayed by a command input by the user of said communication device, the coordinates of said communication device and said another device at which said visual phone is implemented are displayed on said display of said communication device, the street addresses at which said communication device and said another device are located at the time said visual phone is implemented are displayed on said display of said communication device, the locations of said communication device and said another device at the time said visual phone is implemented are indicated on said map displayed on said display of said communication device, the audiovisual data selected by the user of said communication device is output from said communication device, and the location of the device corresponding to said audiovisual data selected is indicated on said display of said communication device; a multiple phone notifying function, wherein when a two-party communication request is received from another device, a 2nd ringtone is output from said communication device, and when a three-party communication request is received from said another device, a 3rd ringtone is output from said communication device, the coordinates of said communication device and said another device at which said request is received are displayed on said display of said communication device, the street addresses at which said communication device and said another device are located at the time said request is received are displayed on said display of said communication device, the locations of said communication device and said another device at the time said request is received are indicated on a map displayed on said display of said communication device; a multiple phone dial tone function, wherein when initiating a two-party communication, a 2nd dial tone is output from said communication device, and when initiating a three-party communication, a 3rd dial tone is output from said communication device, said 2nd dial tone or said 3rd dial tone is output from another device which is the callee's device; a multiple phone new party joining function, wherein when said communication device receives a phone call from a 3rd device while implementing a two-party communication with another device, a notice indicating that a phone call is received is output from said communication device, and a three-party communication is implemented including said 3rd device thereafter; a music property setting function, wherein a music property data of each music audio data is set by the user of said communication device, said music property data indicates either to replay the corresponding music audio data repeatedly or replay said corresponding music audio data only for once, and when said music audio data is replayed, said music audio data is replayed repeatedly or only for once in accordance with said corresponding music property data; a fore/background audio recording function, wherein a background audio data is recorded, a foreground audio data is recorded when said background audio data is replayed, said foreground audio data is replayed independently from said background audio data, said background audio data is replayed independently from said foreground audio data, a mixed audio data is produced by mixing said foreground audio data and said background audio data, and said mixed audio data is replayed; an email address phone calling function, wherein when an email address is identified by the user of said communication device, a phone call is implemented by utilizing the phone number corresponding to said email address identified by the user, the coordinates of said communication device and another device are displayed on said display before or during said phone call, the street addresses of the user of said communication device and the user of said another device are displayed on said display before or during said phone call, the locations of said communication device and said another device are indicated on a map displayed on said display before or during said phone call; a night vision displaying carrier function, wherein said communication device is included in a carrier, a night vision camera is included in said carrier, a night vision visual data retrieved from said night vision camera is displayed on a windshield of said carrier, said night vision visual data is also displayed on said display, said night vision visual data is also displayed on said display of another device, said night vision visual data is recorded and replayed by said communication device, said night vision visual data is recorded and replayed by said another device, a message indicating that said night vision visual data is displayed is indicated on said windshield, the coordinates of said communication device and said another device are displayed on said windshield and said display of said communication device and/or said another device, the street addresses of said communication device and said another device are displayed on the windshield and/or said display of said communication device and/or said another device, the locations of said communication device and said another device are indicated on a map displayed on said windshield and said display and said another device; a phone number email function, wherein when a phone number is identified by the user of said communication device, an email produced by the user of said communication device is sent to an email address corresponding to said phone number, the coordinates of said communication device and another device are displayed on said display, the street addresses of the user of said communication device and the user of said another device are displayed on said display of said communication device, the locations of said communication device and said another device are indicated on a map displayed on said display; a no-answer auto emailing function, wherein when said communication device implements a phone call to another device and said another device does not answer said phone call, a message data, which indicates a written message, produced by said communication device is sent to said another device, said message data is output from said communication device and/or said another device, the locations of said communication device and/or said another device at the time said phone call is not answered are displayed on said communication device and/or said another device, the time and date at which the phone call is not answered is displayed on said communication device and/or said another device; a linked page auto downloading function, wherein when a web page is displayed on said display, a linked page which is linked to said web page is automatically downloaded, and when a link indicating said linked page is selected by the user of said communication device, a linked page which is automatically downloaded is retrieved and displayed on said display, a linked page auto downloading message is displayed while said linked page is automatically downloaded, a linked page auto downloading complete message which is a message indicating that downloading said linked page is completed is displayed when downloading said linked page is completed; a folder auto hiding function, wherein a folder in which data is/are stored is hidden, and when a password entered by the user matches with a registered password, said folder and said data stored therein are displayed on said display; a folder time defined hiding function, wherein a 1st folder and data stored therein become invisible during a 1st specific time, and a 2nd folder and data stored therein become invisible during a 2nd specific time; a folder time defined revealing function, wherein a 1st folder and data stored therein become visible during a 1st specific time, and a 2nd folder and data stored therein become visible during a 2nd specific time; a common phone number changing function, wherein when a common phone number which is the phone number commonly owned by said communication device and another device is changed by said another device, said change is reflected to said communication device, and when said common phone number is changed by said communication device, said change is reflected to said another device, a password is required when changing said common phone number, said common phone number changing message which indicates that said common phone number is changed is displayed on said display of said communication device and/or said another device, each of said communication device and said another device is capable to make a phone call by utilizing said new common phone number thereafter; a common email address changing function, wherein when a common email address which is an email address commonly owned by said communication device and another device is changed by said another device, said change is reflected to said communication device, and when said common email address is changed by said communication device, said change is reflected to said another device, a password is required when changing said common email address, a common email address changing message which indicates that said common email address is changed is displayed on said display of said communication device and/or said another device, each of said communication device and said another device is capable to send email by utilizing said new common email address thereafter; a multiple incrementing counter function, wherein a 1st value and a 2nd value are identified by said input device, an incrementing counter is activated and said counter value is incremented, and when said counter value equals to said 1st value, a 1st notice is output from said communication device, and when said counter value equals to said 2nd value, a 2nd notice is output from said communication device; a multiple decrementing counter function, wherein a 1st value and a 2nd value are identified by said input device, a decrementing counter is activated and said counter value is decremented, and when said counter value equals to said 1st value, a 1st notice is output from said communication device, and when said counter value equals to said 2nd value, a 2nd notice is output from said communication device; a multiple alarm clock function, wherein a 1st alarm clock time data is identified, a 2nd alarm clock time data is identified, when a current time matches with said 1st alarm clock time data, a 1st audiovisual data is output from said communication device, and when said current time matches with said 2nd alarm clock time data, a 2nd audiovisual data is output from said communication device, each of said 1st audiovisual data and said 2nd audiovisual data is selected from a plurality of audiovisual data by the user; an alarm clock current location notifying function, wherein when a specified time arrives, a predetermined audiovisual data is output from said communication device and the current geographic location of said communication device is indicated on said display; a camcorder auto time adjusting function, wherein the current time of said communication device is automatically adjusted, when audiovisual data is recorded, said automatically adjusted current time is recorded simultaneously, and when said recorded audiovisual data is replayed, said recorded automatically adjusted current time is replayed simultaneously, said audiovisual data which is currently being recorded is output from said communication device and said current time which is automatically adjusted is displayed on said display simultaneously; a location identified device information displaying function, wherein an icon indicating the current location of another device is displayed on a map, when said icon is selected, a personal information relating to the user of said another device is displayed on said display, or when said icon is selected, the phone number of the user of said another device is displayed on said display, and said phone call is operable to be implemented thereafter, or when said icon is selected, a blank email of which the addressee is the user of said another device is displayed on said display, and an email is operable to be authored and sent to said another device thereafter; a folder message displaying function, wherein a plurality of folders are displayed on said display and when one of said plurality of folders is selected by the user, a message corresponding thereto is displayed on said display; a folder audiovisual outputting function, wherein a plurality of folders are displayed on said display, when one of said plurality of folders is selected by the user, an audiovisual data corresponding thereto is output from said communication device; a pistol monitoring function, wherein said communication device is included in a weapon, said communication device produces and displays a fired bullet number data, a remaining bullet number data, a current time data, and a bullet fired log data, wherein said bullet fired log data indicates the time and geographic location at which a bullet was fired, said fired bullet number data, said remaining bullet number data, said current time data, and said bullet fired log data are operable to be displayed on another device; an earthquake auto locking function, wherein when an earthquake is detected, a predetermined locking device is activated and an object is locked, an earthquake detected message data and said lock activated message data are displayed on said display, and said earthquake detected message data and said lock activated message data are displayed on another device; a television resolution auto changing function, wherein when a TV program data of a high resolution received from a broadcast center is of a poor quality, said TV program data of a low resolution is received and output from said communication device, and a 2nd resolution television message data indicating that said TV program data of a low resolution is output is displayed on said display; a shortcut auto creating function, wherein when a software program is executed, a shortcut key corresponding to said software program is automatically produced, and when said shortcut key is selected by the user of said communication device, said software program is executed; an auto zooming function, wherein an original visual data is zoomed wherein a specific target is centerized therein and displayed on said display, and a message indicating that said original visual data is zoomed is displayed on said display; an oxygen tank function, wherein said communication device is included in an oxygen tank, said oxygen tank includes an oxygen bottle, a remaining oxygen data which indicates the amount of oxygen remaining in said oxygen bottle, an oxygen flow data which indicates the level of current flow of oxygen from said oxygen bottle, and/or a remaining oxygen time data which indicates the remaining time to utilize the oxygen stored in said oxygen bottle are displayed on said display, and an oxygen alert message data is displayed on said display of said communication device when said amount of oxygen remaining in said oxygen bottle is below certain level, and said remaining oxygen data, said oxygen flow data, and/or said remaining oxygen time data are displayed on the display of another device, and said oxygen alert message data is displayed on the display of said another device when said amount of oxygen remaining in said oxygen bottle is below certain level; an in carrier server function, wherein said communication device is included in a carrier, a 2nd device is located in said carrier, a 3rd device is located outside of said carrier, said communication device is capable to store the data produced by said 2nd device and/or said 3rd device, a list of said data stored in said communication device is displayed on said 2nd device and/or said 3rd device, said data stored in said communication device is transferred to said 2nd device and/or said 3rd device in a wireless fashion; a silent mode auto subtitle displaying function, wherein when said communication device is in a ringing mode, an audio portion and a visual portion of said TV program data are output from said speaker and said display, and when said communication device is in a silent mode, said visual portion of said TV program data and said corresponding subtitle data are displayed on said display; a silent mode auto answerphone message displaying function, wherein when said communication device is in a ringing mode, an answerphone message audio data which is the audio data indicating the message left by a caller is output from said speaker, and when said communication device is in a silent mode, said answerphone message audio data is converted to text data and displayed on said display; a midnight auto downloading function, wherein a plurality of audiovisual data are automatically downloaded from a server at a specified time identified by the user of said communication device, and one of said plurality of audiovisual data is operable to be replayed by said communication device; a shortcut link auto updating function, wherein when the location of a target data stored is changed, a shortcut link data which indicates a shortcut link to said target data is automatically updated and a shortcut link updated message data and a target data moved message data are displayed on said display; a web page auto refreshing function, wherein a 1st webpage data is automatically refreshed by a 1st web page auto refreshing data input by the user of said communication device which indicates the interval by which said 1st web page data is refreshed, a 2nd webpage data is automatically refreshed by a 2nd web page auto refreshing data input by the user of said communication device which indicates the interval by which said 2nd web page data is refreshed, or said 1st webpage data and said 2nd webpage data are automatically refreshed by an all web page auto refreshing data input by the user of said communication device which indicates the interval by which said 1st web page data and said 2nd web page data are refreshed; a vibrator remote activation function, wherein a vibrator of another device is vibrated in accordance with a specific pattern identified by said communication device and a message indicating that said vibrator of said another device is vibrated in accordance with said specific pattern is displayed on both said communication device and said another device, or a vibrator of said communication device is vibrated in accordance with a certain pattern identified by said another device and a message indicating that said vibrator of said communication device is vibrated in accordance with said certain pattern is displayed on both said communication device and said another device; a scenario accordance vibrating function, wherein when an audiovisual data is output from said communication device, a vibrator of said communication device vibrates in the manner determined by a vibration pattern data, wherein said vibration pattern data indicates the pattern of vibration, the length of time of vibration, and/or the strength of vibration; a location dependent message outputting function, wherein when the user of said communication device arrives at a 1st location, a 1st message is output from said communication device and a map indicating said 1st location and the street address or name of said 1st location are displayed on said display, and when the user of said communication device arrives at a 2nd location, a 2nd message is output from said communication device and a map indicating said 2nd location and the street address or name of said 2nd location are displayed on said display; a location dependent program activating function, wherein when the user of said communication device arrives at a 1st location, a 1st software program is executed and a map indicating said 1st location and the street address or name of said 1st location are displayed on said display, and when the user of said communication device arrives at a 2nd location, a 2nd software program is executed and a map indicating said 2nd location and the street address or name of said 2nd location are displayed on said display; a multiple answering machine function, wherein a 1st phone number data and a 2nd phone number data are registered with said communication device, when a phone call made to said 1st phone number data is received and said communication device does not answer said phone call within a certain period of time, a 1st caller's message data, a 1st caller's location data, and a 1st callee's location data are stored, which are operable to be output, wherein said 1st caller's message data is the audiovisual data indicating the message left by the caller who made the call to said 1st phone number data, said 1st caller's location data indicates the geographic location of the caller at the time the call was made to said 1st phone number data, and said 1st callee's location data indicates the geographic location of said communication device at the time the call was made to said 1st phone number data, and when a phone call made to said 2nd phone number data is received and said communication device does not answer said phone call within a certain period of time, a 2nd caller's message data, a 2nd caller's location data, and a 2nd callee's location data, which are operable to be output, wherein said 2nd caller's message data is the audiovisual data indicating the message left by the caller who made the call to said 2nd phone number data, said 2nd caller's location data indicates the geographic location of the caller at the time the call was made to said 2nd phone number data, and said 2nd callee's location data indicates the geographic location of said communication device at the time the call was made to said 2nd phone number data; a time dependent answering machine function, wherein when said communication device receives a phone call and said phone call is not answered and if the current time is within a 1st time frame, a 1st auto replying message is output from the caller's device, and if the current time is within a 2nd time frame, a 2nd auto replying message is output from the caller's device; a television program data storage area selecting function which records a TV program data in accordance with recording schedule and recording quality identified by the user, said TV program data is stored in either said communication device, a host computing system, or a removable media connected to said communication device in accordance with the user's selection, a recorded location data which indicates the geographic location of said communication device at which said TV program data is recorded is identified, and said recording schedule and said recorded location data are indicated on said display when said TV program data is replayed; a street address icon displaying function which displays a street address data which is the alphanumeric data indicating a street address on said display, identifies the geographic location corresponding to said street address data, displays a map data on said display, and indicates said geographic location corresponding to said street address data on said map data; an audiovisual multiple recording/replaying function which records a 1st audiovisual data received from a TV broadcast center and replays said 1st audiovisual data, wherein said 1st audiovisual data is capable to be replayed while the data is being recorded, a 1st recorded location data which indicates the geographic location at which the 1st audiovisual data is recorded is produced, a 1st replayed location data which indicates the geographic location at which the 1st audiovisual data is replayed is produced, and said 1st recorded location data and said 1st replayed location data are indicated on a map data displayed on said display, and said audiovisual multiple recording/replaying function further records a 2nd audiovisual data received from a TV broadcast center and replays said 2nd audiovisual data, wherein said 2nd audiovisual data is capable to be replayed while the data is being recorded, a 2nd recorded location data which indicates the geographic location at which the 2nd audiovisual data is recorded is produced, a 2nd replayed location data which indicates the geographic location at which the 2nd audiovisual data is replayed is produced, said 2nd recorded location data and said 2nd replayed location data are indicated on a map data displayed on said display, and all of which are performed simultaneously; a map editing function which displays a map data, wherein a 1st icon, a 2nd icon, and a 3rd icon are displayed on said map data, when said 1st icon is selected by utilizing said input device, a text document data corresponding thereto is retrieved from a data storage area and displayed on said display, when said 2nd icon is selected by utilizing said input device, an audiovisual data corresponding thereto is retrieved from said data storage area and output from said speaker and said display, and said 3rd icon indicates the current geographic location of said communication device; an enhanced television tuner remote controlling function which transfers a television tuner remote controlling data from said communication device to a television tuner in a wireless fashion, or have said television tuner remote controlling data transferred from said television tuner to said communication device in a wireless fashion, wherein said television tuner remote controlling data indicates the data to turn the power on, turn the power off, turn the channel up, turn the channel down, turn the volume up, and turn the volume down of said television tuner; an enhanced DVD player remote controlling function which transfers a DVD player remote controlling data from said communication device to a DVD player in a wireless fashion, or have said DVD player remote controlling data transferred from said DVD player to said communication device in a wireless fashion, wherein said DVD player remote controlling data indicates the data to turn the power on of said DVD player, turn the power off of said DVD player, move the cursor up produced by said DVD player, move the cursor down produced by said DVD player, move the cursor left produced by said DVD player, move the cursor right produced by said DVD player, start replaying an DVD stored in said DVD player, pause replaying said DVD stored in said DVD player, resume replaying said DVD stored in said DVD player, replaying said DVD stored in said DVD player in a fast mode, replaying said DVD stored in said DVD player in a slow mode, turn the volume up of said DVD player, and/or turn the volume down of said DVD player; a monetary value data auto charging function which sends a paying monetary value data via said wireless communicating system in a wireless fashion, said paying monetary value data indicates a certain amount of monetary value of a certain currency utilized for payment, a remaining monetary value data is updated by subtracting said paying monetary value data therefrom, said remaining monetary value data is the total amount of monetary value of said certain currency capable to be utilized by the user, when said remaining monetary value data is below a certain value, said remaining monetary value data is automatically charged in a wireless fashion, an auto charged message data which is the message indicating that said remaining monetary value data is charged is displayed on said display, and when a payment log displaying command is input via said input device, said remaining monetary value data, a payment time log data which indicates the time and date at which the payment was made by utilizing said paying monetary value data, and a payment amount log data which indicates the amount of said paying monetary value data utilized for payment are displayed on said display, and a 1st location which indicates the geographic location at which the payment was made by utilizing said paying monetary value data and a 2nd location which indicates the current geographic location of said communication device are indicated on the map displayed on said display; a site viewing remotely prohibiting function which produces a prohibited site data which indicates the website prohibited to be displayed on another device, in response, said another device is prohibited to display the website indicated by said prohibited site data, when said another device attempts to display the website indicated by said prohibited site data, a prohibited site attempting message data which is the message indicating that said another device is attempting to access and display the website indicated by said prohibited site data is displayed on said display of said communication device, and a 1st location data which indicates the current geographic location of said communication device and a 2nd location data which indicates the current geographic location of said another device are indicated on a map data displayed on said display of said communication device; a remotely controlled device auto selecting function which identifies the electronic device to which said communication device is currently facing, the identification of said electronic device is displayed on said display, a control panel utilized to control said electronic device is displayed on said display, and a control data to control said electronic device is sent from said wireless communicating system in a wireless fashion, and a plurality of control data utilized to control said electronic device may be recovered from said electronic device in a wireless fashion; a driver alerting function which identifies the current geographic location of another automobile and outputs a 1st automobile approaching alert data if said another automobile is approaching the automobile in which said communication device is located, and outputs a 2nd automobile approaching alert data if said another automobile is located around the corner from the location of the automobile in which said communication device is located; a robot controlling macro function which displays a plurality of movement data on said display, each of said plurality of movement data indicates a specific action of a robot, a macro data is produced in accordance with one or more of said plurality of movement data selected by the user of said communication device, and said robot acts in accordance with said macro data, the current locations of said communication device and said robot are indicated on a map data displayed on said display and said robot, wherein each of said plurality of movement data indicates proceeding to a predetermined location, recording an audiovisual data, sending said audiovisual data to said communication device, replaying said audiovisual data, outputting an alert audiovisual data, turn on the room light of a predetermined room, turn off the room light of a predetermined room, open the door of a predetermined room, close the door of a predetermined room, open a predetermined window, or close a predetermined window; a robot predetermined location proceeding function which identifies a destination location data which is one of a plurality of predetermined location data selected by the user of said communication device wherein each of said plurality of predetermined location data indicates a certain geographic location, indicates a 1st current location data which indicates the current geographic location of said communication device and a 2nd current location data which indicates the current geographic location of said robot on a map data displayed on said display, indicates a current distance data which indicates the distance between said robot and the destination indicated by said distance location data, and outputs a destination arrival message data which indicates that said robot has arrived at the destination indicated by said destination location data; a message leaving function which outputs a ring tone data, sends an answering data to a caller's device, and records a caller's message under a 1st mode, and abbreviates outputting said ring tone data and sending said answering data to said caller's device, and initiates recording said caller's message under a 2nd mode, wherein said 2nd mode is initiated if said communication device receives a direct audiovisual message data recording command from said caller's device; a unique folder icon attaching function which displays a plurality of folders on said display, a relating icon linked to each of said plurality of folders is displayed adjacent to the corresponding folder, said unique folder icon attaching function displays a plurality of icons, a selected icon which is one of said plurality of icons is selected by the user, and said unique folder icon attaching function displays said selected icon on or adjacent to a specific folder displayed on said display in addition to said relating icon; a unique file icon attaching function which displays a plurality of files on said display, a relating icon linked to each of said plurality of files is displayed adjacent to the corresponding file, said unique file icon attaching function displays a plurality of icons, a selected icon which is one of said plurality of icons is selected by the user, and said unique file icon attaching function displays said selected icon on or adjacent to a specific file displayed on said display in addition to said relating icon; a unique email icon attaching function which displays a plurality of emails on said display, a relating icon linked to each of said plurality of emails is displayed adjacent to the corresponding email, said unique email icon attaching function displays a plurality of icons, a selected icon which is one of said plurality of icons is selected by the user, and said unique email icon attaching function displays said selected icon on or adjacent to a specific email displayed on said display in addition to said relating icon; a device current condition notifying function which produces a 1st central processing unit status data, a 1st space used data, a 1st free space data, a 1st wireless signal reception level data, a 1st battery level data, and/or a 1st current location data, and said 1st central processing unit status data, said 1st space used data, said 1st free space data, said 1st wireless signal reception level data, said 1st battery level data, and/or said 1st current location data are indicated on said display of said communication device, wherein said 1st central processing unit status data indicates the current status a CPU of said communication device, said 1st space used data indicates the currently used area of a data storage area of said communication device, said 1st free space data indicates the current free space of said data storage area of said communication device, said 1st wireless signal reception level data indicates the current reception level of said wireless communicating system of said communication device, said 1st battery level data indicates the current battery level of a battery of said communication device, and said 1st current location data indicates the current geographic location of said communication device, and said device current condition notifying function further indicates a 2nd central processing unit status data, a 2nd space used data, a 2nd free space data, a 2nd wireless signal reception level data, a 2nd battery level data, and/or a 2nd current location data on said display of said communication device received from another device, wherein said 2nd central processing unit status data indicates the current status a CPU of said another device, said 2nd space used data indicates the currently used area of a data storage area of said another device, said 2nd free space data indicates the current free space of said data storage area of said another device, said 2nd wireless signal reception level data indicates the current reception level of a wireless communication system of said another device, said 2nd battery level data indicates the current battery level of a battery of said another device, and said 2nd current location data indicates the current geographic location of said another device; a device bulk duplicating function which produces a random access memory duplicating address data which indicates the directories or locations of the data and software programs stored in a random access memory of said communication device identified by the user, a hard disk duplicating address data which indicates the directories or locations of the data and software programs stored in a hard disk of said communication device identified by the user, a 1st removal media duplicating address data which indicates the directories or locations of the data and software programs stored in a 1st removal media of said communication device identified by the user, and/or a 2nd removal media duplicating address data which indicates the directories or locations of the data and software programs stored in a 2nd removal media of said communication device identified by the user, the data and software programs indicated by said random access memory duplicating address data, said hard disk duplicating address data, said 1st removal media duplicating address data, and/or said 2nd removal media duplicating address data are transferred to another device in a wireless fashion, and stored in said another device in accordance with said random access memory duplicating address data, said hard disk duplicating address data, said 1st removal media duplicating address data, and/or said 2nd removal media duplicating address data, a log data which indicates the time/date, the geographic locations of said communication device and said another device, said random access memory duplicating address data, said hard disk duplicating address data, said 1st removal media duplicating address data, and/or said 2nd removal media duplicating address data are indicated on said display of said communication device and the display of said another device; a program related audiovisual data auto downloading function which downloads a related audiovisual data in a wireless fashion while a distributed program data is received and output from said communication device, said distributed program data is an audiovisual data indicating a TV program distributed by a TV broadcast center and said related audiovisual data is an audiovisual data related to said distributed program data, said related audiovisual data is capable to be replayed when said communication device obtains a replaying license key data, and a current location data which indicates the current geographic location of said communication device, a licensed location data which indicates the geographic location at which said replaying license key data is obtained, and a replaying location data which indicates the geographic location at which said related audiovisual data is replayed are indicated on said display; a weather dependent program executing function which executes a specific software program in accordance with the current weather, replays a specific audiovisual data in accordance with the current weather, and displays a specific document data in accordance with the current weather, and said specific software program is executed on another device, said specific audiovisual data is replayed on said another device, and said specific document is displayed on said another device, and a 1st current location which indicates the current geographic location of said communication device and a 2nd current location which indicates the current geographic location of said another device are indicated on said communication device and/or said another device; an audiovisual outputting function which indicates, when said another device outputs a specific audiovisual data, an outputting message data which is the message indicating that said specific audiovisual data is output from said another device, an outputting time data which indicates the time and date at which said specific audiovisual data is output from said another device, and the geographic locations of said communication device and said another device at which said specific audiovisual data is output from said another device on said display of said communication device; an email outputting function which indicates, when another device displays a specific email data, an outputting message data which is the message indicating that said specific email data is displayed on said another device, an outputting time data which indicates the time and date at which said specific email data is displayed on said another device, and the geographic locations of said communication device and said another device at which said specific email data is displayed on said another device on said display of said communication device; a document outputting function which indicates, when another device displays a specific document data, an outputting message data which is the message indicating that said specific document data is displayed on said another device, an outputting time data which indicates the time and date at which said specific document data is displayed on said another device, and the geographic locations of said communication device and said another device at which said specific document data is displayed on said another device on said display of said communication device; and a program executing function which indicates, when another device executes a specific program data, an executing message data which is the message indicating that said specific program data is executed by said another device, an executing time data which indicates the time and date at which said specific program data is executed by said another device, and the geographic locations of said communication device and said another device at which said specific program data is executed by said another device on said display of said communication device.

INCORPORATION BY REFERENCE

The following paragraphs and drawings described in U.S. Ser. No. 11/615,767 filed 2006 Dec. 22, are incorporated to this application by reference: the preamble described in paragraph [2149] (no drawings); Communication Device 200 (Voice Communication Mode) described in paragraphs [2150] through [2155] (FIGS. 1 through 2c); Voice Recognition System described in paragraphs [2156] through [2188] (FIGS. 3 through 19); Positioning System described in paragraphs [2189] through [2220] (FIGS. 20a through 32e); Auto Backup System described in paragraphs [2221] through [2230] (FIGS. 33 through 37); Signal Amplifier described in paragraphs [2231] through [2236] (FIG. 38); Audio/Video Data Capturing System described in paragraphs [2237] through [2249] (FIGS. 39 through 44b); Digital Mirror Function (1) described in paragraphs [2250] through [2258] (FIGS. 44c through 44e); Caller ID System described in paragraphs [2259] through [2266] (FIGS. 45 through 47); Stock Purchasing Function described in paragraphs [2267] through [2276] (FIGS. 48 through 52); Timer Email Function described in paragraphs [2277] through [2283] (FIGS. 53a and 53b); Call Blocking Function described in paragraphs [2284] through [2297] (FIGS. 54 through 59); Online Payment Function described in paragraphs [2298] through

[2307] (FIGS. 60 through 64); Navigation System described in paragraphs [2308] through [2330] (FIGS. 65 through 74a); Remote Controlling System described in paragraphs [2331] through [2349] (FIGS. 75 through 85); Auto Emergency Calling System described in paragraphs [2350] through [2358] (FIGS. 86 and 87); Cellular TV Function described in paragraphs [2359] through [2443] (FIGS. 88 through 135); 3D Video Game Function described in paragraphs [2444] through [2456] (FIGS. 136 through 144); Digital Mirror Function (2) described in paragraphs [2457] through [2466] (FIGS. 145 through 155); Voice Recognition Sys—E-mail (2) described in paragraphs [2467] through [2475] (FIGS. 156 through 160); Positioning System—GPS Search Engine described in paragraphs [2476] through [2518] (FIGS. 161 through 182); Mobile Ignition Key Function described in paragraphs [2519] through [2541] (FIGS. 183 through 201); Voice Print Authentication System described in paragraphs [2542] through [2552] (FIGS. 202 through 211); Fingerprint Authentication System described in paragraphs [2553] through [2565] (FIGS. 212 through 221); Auto Time Adjust Function described in paragraphs [2566] through [2570] (FIGS. 222 through 224); Video/Photo Mode described in paragraphs [2571] through [2599] (FIGS. 225 through 242); Call Taxi Function described in paragraphs [2600] through [2640] (FIGS. 243 through 269); Shooting Video Game Function described in paragraphs [2641] through [2657] (FIGS. 270 through 283); Driving Video Game Function described in paragraphs [2658] through [2671] (FIGS. 284 through 294); Address Book Updating Function described in paragraphs [2672] through [2692] (FIGS. 295 through 312); Batch Address Book Updating Function—With Host described in paragraphs [2693] through [2714] (FIGS. 313 through 329); Batch Address Book Updating Function—Peer-To-Peer Connection described in paragraphs [2715] through [2719] (FIGS. 329a through 329c); Batch Scheduler Updating Function—With Host described in paragraphs [2720] through [2743] (FIGS. 330 through 350); Batch Scheduler Updating Function—Peer-To-Peer Connection described in paragraphs [2744] through [2748] (FIGS. 351 and 352); Calculator Function described in paragraphs [2749] through [2754] (FIGS. 353 through 356); Spreadsheet Function described in paragraphs [2755] through [2762] (FIGS. 357 through 360); Word Processing Function described in paragraphs [2763] through [2778] (FIGS. 361 through 373); TV Remote Controller Function described in paragraphs [2779] through [2801] (FIGS. 374 through 394); CD/PC Inter-communicating Function described in paragraphs [2802] through [2826] (FIGS. 413 through 427); PDWR Sound Selecting Function described in paragraphs [2827] through [2863] (FIGS. 428 through 456); Start Up Software Function described in paragraphs [2864] through [2880] (FIGS. 457 through 466); Another Embodiment Of Communication Device 200 described in paragraphs [2881] through [2885] (FIGS. 467a through 467d); Stereo Audio Data Output Function described in paragraphs [2886] through [2905] (FIGS. 468 through 479); Stereo Visual Data Output Function described in paragraphs [2906] through [2925] (FIGS. 480 through 491); Multiple Signal Processing Function described in paragraphs [2926] through [2998] (FIGS. 492 through 529); Positioning System—Pin-pointing Function described in paragraphs [2999] through [3032] (FIGS. 530 through 553); Artificial Satellite Host described in paragraphs [3033] through [3051] (FIGS. 554 through 567); CCD Bar Code Reader Function described in paragraphs [3052] through [3073] (FIGS. 568 through 579); Online Renting Function described in paragraphs [3074] through [3151] (FIGS. 580 through 633); SOS Calling Function described in paragraphs [3152] through [3172] (FIGS. 634 through 645); Input Device described in paragraphs [3173] through [3178] (FIGS. 646 through 650); PC Remote Controlling Function described in paragraphs [3179] through [3214] (FIGS. 651 through 670); PC Remote Downloading Function described in paragraphs [3215] through [3264] (FIGS. 671 through 701); Audiovisual Playback Function described in paragraphs [3265] through [3290] (FIGS. 702 through 716); Audio Playback Function described in paragraphs [3291] through [3315] (FIGS. 717 through 731); Ticket Purchasing Function described in paragraphs [3316] through [3345] (FIGS. 732 through 753); Remote Data Erasing Function described in paragraphs [3346] through [3375] (FIGS. 754 through 774); Business Card Function described in paragraphs [3376] through [3392] (FIGS. 775 through 783); Game Vibrating Function described in paragraphs [3393] through [3403] (FIGS. 784 through 786); Part-time Job Finding Function described in paragraphs [3404] through [3424] (FIGS. 787 through 801); Parking Lot Finding Function described in paragraphs [3425] through [3464] (FIGS. 802 through 832); Parts Upgradable Communication Device described in paragraphs [3465] through [3490] (FIGS. 833a through 833x); On Demand TV Function described in paragraphs [3491] through [3521] (FIGS. 834 through 855); Inter-communicating TV Function described in paragraphs [3522] through [3556] (FIGS. 856 through 882); Display Controlling Function described in paragraphs [3557] through [3574] (FIGS. 883 through 894); Multiple Party Communicating Function described in paragraphs [3575] through [3608] (FIGS. 894a through 917); Display Brightness Controlling Function described in paragraphs [3609] through [3618] (FIGS. 918 through 923); Multiple Party Pin-pointing Function described in paragraphs [3619] through [3666] (FIGS. 924 through 9500; Digital Camera Function described in paragraphs [3667] through [3694] (FIGS. 951 through 968); Phone Number Linking Function described in paragraphs [3695] through [3718] (FIGS. 968a through 983); Multiple Window Displaying Function described in paragraphs [3719] through [3737] (FIGS. 984 through 995); Mouse Pointer Displaying Function described in paragraphs [3738] through [3775] (FIGS. 996 through 1021); House Item Pin-pointing Function described in paragraphs [3776] through [3935] (FIGS. 1022 through 1152); Membership Administrating Function described in paragraphs [3936] through [3978] (FIGS. 1153 through 1188); Keyword Search Timer Recording Function described in paragraphs [3979] through [4070] (FIGS. 1189 through 1254); Weather Forecast Displaying Function described in paragraphs [4071] through [4112] (FIGS. 1255 through 1288); Multiple Language Displaying Function described in paragraphs [4113] through [4170] (FIGS. 1289 through 1331); Caller's Information Displaying Function described in paragraphs [4171] through [4224] (FIGS. 1332 through 1375); Communication Device Remote Controlling Function (By Phone) described in paragraphs [4225] through [4265] (FIGS. 1394 through 1415); Communication Device Remote Controlling Function (By Web) described in paragraphs [4266] through [4306] (FIGS. 1416 through 1437); Shortcut Icon Displaying Function described in paragraphs [4307] through [4334] (FIGS. 1438 through 1455); Task Tray Icon Displaying Function described in paragraphs [4335] through [4357] (FIGS. 1456 through 1470); Multiple Channel Processing Function described in paragraphs [4358] through [4405] (FIGS. 1471 through 1498); Solar Battery Charging Function described in paragraphs [4406] through [4419] (FIGS. 1499 through 1509); OS Updating Function described in paragraphs [4420] through [4487](FIGS. 1510 through 1575); Device Managing Function described in paragraphs [4488] through [4505] (FIGS. 1576 through 1587); Automobile Controlling Function described in paragraphs [4506] through [4554] (FIGS. 1588 through 1627); OCR Function described in paragraphs [4555] through [4290] (FIGS. 1628 through 1652); Real-time GPS Function described in paragraphs [4591] through [4660] (FIGS. 1653 through 1712); CCD Video Stabilizing Function described in paragraphs [4661] through [4692] (FIGS. 1713 through 1736); DVD Remote Controlling Function described in paragraphs [4693] through [4731] (FIGS. 1737 through 1757); Dual Frame Buffer Implementing Function described in paragraphs [4732] through [4748] (FIGS. 1758 through 1767); Mouse Pointer Image Auto Changing Function described in paragraphs [4749] through [4762] (FIGS. 1768 through 1774); Dual CCD Camera Function described in paragraphs [4763] through [4783] (FIGS. 1775a through 1786); Radio Tuner Function described in paragraphs [4784] through [4814] (FIGS. 1787 through 1812); Registered Voice Recognizing Function described in paragraphs [4815] through [4854] (FIGS. 1813 through 1842); Host's TV Resolution Converting Function described in paragraphs [4855] through [4884] (FIGS. 1843 through 1864); Voice Shortcut Recognizing Function described in paragraphs [4885] through [4919] (FIGS. 1865 through 1889); Vital Sign Monitoring Function described in paragraphs [4920] through [5009] (FIGS. 1890a through 1954); Three-Dimensional Map described in (FIGS. 2 and 3); Auto Collision Avoiding Function described in (FIGS. 4 through 7); Remote Controlling System described in (FIG. 8a through FIG. 10); Emergency Landing System described in (FIG. 11 through FIG. 12b); Connection Between Host H And Carrier 300 described in (FIG. 13); 3D Map Data Updating Function described in (FIGS. 16 through 30); Auto Collision Avoiding Function—Other Embodiments described in (FIGS. 31 through 34); Satellite TV Function described in (FIGS. 35 through 50); Wireless Communication Facilitating System described in (FIGS. 51 through 64b); Three-Dimensional Map described in (??); Attached File Emailing Function described in paragraphs [5009.1] through [5009.13] (FIGS. 1955 through 1961); Movie eTicket Function described in paragraphs [5009.14] through [5009.66] (FIGS. 1962 through 2002); Carrier Prepaid eCard Function described in paragraphs [5009.67] through [5009.104] (FIGS. 2003 through 2032); Carrier ePass Function described in paragraphs [5009.105] through [5009.144] (FIGS. 2033 through 2061b); Communication Device 200 Installed In Carrier described in paragraphs [5009.145] and [5009.146] (FIG. 2062); Wireless Communication Facilitating System described in paragraphs [5009.147] through [5009.176] (FIGS. 2063 through 2076b); In-Carrier Notifying Function described in paragraphs [5009.177] through [5009.207] (FIGS. 2077 through 2093); Station Name Notifying Function described in paragraphs [5009.208] through [5009.237] (FIGS. 2094 through 2110); Restaurant eMenu Function described in paragraphs [5009.238] through [5009.280] (FIGS. 2111 through 2144); Geographic Location Recording Function described in paragraphs [5009.281] through [5009.322] (FIGS. 2145 through 2176b); CCD Dictionary Function described in paragraphs [5009.323] through [5009.347] (FIGS. 2177 through 2195b); Schedule Notifying Function described in paragraphs [5009.348] through [5009.374] (FIGS. 2196 through 2215); Customized Device Purchasing System described in paragraphs [5009.375] through [5009.415] (FIGS. 2216 through 2250); Multiple Type TV Program Distributing System described in paragraphs [5009.416] through [5009.446] (FIGS. 2251 through 2274); Multiple TV Screen Displaying Function described in paragraphs [5009.447] through [5009.478] (FIGS. 2275 through 2297); Touch Panel Function described in paragraphs [5009.479] through [5009.504] (FIGS. 2298 through 2315); Communication Device Finding Function described in paragraphs [5009.505] through [5009.516] (FIGS. 2316 through 2322); Carrier Safety Measure Controlling Function described in paragraphs [5009.517] through [5009.551] (FIGS. 2323 through 2342); Product Information Retrieving Function (CCD) described in paragraphs [5009.552] through [5009.580] (FIGS. 2343 through 2360); Product Information Stored Chip Function described in paragraphs [5009.581] through [5009.618] (FIGS. 2361 through 2385); Karaoke Playing Function described in paragraphs [5009.619] through [5009.647] (FIGS. 2386 through 2406); Performing Pattern Identifying Anti-Virus Function described in paragraphs [5009.648] through [5009.670] (FIGS. 2407 through 2421); Continue Enabled Video Game Function described in paragraphs [5009.671] through [5009.693] (FIGS. 2422 through 2436); Resume Enabled Video Game Function described in paragraphs [5009.694] through [5009.716] (FIGS. 2437 through 2451); Signal Forwarding Function described in paragraphs [5009.717] through [5009.745] (FIGS. 2452 through 2472); In-Carrier Auto Implementing Mode Function described in paragraphs [5009.746] through [5009.775] (FIGS. 2473 through 2492); Voice Message Displaying Function described in paragraphs [5009.776] through [5009.796] (FIGS. 2493 through 2503c); Human Toes Displaying Function described in paragraphs [5009.797] through [5009.814] (FIGS. 2504 through 2521); Wrinkles/Muscles Displaying Function described in paragraphs [5009.815] through [5009.856] (FIGS. 2522a through 2552e); Protruded Body Part Displaying Function described in paragraphs [5009.857] through [5009.876] (FIGS. 2553 through 2566b); Satellite TV Program Displaying Function described in paragraphs [5009.877] through [5009.921] (FIGS. 2567 through 2601); Definition of Communication Device 200 described in paragraphs [5009.922] and [5009.923] (no drawings); Remote Parameter Setting Function described in paragraphs [5009.924] through [5009.1017] (FIGS. 2602 through 2682); Multiple Sender's Email Address Function described in paragraphs [5009.1018] through [5009.1035] (FIGS. 2683 through 2695); Multiple Phone Number Function described in paragraphs [5009.1036] through [5009.1055] (FIGS. 2696 through 2709); TV Commercial Customizing Function described in paragraphs [5009.1056] through [5009.1085] (FIGS. 2710 through 2732c); Common Video Game Platform Function described in paragraphs [5009.1086] through [5009.1102] (FIGS. 2733 through 2741); Directory Displaying Function described in paragraphs [5009.1103] through [5009.1130] (FIGS. 2742 through 2761); Directory Customizing Function described in paragraphs [5009.1131] through [5009.1186] (FIGS. 2762 through 2807); Host's Directory Customizing Function described in paragraphs [5009.1187] through [5009.1246] (FIGS. 2808 through 2853); Trash Can Function described in paragraphs [5009.1247] through [5009.1295] (FIGS. 2854 through 2895f); Motion Character Displaying Function described in paragraphs [5009.1296] through [5009.1318] (FIGS. 2896 through 2909); Bookmark Displaying Function described in paragraphs [5009.1319] through [5009.1374] (FIGS. 2910 through 2955); CCD/LCD Function described in paragraphs [5009.1375] through [5009.1387] (FIGS. 2956 through 2959b); Pop Up Window Blocking Function described in paragraphs [5009.1388] through [5009.1401] (FIGS. 2960 through 2965); Map Heading Up Function described in paragraphs [5009.1402] through [5009.1421] (FIGS. 2966 through 2976); Copy Once Function described in paragraphs [5009.1422] through [5009.1443] (FIGS. 2977 through 2991); Copy Restricted Software Integrated Data described in paragraphs [5009.1444] through [5009.1457] (FIGS. 2992 through 2998); Folder Sharing Function described in paragraphs [5009.1458] through [5009.1508] (FIGS. 2999 through 3038c); Email Folder Managing Function described in paragraphs [5009.1509] through [5009.1577] (FIGS. 3039 through 3092e); Power On Auto Software Executing Function described in paragraphs [5009.1578] through [5009.1594] (FIGS. 3093 through 3103); Enhanced TV Remote Controlling Function described in paragraphs [5009.1595] through [5009.1639] (FIGS. 3104 through 3137c); 3 CCD Unit Function described in paragraphs [5009.1640] through [5009.1660] (FIGS. 3138 through 3150c); Multiple Direction Scrolling Function described in paragraphs [5009.1661] through [5009.1762] (FIGS. 3151 through 3238); Radio Frequency Soft Handover Function described in paragraphs [5009.1763] through [5009.1793] (FIGS. 3239 through 3262); Inter Com Function described in paragraphs [5009.1794] through [5009.1816] (FIGS. 3263 through 3277c); Website History Recording Function described in paragraphs [5009.1817] through [5009.1870] (FIGS. 3278 through 3324); Motion Picture Thumbnail Displaying Function described in paragraphs [5009.1871] through [5009.1908] (FIGS. 3325 through 3353b); 2D/3D Map Displaying Function described in paragraphs [5009.1909] through [5009.1952] (FIGS. 3354 through 3380b); Remote Schedule Notifying Function described in paragraphs [5009.1953] through [5009.1975] (FIGS. 3381 through 3393); Remote Email Notifying Function described in paragraphs [5009.1976] through [5009.2000] (FIGS. 3394 through 3406); Remote Document Printing Function described in paragraphs [5009.2001] through [5009.2022] (FIGS. 3407 through 3419b); Anti-virus Protection Identifying Function described in paragraphs [5009.2023] through [5009.2043] (FIGS. 3420 through 3431c); Alphanumeric Phone Number Dialing Function described in paragraphs [5009.2044] through [5009.2076] (FIGS. 3432 through 3453b); Automobile License Number Dialing Function described in paragraphs [5009.2077] through [5009.2109] (FIGS. 3454 through 3475b); Point Card Function described in paragraphs [5009.2110] through [5009.2147] (FIGS. 3476 through 3504c); Display Sharing Function described in paragraphs [5009.2148] through [5009.2169] (FIGS. 3505 through 3516); Email Filtering Function described in paragraphs [5009.2170] through [5009.2212] (FIGS. 3517 through 3549); Received Email Auto Sorting Function described in paragraphs [5009.2213] through [5009.2238] (FIGS. 3550 through 3565b); Sent Email Auto Sorting Function described in paragraphs [5009.2239] through [5009.2264] (FIGS. 3566 through 3581b); Country Name Displaying Function described in paragraphs [5009.2265] through [5009.2286] (FIGS. 3582 through 3595); Email Attached File Splitting Function described in paragraphs [5009.2287] through [5009.2300] (FIGS. 3596 through 3603c); Auto TV Starting Function described in paragraphs [5009.2301] through [5009.2329] (FIGS. 3604 through 3623); Enhanced TV Program Replaying Function (Communication Device 200) described in paragraphs [5009.2330] through [5009.2361] (FIGS. 3624 through 3648b); Enhanced TV Program Replaying Function (Host H) described in paragraphs [5009.2362] through [5009.2400] (FIGS. 3649 through 3680b); Enhanced TV Program Replaying Function (Devices A and B) described in paragraphs [5009.2401] through [5009.2440] (FIGS. 3681 through 3712b); Enhanced TV Program Replaying Function (Host H, and Devices A and B) described in paragraphs [5009.2441] through [5009.2491] (FIGS. 3713 through 3754b); TV Commercial Skipping Function described in paragraphs [5009.2492] through [5009.2516] (FIGS. 3755 through 3772); Timer Schedule Auto Changing Function described in paragraphs [5009.2517] through [5009.2542] (FIGS. 3773 through 3789); Remote Alarm Setting Function described in paragraphs [5009.2543] through [5009.2585] (FIGS. 3789a through 3817b); Current Location Non-notifying Function described in paragraphs [5009.2586] through [5009.2612] (FIGS. 3818 through 3833); Device Remotely Locking Function described in paragraphs [5009.2613] through [5009.2644] (FIGS. 3834 through 3857); EZ Macro Function described in paragraphs [5009.2645] through [5009.2668] (FIGS. 3858 through 3873b); Alcohol Level Identifying Function described in paragraphs [5009.2669] through [5009.2694] (FIGS. 3874 through 3889b); Displayed Visual Data Size Modifying Function described in paragraphs [5009.2695] through [5009.2729] (FIGS. 3890 through 3915); Button Size Changing Function described in paragraphs [5009.2730] through [5009.2758] (FIGS. 3916 through 3937); Epayment Sound Selecting Function described in paragraphs [5009.2759] through [5009.2778] (FIGS. 3938 through 3950c); Multiple TV Program Recording Function described in paragraphs [5009.2779] through [5009.2823] (FIGS. 3951 through 3988); TV Program Data Trashcan Function described in paragraphs [5009.2824] through [5009.2856] (FIGS. 3989 through 4010b); Ereceipt Producing Function described in paragraphs [5009.2857] through [5009.2888] (FIGS. 4011 through 4033); Memo Sharing Function described in paragraphs [5009.2889] through [5009.2930] (FIGS. 4034 through 4064); Selected Function Remotely Freezing Function described in paragraphs [5009.2931] through [5009.2964] (FIGS. 4065 through 4085); Selected Software Remotely Activating Function described in paragraphs [5009.2965] through [5009.2998] (FIGS. 4086 through 4106); Selected Function Remotely Activating Function described in paragraphs [5009.2999] through [5009.3032] (FIGS. 4107 through 4127); Selected Software Remotely Freezing Function described in paragraphs [5009.3033] through [5009.3066] (FIGS. 4128 through 4148); Selected Data Remotely Deleting Function described in paragraphs [5009.3067] through [5009.3100] (FIGS. 4149 through 4169); Web Cash Memory Function described in paragraphs [5009.3101] through [5009.3122] (FIGS. 4170 through 4183b); Keypad Auto Unlocking Function described in paragraphs [5009.3123] through [5009.3145] (FIGS. 4184 through 4199); Voice Recog Sys Auto Unlocking Function described in paragraphs [5009.3146] through [5009.3168] (FIGS. 4200 through 4215); Upgraded Voice Recog Sys Auto Unlocking Function described in paragraphs [5009.3169] through [5009.3192] (FIGS. 4216 through 4231); TV Program Information Displaying Function described in paragraphs [5009.3193] through [5009.3215] (FIGS. 4232 through 4247b); Best Signal Auto Selecting Function described in paragraphs [5009.3216] through [5009.3269] (FIGS. 4248 through 4291); Software Timer Activating Function described in paragraphs [5009.3270] through [5009.3295] (FIGS. 4292 through 4305b); Software Timer Terminating Function described in paragraphs [5009.3296] through [5009.3321] (FIGS. 4306 through 4319b); Software Timer Deleting Function described in paragraphs [5009.3322] through [5009.3347] (FIGS. 4320 through 4333b); TV Phone Recording Function described in paragraphs [5009.3348] through [5009.3381] (FIGS. 4334 through 4358b); Hybrid GPS Function described in paragraphs [5009.3382] through [5009.3421] (FIGS. 4359 through 4381); Elevator Controlling Function described in paragraphs [5009.3422] through

[5009.3447] (FIGS. 4382 through 4397); Device Migrating Function described in paragraphs [5009.3448] through [5009.3509] (FIGS. 4398 through 4445b); Cordless Phone Connecting Function described in paragraphs [5009.3510] through [5009.3547] (FIGS. 4446 through 4474b); Cash Deposit Function described in paragraphs [5009.3548] through [5009.3585] (FIGS. 4475 through 4497d); Highway Fee Auto Paying Function described in paragraphs [5009.3586] through [5009.3616] (FIGS. 4498 through 4518); By Distance Auto Action Function described in paragraphs [5009.3617] through [5009.3639] (FIGS. 4519 through 4532); Emoney Transferring Function described in paragraphs [5009.3640] through [5009.3666] (FIGS. 4533 through 4548c); Coupon Disposing Function described in paragraphs [5009.3667] through [5009.3698] (FIGS. 4549 through 4569); Multiple Device Searching Function described in paragraphs [5009.3699] through [5009.3717] (FIGS. 4570 through 4581b); Battery Meter Notifying Function described in paragraphs [5009.3718] through [5009.3737] (FIGS. 4582 through 4593b); Software Infrared Transmitting Function described in paragraphs [5009.3738] through [5009.3759] (FIGS. 4594 through 4606); Electronic Key Function described in paragraphs [5009.3760] through [5009.3824] (FIGS. 4607 through 4647b); Automobile Status Monitoring Function described in paragraphs [5009.3825] through [5009.3885] (FIGS. 4648 through 4691); Enhanced Business Card Transferring Function described in paragraphs [5009.3886] through [5009.3928] (FIGS. 4692 through 4720c); Removal Media Data Transferring Function described in paragraphs [5009.3929] through [5009.3954] (FIGS. 4721 through 4737c); Audiovisual Data Sharing Function described in paragraphs [5009.3955] through [5009.3992] (FIGS. 4738 through 4763b); Email Attachment Supplementing Function described in paragraphs [5009.3993] through [5009.4012] (FIGS. 4764 through 4775c); Other Device File Emailing Function described in paragraphs [5009.4013] through [5009.4043] (FIGS. 4776 through 4799b); Slide Authoring Function described in paragraphs [5009.4044] through [5009.4082] (FIGS. 4800 through 4828); Remote/Local Credit Card Transaction Function described in paragraphs [5009.4083] through [5009.4119] (FIGS. 4829 through 4855d); Unread Email Sorting Function described in paragraphs [5009.4120] through [5009.4166] (FIGS. 4856 through 4890); TV Program Replying Function described in paragraphs [5009.4167] through [5009.4200] (FIGS. 4891 through 4914); PC Keyboard Function described in paragraphs [5009.4201] through [5009.4212] (FIGS. 4915 through 4920b); Antenna Mark Displaying Function described in paragraphs [5009.4213] through [5009.4228] (FIGS. 4921 through 4928b); Enhanced Caller ID Displaying Function described in paragraphs [5009.4229] through [5009.4264] (FIGS. 4929 through 4951c); Enhanced Call Waiting Function described in paragraphs [5009.4265] through [5009.4300] (FIGS. 4952 through 4974c); Phonebook Auto Icon Displaying Function described in paragraphs [5009.4301] through [5009.4332] (FIGS. 4975 through 4996); One Click Call Back Function described in paragraphs [5009.4333] through [5009.4357] (FIGS. 4997 through 5014); Phone Conversation Storing Function described in paragraphs [5009.4358] through [5009.4386] (FIGS. 5015 through 5031c); Caller ID Requesting Function described in paragraphs [5009.4387] through [5009.4410] (FIGS. 5032 through 5045c); Phone Call Audio Notifying Function described in paragraphs [5009.4411] through [5009.4433] (FIGS. 5046 through 5059c); Entry Phone Function described in paragraphs [5009.4434] through [5009.4459] (FIGS. 5060 through 5074b); FAX Sending/Receiving Function described in paragraphs [5009.4460] through [5009.4505] (FIGS. 5075 through 5108b); Other Device's Phone Book Utilizing Function described in paragraphs [5009.4506] through [5009.4536] (FIGS. 5109 through 5128); Multiple Program Executing Function described in paragraphs [5009.4537] through [5009.4564] (FIGS. 5129 through 5148); Removal Medium Operating Function described in paragraphs [5009.4565] through [5009.4601] (FIGS. 5149 through 5178); Removal Medium Audiovisual Data Recording Function described in paragraphs [5009.4602] through [5009.4629] (FIGS. 5178a through 5199); Nearest Printer Selecting Function described in paragraphs [5009.4630] through [5009.4656] (FIGS. 5200 through 5216d); In-Cabin Com Function described in paragraphs [5009.4657] through [5009.4680] (FIGS. 5217 through 5233c); Carrier Current Condition Notifying Function described in paragraphs [5009.4681] through [5009.4710] (FIGS. 5234 through 5251b); Virtual Space Creating Function described in paragraphs [5009.4711] through [5009.4743] (FIGS. 5252 through 5274); Security Camera Function described in paragraphs [5009.4744] through [5009.4778] (FIGS. 5275 through 5295); Remote Camera Controlling Function described in paragraphs [5009.4779] through [5009.4820] (FIGS. 5296 through 5326); Day/Night Camera Function described in paragraphs [5009.4821] through [5009.4851] (FIGS. 5327 through 5346); Multiple Wireless Signal Handover Function described in paragraphs [5009.4852] through [5009.4897] (FIGS. 5347 through 5365); Multiple Tab Web Browsing Function described in paragraphs [5009.4898] through [5009.4926] (FIGS. 5366 through 5388); Multiple Tab Visual Data Viewing Function described in paragraphs [5009.4927] through [5009.4955] (FIGS. 5389 through 5411); Multiple Tab Document Data Viewing Function described in paragraphs [5009.4956] through [5009.4984] (FIGS. 5412 through 5434); Multiple Tab Email Data Viewing Function described in paragraphs [5009.4985] through [5009.5013] (FIGS. 5435 through 5457); Convenient TV Remote Controlling Function described in paragraphs [5009.5014] through [5009.5034] (FIGS. 5458 through 5471); Form Auto Filling Function described in paragraphs [5009.5035] through [5009.5072] (FIGS. 5472 through 5495e); Hybrid Carrier Function described in paragraphs [5009.5073] through [5009.5105] (FIGS. 5496 through 5522b); Carrier Current Condition Monitoring Function described in paragraphs [5009.5106] through [5009.5141] (FIGS. 5523 through 5546c); Memory Defragmenting Function described in paragraphs [5009.5142] through [5009.5175] (FIGS. 5547 through 5568); Memory Formatting Function described in paragraphs [5009.5176] through [5009.5209] (FIGS. 5569 through 5590); Memory Partitioning Function described in paragraphs [5009.5210] through [5009.5243] (FIGS. 5591 through 5612); TV Phone Pausing Function described in paragraphs [5009.5244] through [5009.5268] (FIGS. 5613 through 5629); Reflecting Object Displaying Function described in paragraphs [5009.5269] through [5009.5294] (FIGS. 5630 through 5648c); Alternative TV Program Receiving Function described in paragraphs [5009.5295] through [5009.5325] (FIGS. 5649 through 5670c); Alternative Radio Program Receiving Function described in paragraphs [5009.5326] through [5009.5356] (FIGS. 5671 through 5692c); Audiovisual Auto Fading Function described in paragraphs [5009.5357] through [5009.5377] (FIGS. 5693 through 5706); Audio Auto Fading Function described in paragraphs [5009.5378] through [5009.5398] (FIGS. 5707 through 5720); Video-In-Video Displaying Function described in paragraphs [5009.5399] through [5009.5431] (FIGS. 5721 through 5747b); Pre-Installed Item Purchasing Function described in paragraphs [5009.5432] through [5009.5470] (FIGS. 5748 through 5775b); Multiple CPU Function described in paragraphs [5009.5471] through [5009.5476] (FIGS. 5776 and 5777); Radio Music Downloading Function described in paragraphs [5009.5477] through [5009.5516] (FIGS. 5778 through 5807); File Auto Saving Function described in paragraphs [5009.5517] through [5009.5559] (FIGS. 5808 through 5837b); TV Tuner Function described in paragraphs [5009.5560] through [5009.5600] (FIGS. 5838 through 5866); GPS Receiver's Log Function described in paragraphs [5009.5601] through [5009.5629] (FIGS. 5867 through 5884b); Remote Room Light Controlling Function described in paragraphs [5009.5630] through [5009.5662] (FIGS. 5885 through 5906b); Remote Kitchen Stove Controlling Function described in paragraphs [5009.5663] through [5009.5695] (FIGS. 5907 through 5928b); Remote Refrigerator Controlling Function described in paragraphs [5009.5696] through [5009.5728] (FIGS. 5929 through 5950b); Remote Washing Machine Controlling Function described in paragraphs [5009.5729] through [5009.5761] (FIGS. 5951 through 5972b); Remote Faucet Controlling Function described in paragraphs [5009.5762] through [5009.5794] (FIGS. 5973 through 5994b); Remote Door Lock Controlling Function described in paragraphs [5009.5795] through [5009.5827] (FIGS. 5995 through 6016b); Remote Air Conditioner Controlling Function described in paragraphs [5009.5828] through [5009.5860] (FIGS. 6017 through 6038b); Remote Vending Machine Controlling Function described in paragraphs [5009.5861] through [5009.5893] (FIGS. 6039 through 6060b); Remote Video Recorder Controlling Function described in paragraphs [5009.5894] through [5009.5926] (FIGS. 6061 through 6082b); Remote Printer Controlling Function described in paragraphs [5009.5927] through [5009.5959] (FIGS. 6083 through 6104b); Remote Camera Controlling Function described in paragraphs [5009.5960] through [5009.5992] (FIGS. 6105 through 6126b); Remote TV Tuner Controlling Function described in paragraphs [5009.5993] through [5009.6025] (FIGS. 6127 through 6148b); Remote Radio Tuner Controlling Function described in paragraphs [5009.6026] through [5009.6058] (FIGS. 6149 through 6170b); Remote Computer Controlling Function described in paragraphs [5009.6059] through [5009.6091] (FIGS. 6171 through 6192b); Remote Carrier Controlling Function described in paragraphs [5009.6092] through [5009.6124] (FIGS. 6193 through 6214b); Remote Food Processor Controlling Function described in paragraphs [5009.6125] through [5009.6157] (FIGS. 6215 and 6236b); Remote Dryer Controlling Function described in paragraphs [5009.6158] through [5009.6190] (FIGS. 6237 and 6258b); Remote Rice Cooker Controlling Function described in paragraphs [5009.6191] through [5009.6223] (FIGS. 6259 and 6280b); Remote Sound Outputting Device Controlling Function described in paragraphs [5009.6224] through [5009.6256] (FIGS. 6281 and 6302b); Remote Vacuum Cleaner Controlling Function described in paragraphs [5009.6257] through [5009.6289] (FIGS. 6303 and 6324b); Remote FAX Machine Controlling Function described in paragraphs [5009.6290] through [5009.6322] (FIGS. 6325 and 6346b); Remote Copying Machine Controlling Function described in paragraphs [5009.6323] through [5009.6355] (FIGS. 6347 and 6368b); Remote Coffee Maker Controlling Function described in paragraphs [5009.6356] through [5009.6388] (FIGS. 6369 and 6390b); Remote Scanner Controlling Function described in paragraphs [5009.6389] through [5009.6421] (FIGS. 6391 and 6412b); Remote Clothes Iron Controlling Function described in paragraphs [5009.6422] through [5009.6454] (FIGS. 6413 and 6434b); Remote Escalator Controlling Function described in paragraphs [5009.6455] through [5009.6487] (FIGS. 6435 and 6456b); Vending Machine Accessing Function described in paragraphs [5009.6488] through [5009.6527] (FIGS. 6457 through 6485d); Audiovisual Data Shuffling Function described in paragraphs [5009.6528] through [5009.6551] (FIGS. 6486 through 6503b); Unknown File Icon Displaying Function described in paragraphs [5009.6552] through [5009.6575] (FIGS. 6504 through 6521c); Audiovisual Document Producing Function described in paragraphs [5009.6576] through [5009.6601] (FIGS. 6522 through 6539b); Audiovisual Data Searching Function described in paragraphs [5009.6602] through [5009.6626] (FIGS. 6540 through 6558b); Finger Print Log-on Function described in paragraphs [5009.6627] through [5009.6645] (FIGS. 6559 through 6571c); Voice Print Log-on Function described in paragraphs [5009.6646] through [5009.6663] (FIGS. 6572 through 6583c); Finger Print Screen Saver Deactivating Function described in paragraphs [5009.6664] through [5009.6682] (FIGS. 6584 through 6596c); Voice Print Screen Saver Deactivating Function described in paragraphs [5009.6683] through [5009.6700] (FIGS. 6597 through 6608c); Finger Print Folder Accessing Function described in paragraphs [5009.6701] through [5009.6719] (FIGS. 6609 through 6621c); Voice Print Folder Accessing Function described in paragraphs [5009.6720] through [5009.6737] (FIGS. 6622 through 6633c); Finger Print File Accessing Function described in paragraphs [5009.6738] through [5009.6756] (FIGS. 6634 through 6646c); Voice Print File Accessing Function described in paragraphs [5009.6757] through [5009.6774] (FIGS. 6647 through 6658c); Finger Print Internet Accessing Function described in paragraphs [5009.6775] through [5009.6793] (FIGS. 6659 through 6671c); Voice Print Internet Accessing Function described in paragraphs [5009.6794] through [5009.6811] (FIGS. 6672 through 6683c); Finger Print PC Log-on Function described in paragraphs [5009.6812] through [5009.6838] (FIGS. 6684 through 6703b); Voice Print PC Log-on Function described in paragraphs [5009.6839] through [5009.6864] (FIGS. 6704 through 6722b); Finger Print PC Screen Saver Deactivating Function described in paragraphs [5009.6865] through [5009.6891] (FIGS. 6723 through 6742b); Voice Print PC Screen Saver Deactivating Function described in paragraphs [5009.6892] through [5009.6917] (FIGS. 6743 through 6761b); Finger Print PC Folder Accessing Function described in paragraphs [5009.6918] through [5009.6944] (FIGS. 6762 through 6781b); Voice Print PC Folder Accessing Function described in paragraphs [5009.6945] through [5009.6970] (FIGS. 6782 through 6800b); Finger Print PC File Accessing Function described in paragraphs [5009.6971] through [5009.6997] (FIGS. 6801 through 6820b); Voice Print PC File Accessing Function described in paragraphs [5009.6998] through [5009.7023] (FIGS. 6821 through 6839b); Finger Print PC Internet Accessing Function described in paragraphs [5009.7024] through [5009.7050] (FIGS. 6840 through 6859b); Voice Print PC Internet Accessing Function described in paragraphs [5009.7051] through [5009.7076] (FIGS. 6860 through 6878b); Shock Proof Memory Function described in paragraphs [5009.7077] through [5009.7093] (FIGS. 6879 through 6889b); Remote Audiovisual Device Controlling Function described in paragraphs [5009.7094] through [5009.7133] (FIGS. 6890 through 6916); Direct TV-Audio Phone Switching Function described in paragraphs [5009.7134] through [5009.7157] (FIGS. 6917 through 6932b); Audiovisual Data Downloading Function described in paragraphs [5009.7158] through [5009.7218] (FIGS. 6933 through 6972); Audio Data Downloading Function described in paragraphs [5009.7219] through [5009.7279] (FIGS. 6973 through 7012); Self-Active Encrypted Image Reader Function described in paragraphs [5009.7280] through [5009.7301] (FIGS. 7013 through 7028c); Robot Remote Controlling Function described in paragraphs [5009.7302] through [5009.7371] (FIGS. 7029 through 7071b); Home Page Displaying Function described in paragraphs [5009.7372] through [5009.7396] (FIGS. 7072 through 7090); Multiple OS Operating Function described in paragraphs [5009.7397] through [5009.7442] (FIGS. 7091 through 7130c); Audiovisual Conversation Data Forwarding Function described in paragraphs [5009.7443] through [5009.7465] (FIGS. 7131 through 7146b); Audio Conversation Data Forwarding Function described in paragraphs [5009.7466] through [5009.7488] (FIGS. 7147 through 7162b); Phone Call Auto Forwarding Function described in paragraphs [5009.7489] through [5009.7514] (FIGS. 7163 through 7180c); Wireless Communication Method Switching Function described in paragraphs [5009.7515] through [5009.7535] (FIGS. 7181 through 7194e); Drafted Email Viewing Function described in paragraphs [5009.7536] through [5009.7585] (FIGS. 7195 through 7236); Email Replying Function described in paragraphs [5009.7586] through [5009.7617] (FIGS. 7237 through 7262b); Attached File Editing Function described in paragraphs [5009.7618] through [5009.7649] (FIGS. 7263 through 7288b); Email Audiovisual Data Auto Blocking Function described in paragraphs [5009.7650] through [5009.7673] (FIGS. 7289 through 7306); HDD Stored TV Program Replaying Function described in paragraphs [5009.7674] through [5009.7695] (FIGS. 7307 through 7322b); Cooking Menu Auto Implementing Function described in paragraphs [5009.7696] through [5009.7722] (FIGS. 7323 through 7343b); Micro Wave Oven Auto Alarm Function described in paragraphs [5009.7723] through [5009.7776] (FIGS. 7344 through 7387b); Oven Temperature Remote Controlling Function described in paragraphs [5009.7777] through [5009.7830] (FIGS. 7388 through 7431c); Audio Amplifying Function described in paragraphs [5009.7831] through [5009.7848] (FIGS. 7432 through 7443b); Calorie Calculating Function described in paragraphs [5009.7849] through [5009.7868] (FIGS. 7444 through 7457b); Sickness Identifying Function described in paragraphs [5009.7869] through [5009.7902] (FIGS. 7458 through 7481b); Weather Hazard Auto Notifying Function described in paragraphs [5009.7903] through [5009.7955] (FIGS. 7482 through 7517d); Phone Call Auto Forwarding Function described in paragraphs [5009.7956] through [5009.7981] (FIGS. 7518 through 7535c); Multiple Massaging Function described in paragraphs [5009.7982] through [5009.8022] (FIGS. 7536 through 7566); Microscope Function described in paragraphs [5009.8023] through [5009.8097] (FIGS. 7567 through 7629); Door Auto Lock/Unlock Function described in paragraphs [5009.8098] through [5009.8139] (FIGS. 7630 through 7658b); Door Auto Close/Open Function described in paragraphs [5009.8140] through [5009.8181] (FIGS. 7659 through 7687b); Room Light Auto On/Off Function described in paragraphs [5009.8182] through [5009.8223] (FIGS. 7688 through 7716b); Air Conditioner Auto On/Off Function described in paragraphs [5009.8224] through [5009.8265] (FIGS. 7717 through 7745b); Heater Auto On/Off Function described in paragraphs [5009.8266] through [5009.8307] (FIGS. 7746 through 7774b); Faucet Auto On/Off Function described in paragraphs [5009.8308] through [5009.8349] (FIGS. 7775 through 7803b); Sound Outputting Device Auto On/Off Function described in paragraphs [5009.8350] through [5009.8391] (FIGS. 7804 through 7832b); Vein Print Log-on Function described in paragraphs [5009.8392] through [5009.8410] (FIGS. 7833 through 7845c); Vein Print Screen Saver Deactivating Function described in paragraphs [5009.8411] through [5009.8429] (FIGS. 7846 through 7858c); Vein Print Folder Accessing Function described in paragraphs [5009.8430] through [5009.8448](FIGS. 7859 through 7871c); Vein Print File Accessing Function described in paragraphs [5009.8449] through [5009.8467] (FIGS. 7872 through 7884c); Vein Print Internet Accessing Function described in paragraphs [5009.8468] through [5009.8486] (FIGS. 7885 through 7897c); Vein Print PC Log-on Function described in paragraphs [5009.8487] through [5009.8513] (FIGS. 7898 through 7917b); Vein Print PC Screen Saver Deactivating Function described in paragraphs [5009.8514] through [5009.8540] (FIGS. 7918 through 7937b); Vein Print PC Folder Accessing Function described in paragraphs [5009.8541] through [5009.8567] (FIGS. 7938 through 7957b); Vein Print PC File Accessing Function described in paragraphs [5009.8568] through [5009.8594] (FIGS. 7958 through 7977b); Vein Print PC Internet Accessing Function described in paragraphs [5009.8595] through [5009.8621] (FIGS. 7978 through 7997b); Ringtone Auto Updating Function described in paragraphs [5009.8622] through [5009.8643] (FIGS. 7998 through 8013b); Time Limited Current Location Identifying Function described in paragraphs [5009.8644] through [5009.8673] (FIGS. 8014 through 8035b); In Carrier Message Inserting Function described in paragraphs [5009.8674] through [5009.8695] (FIGS. 8036 through 8050b); Electric Cable Networking Function described in paragraphs [5009.8696] through [5009.8707] (FIGS. 8051 through 8057); Shoe Sole Pressure Adjusting Function described in paragraphs [5009.8708] through [5009.8741] (FIGS. 8058 through 8080b); Finger Print Removal Media Accessing Function described in paragraphs [5009.8742] through [5009.8762] (FIGS. 8081 through 8095b); Voice Print Removal Media Accessing Function described in paragraphs [5009.8763] through [5009.8783] (FIGS. 8096 through 8110b); Vein Print Removal Media Accessing Function described in paragraphs [5009.8784] through [5009.8804] (FIGS. 8111 through 8125b); Finger Print PC Removal Media Accessing Function described in paragraphs [5009.8805] through [5009.8833] (FIGS. 8126 through 8145b); Voice Print PC Removal Media Accessing Function described in paragraphs [5009.8834] through [5009.8862] (FIGS. 8146 through 8165b); Vein Print PC Removal Media Accessing Function described in paragraphs [5009.8863] through [5009.8891] (FIGS. 8166 through 8185b); Printer Function described in paragraphs [5009.8892] through [5009.8967] (FIGS. 8186 through 8245f); Scanner Function described in paragraphs [5009.8968] through [5009.9016] (FIGS. 8246 through 8284b); Multiple Signal Transferring Function described in paragraphs [5009.9017] through [5009.9205] (FIGS. 8285 through 8453); Free Access Point Function described in paragraphs [5009.9206] through [5009.9245] (FIGS. 8454 through 8482); Partial BCC Email Function described in paragraphs [5009.9246] through [5009.9273] (FIGS. 8483 through 8504b); Noise Reversing Function described in paragraphs [5009.9274] through [5009.9291] (FIGS. 8505 through 8516); Door Status Sensing Function described in paragraphs [5009.9292] through [5009.9345] (FIGS. 8517 through 8557); Drawer Status Sensing Function described in paragraphs [5009.9346] through [5009.9399] (FIGS. 8558 through 8598); Window Status Sensing Function described in paragraphs [5009.9400] through [5009.9453] (FIGS. 8599 through 8639); Curtain Status Sensing Function described in paragraphs [5009.9454] through [5009.9509] (FIGS. 8640 through 8680); Gate Status Sensing Function described in paragraphs [5009.9510] through [5009.9563] (FIGS. 8681 through 8721); Stop Watch Function described in paragraphs [5009.9564] through [5009.9584] (FIGS. 8722 through 8736b); Decrementing Time Function described in paragraphs [5009.9585] through [5009.9607] (FIGS. 8737 through 8753b); Energy Efficient Multiple CPU Function described in paragraphs [5009.9608] through [5009.9636] (FIGS. 8754 through 8776b); Content Notifying Function described in paragraphs [5009.9637] through [5009.9681] (FIGS. 8777 through 8809); Virtual Tilting Function described in paragraphs [5009.9682] through [5009.9720] (FIGS. 8810 through 8840); Virtual Vehicle Tilting Function described in paragraphs [5009.9721] through [5009.9758] (FIGS. 8841 through 8871); Device Approach Notifying Function described in paragraphs [5009.9759] through [5009.9801] (FIGS. 8872 through 8904); Clock Alarm Snooze Function described in paragraphs [5009.9802] through [5009.9829] (FIGS. 8905 through 8926); News Auto Outputting Function described in paragraphs [5009.9830] through [5009.9867] (FIGS. 8927 through 8958b); Advertisement Auto Outputting Function described in paragraphs [5009.9868] through [5009.9905] (FIGS. 8959 through 8990b); Online RPG Function described in paragraphs [5009.9906] through [5009.10028] (FIGS. 8991 through 9098b); Inter Device Distance Notifying Function described in paragraphs [5009.10029] through [5009.10065] (FIGS. 9099 through 9126); Link Embedded Motion Picture Displaying Function described in paragraphs [5009.10066] through [5009.10089] (FIGS. 9127 through 9141); Audiovisual Meta Data Producing Function described in paragraphs [5009.10090] through [5009.10128] (FIGS. 9142 through 9171c); Audiovisual Highlight Producing Function described in paragraphs [5009.10129] through [5009.10163] (FIGS. 9172 through 9197); Enhanced Audiovisual Highlight Producing Function described in paragraphs [5009.10164] through [5009.10196] (FIGS. 9198 through 9221); Wireless Power Off Function described in paragraphs [5009.10197] through [5009.10227] (FIGS. 9222 through 9240); Screen Layout Changing Function described in paragraphs [5009.10228] through [5009.10255] (FIGS. 9241 through 9258b); Face Feature Log-on Function described in paragraphs [5009.10256] through [5009.10273] (FIGS. 9259 through 9270c); Face Feature Screen Saver Deactivating Function described in paragraphs [5009.10274] through [5009.10291] (FIGS. 9271 through 9282c); Face Feature Folder Accessing Function described in paragraphs [5009.10292] through [5009.10309] (FIGS. 9283 through 9294c); Face Feature File Accessing Function described in paragraphs [5009.10310] through [5009.10327](FIGS. 9295 through 9306c); Face Feature Internet Accessing Function described in paragraphs [5009.10328] through [5009.10345] (FIGS. 9307 through 9318c); Face Feature PC Log-on Function described in paragraphs [5009.10346] through [5009.10371] (FIGS. 9319 through 9337b); Face Feature PC Screen Saver Deactivating Function described in paragraphs [5009.10372] through [5009.10397] (FIGS. 9338 through 9356b); Face Feature PC Folder Accessing Function described in paragraphs [5009.10398] through [5009.10423] (FIGS. 9357 through 9375b); Face Feature PC File Accessing Function described in paragraphs [5009.10424] through [5009.10449] (FIGS. 9376 through 9394b); Face Feature PC Internet Accessing Function described in paragraphs [5009.10450] through [5009.10475] (FIGS. 9395 through 9413b); Face Feature Removal Media Accessing Function described in paragraphs [5009.10476] through [5009.10496] (FIGS. 9414 through 9428b); Face Feature PC Removal Media Accessing Function described in paragraphs [5009.10497] through [5009.10524] (FIGS. 9429 through 9448b); Security Formatted Removal Media Function described in paragraphs [5009.10525] through [5009.10545] (FIGS. 9449 through 9463b); Lite Security Formatted Removal Media Function described in paragraphs [5009.10546] through [5009.10568] (FIGS. 9464 through 9480b); Security Formatted Folder Function described in paragraphs [5009.10569] through [5009.10605] (FIGS. 9481 through 9509b); Host Host Security Formatted Folder Function described in paragraphs [5009.10606] through [5009.10631] (FIGS. 9510 through 9528); Email Security Formatted Folder Function described in paragraphs [5009.10632] through [5009.10668] (FIGS. 9529 through 9557b); Host Email Security Formatted Folder Function described in paragraphs [5009.10669] through [5009.10694] (FIGS. 9558 through 9576); Secured Email Sending Function described in paragraphs [5009.10695] through [5009.10726] (FIGS. 9577 through 9599c); Secured Email Receiving Function described in paragraphs [5009.10727] through [5009.10746] (FIGS. 9600 through 9613); Received Email Security Auto Sorting Function described in paragraphs [5009.10747] through [5009.10770] (FIGS. 9614 through 9629b); Secured Email Opening Function described in paragraphs [5009.10771] through [5009.10793] (FIGS. 9630 through 9645b); Secured Email Attached File Opening Function described in paragraphs [5009.10794] through [5009.10818] (FIGS. 9646 through 9663b); Secured Email Attached File Deleting Function described in paragraphs [5009.10819] through [5009.10845] (FIGS. 9664 through 9679b); Unsafe Email Host Handled Function described in paragraphs [5009.10846] through [5009.10873] (FIGS. 9680 through 9701b); Unsafe Attached File Host Handled Function described in paragraphs [5009.10874] through [5009.10901] (FIGS. 9702 through 9723c); Com Stored Email Viewing Function described in paragraphs [5009.10902] through [5009.10925] (FIGS. 9724 through 9741c); Non-secured Email Forwarding Function described in paragraphs [5009.10926] through [5009.10950] (FIGS. 9742 through 9759b); Electronic Money Transferring Function described in paragraphs [5009.10951] through [5009.10993] (FIGS. 9760 through 9790b); Electronic Money Time Identified Transferring Function described in paragraphs [5009.10994] through [5009.11051] (FIGS. 9791 through 9835b); Electronic Money Repeatedly Transferring Function described in paragraphs [5009.11052] through [5009.11117] (FIGS. 9836 through 9888b); Electronic Money Transfer Canceling Function described in paragraphs [5009.11118] through [5009.11194] (FIGS. 9889 through 9952b); Electronic Money Email Transferring Function described in paragraphs [5009.11195] through [5009.11238] (FIGS. 9953 through 9985c); Money Email Time Identified Transferring Function described in paragraphs [5009.11239] through [5009.11286] (FIGS. 9986 through 10022c); Money Email Repeatedly Transferring Function described in paragraphs [5009.11287] through [5009.11338] (FIGS. 10023 through 10063c); Electronic Money Email Transfer Canceling Function described in paragraphs [5009.11339] through [5009.11405] (FIGS. 10064 through 10119c); Address Book Administrating Function described in paragraphs [5009.11406] through [5009.11451] (FIGS. 10120 through 10152b); File Synchronizing Function described in paragraphs [5009.11452] through [5009.11578] (FIGS. 10153 through 10263b); Folder Synchronizing Function described in paragraphs [5009.11579] through [5009.11671] (FIGS. 10264 through 10342b); Area Dependent Software Activating Function described in paragraphs [5009.11672] through [5009.11702] (FIGS. 10343 through 10366b); Area Dependent Message Displaying Function described in paragraphs [5009.11703] through [5009.11730] (FIGS. 10367 through 10388); Visible Light Schedule Communicating Function described in paragraphs [5009.11731] through [5009.11796] (FIGS. 10389 through 10437b); Visible Light Web Address Communicating Function described in paragraphs [5009.11797] through [5009.11862] (FIGS. 10438 through 10486b); Visible Light Software Program Communicating Function described in paragraphs [5009.11863] through [5009.11928] (FIGS. 10487 through 10535b); Visible Light Restaurant Menu Communicating Function described in paragraphs [5009.11929] through [5009.11994] (FIGS. 10536 through 10584b); Visible Light TV Listing Communicating Function described in paragraphs [5009.11995] through [5009.12060] (FIGS. 10585 through 10633b); Visible Light Movie Listing Communicating Function described in paragraphs [5009.12061] through [5009.12126] (FIGS. 10634 through 10682b); Visible Light Product Advertisement Communicating Function described in paragraphs [5009.12127] through [5009.12192] (FIGS. 10683 through 10731b); Visible Light Message Communicating Function described in paragraphs [5009.12193] through [5009.12258] (FIGS. 10732 through 10780b); Visible Light Visual Clip Communicating Function described in paragraphs [5009.12259] through [5009.12324] (FIGS. 10781 through 10829b); Visible Light Weather Forecast Communicating Function described in paragraphs [5009.12325] through [5009.12390] (FIGS. 10830 through 10878b); Visible Light News Clip Communicating Function described in paragraphs [5009.12391] through [5009.12456] (FIGS. 10879 through 10927b); Visible Light Map Clip Communicating Function described in paragraphs [5009.12457] through [5009.12522] (FIGS. 10928 through 10976b); File Thumbnail Preview Function described in paragraphs [5009.12523] through [5009.12555] (FIGS. 10977 through 11002b); Taxi Fare Credit Card Payment Function described in paragraphs [5009.12556] through [5009.12632] (FIGS. 11003 through 11067); Taxi Fare Electronic Money Payment Function described in paragraphs [5009.12633] through [5009.12712] (FIGS. 11068 through 11132); Taxi Destination Identifying Function described in paragraphs [5009.12713] through [5009.12783] (FIGS. 11133 through 11194); Taxi Destination Map Displaying Function described in paragraphs [5009.12784] through [5009.12860] (FIGS. 11195 through 11262); QR Code Schedule Communicating Function described in paragraphs [5009.12861] through [5009.12906] (FIGS. 11263 through 11298b); QR Code Web Address Communicating Function described in paragraphs [5009.12907] through [5009.12952] (FIGS. 11299 through 11334b); QR Code Software Program Communicating Function described in paragraphs [5009.12953] through [5009.12998] (FIGS. 11335 through 11370b); QR Code Restaurant Menu Communicating Function described in paragraphs [5009.12999] through [5009.13044] (FIGS. 11371 through 11406b); QR Code TV Listing Communicating Function described in paragraphs [5009.13045] through [5009.13090] (FIGS. 11407 through 11442b); QR Code Movie Listing Communicating Function described in paragraphs [5009.13091] through [5009.13136] (FIGS. 11443 through 11478b); QR Code Product Advertisement Communicating Function described in paragraphs [5009.13137] through [5009.13182] (FIGS. 11479 through 11514b); QR Code Message Communicating Function described in paragraphs [5009.13183] through [5009.13228] (FIGS. 11515 through 11550b); QR Code Visual Clip Communicating Function described in paragraphs [5009.13229] through [5009.13274] (FIGS. 11551 through 11586b); QR Code Weather Forecast Communicating Function described in paragraphs [5009.13275] through [5009.13320] (FIGS. 11587 through 11622b); QR Code News Clip Communicating Function described in paragraphs [5009.13321] through [5009.13366] (FIGS. 11623 through 11658b); QR Code Map Clip Communicating Function described in paragraphs [5009.13367] through [5009.13412] (FIGS. 11659 through 11694b); QR Code Software Activating Function described in paragraphs [5009.13413] through [5009.13458] (FIGS. 11695 through 11730b); RFID Schedule Communicating Function described in paragraphs [5009.13459] through [5009.13508] (FIGS. 11731 through 11770b); RFID Web Address Communicating Function described in paragraphs [5009.13509] through [5009.13558] (FIGS. 11771 through 11810b); RFID Software Program Communicating Function described in paragraphs [5009.13559] through [5009.13608] (FIGS. 11811 through 11850b); RFID Restaurant Menu Communicating Function described in paragraphs [5009.13609] through [5009.13658] (FIGS. 11851 through 11890b); RFID TV Listing Communicating Function described in paragraphs [5009.13659] through [5009.13708] (FIGS. 11891 through 11930b); RFID Movie Listing Communicating Function described in paragraphs [5009.13709] through [5009.13758] (FIGS. 11931 through 11970b); RFID Product Advertisement Communicating Function described in paragraphs [5009.13759] through [5009.13808] (FIGS. 11971 through 12010b); RFID Message Communicating Function described in paragraphs [5009.13809] through [5009.13858] (FIGS. 12011 through 12050b); RFID Visual Clip Communicating Function described in paragraphs [5009.13859] through [5009.13908] (FIGS. 12051 through 12090b); RFID Weather Forecast Communicating Function described in paragraphs [5009.13909] through [5009.13958] (FIGS. 12091 through 12130b); RFID News Clip Communicating Function described in paragraphs [5009.13959] through [5009.14008] (FIGS. 12131 through 12170b); RFID Map Clip Communicating Function described in paragraphs [5009.14009] through [5009.14058] (FIGS. 12171 through 12210b); RFID Software Activating Function described in paragraphs [5009.14059] through [5009.14108] (FIGS. 12211 through 12250b); RFID Software Auto Activating Function described in paragraphs [5009.14109] through [5009.14158] (FIGS. 12251 through 12290b); Carrier Arrival Time Displaying Function described in paragraphs [5009.14159] through [5009.14283] (FIGS. 12291 through 12401); Multiple Audio Outputting Function described in paragraphs [5009.14284] through [5009.14310] (FIGS. 12402 through 12419); Closest Device Notifying Function described in paragraphs [5009.14311] through [5009.14416] (FIGS. 12420 through 12515); Print Screen Function described in paragraphs [5009.14417] through [5009.14474] (FIGS. 12516 through 12559b); Caller Answering Machine Activating Function described in paragraphs [5009.14475] through [5009.14513] (FIGS. 12560 through 12587); Audiovisual Answering Machine Function described in paragraphs [5009.14514] through [5009.14546] (FIGS. 12588 through 12611); Answering Machine Message Forwarding Function described in paragraphs [5009.14547] through [5009.14607] (FIGS. 12612 through 12657); Area Map Displaying Function described in paragraphs [5009.14608] through [5009.14679] (FIGS. 12658 through 12721b); Road Map Displaying Function described in paragraphs [5009.14680] through [5009.14752] (FIGS. 12722 through 12785b); Email Reading Function described in paragraphs [5009.14753] through [5009.14781] (FIGS. 12786 through 12805c); Stand Alone Email Function described in paragraphs [5009.14782] through [5009.14850] (FIGS. 12806 through 12857b); TV Seamless Viewing Function described in paragraphs [5009.14851] through [5009.14896] (FIGS. 12858 through 12895); Multiple Movable Tab Web Browsing Function described in paragraphs [5009.14897] through [5009.14975] (FIGS. 12896 through 12966); Multiple Movable Tab Visual Data Viewing Function described in paragraphs [5009.14976] through [5009.15054] (FIGS. 12967 through 13037); Multiple Movable Tab Document Data Viewing Function described in paragraphs [5009.15055] through [5009.15133] (FIGS. 13038 through 13108); Multiple Movable Tab Email Data Viewing Function described in paragraphs [5009.15134] through [5009.15212] (FIGS. 13109 through 13179); Lost Com Device Memory Erasing/Rescuing Function described in paragraphs [5009.15213] through [5009.15275] (FIGS. 13180 through 13231c); Lost Com Device Beaconing Function described in paragraphs [5009.15276] through [5009.15353] (FIGS. 13232 through 13296); Area&Country Name Displaying Function described in paragraphs [5009.15354] through [5009.15437] (FIGS. 13297 through 13371); 3D Desktop Function described in paragraphs [5009.15438] through [5009.15536] (FIGS. 13372 through 13457); Carrier Auto Announcing Function described in paragraphs [5009.15537] through [5009.15586] (FIGS. 13458 through 13497b); Virtual Folder Displaying Function described in paragraphs [5009.15587] through [5009.15647] (FIGS. 13498 through 13548b); In-carrier Location Notifying Function described in paragraphs [5009.15648] through [5009.15703] (FIGS. 13549 through 13595c); Address Map Auto Displaying Function described in paragraphs [5009.15704] through [5009.15771] (FIGS. 13596 through 13650c); Brain Wave Device Controlling Function described in paragraphs [5009.15772] through [5009.15806] (FIGS. 13651 through 13679b); Brain Wave Sentence Composing Function described in paragraphs [5009.15807] through [5009.15829] (FIGS. 13680 through 13696); Wheel Standing Function described in paragraphs [5009.15830] through [5009.15858] (FIGS. 13697 through 13719); Robot Body Balancing Function described in paragraphs [5009.15859] through [5009.15905] (FIGS. 13720 through 13760); Robot Leg Balancing Function described in paragraphs [5009.15906] through [5009.15952] (FIGS. 13761 through 13801); Robot Head Balancing Function described in paragraphs [5009.15953] through [5009.15999] (FIGS. 13802 through 13842); Robot Upper Body Balancing Function described in paragraphs [5009.16000] through [5009.16045] (FIGS. 13843 through 13883); Digital Television Function described in paragraphs [5009.16046] through [5009.16075] (FIGS. 13884 through 13906); Total Price Calculating Function described in paragraphs [5009.16076] through [5009.16166] (FIGS. 13907 through 13985c); Brain Wave Carrier Controlling Function described in paragraphs [5009.16167] through [5009.16202] (FIGS. 13986 through 14015b); Electronic Billboard Controlling Function described in paragraphs [5009.16203] through [5009.16323] (FIGS. 14016 through 14123e); Common Phone Number Function described in paragraphs [5009.16324] through [5009.16424] (FIGS. 14124 through 14212c); Hybrid Common Phone Number Function described in paragraphs [5009.16425] through [5009.16525] (FIGS. 14213 through 14301c); Ringtone Volume Auto Adjusting Function described in paragraphs [5009.16526] through [5009.16547] (FIGS. 14302 through 14317b); Ringtone Type Auto Selecting Function described in paragraphs [5009.16548] through [5009.16575] (FIGS. 14318 through 14339b); Television Chatting Function described in paragraphs [5009.16576] through [5009.16650] (FIGS. 14340 through 14405); Device Battery Charging Function described in paragraphs [5009.16651] through [5009.16726] (FIGS. 14406 through 14471b); Hybrid Battery Solar Operating Function described in paragraphs [5009.16727] through [5009.16829] (FIGS. 14472 through 14561); Backup Solar Battery Operating Function described in paragraphs [5009.16830] through [5009.16932] (FIGS. 14562 through 14651); Hybrid Access Point Function described in paragraphs [5009.16933] through [5009.17169] (FIGS. 14652 through 14878g); Earphone Location Identifying Function described in paragraphs [5009.17170] through [5009.17266] (FIGS. 14879 through 14961); Microphone Location Identifying Function described in paragraphs [5009.17267] through [5009.17355] (FIGS. 14962 through 15036); Event Triggered Auto Audiovisual Recording Function described in paragraphs [5009.17356] through [5009.17402] (FIGS. 15037 through 15072b); Event Triggered Auto Audio Recording Function described in paragraphs [5009.17403] through [5009.17449] (FIGS. 15073 through 15108b); Audiovisual Message Bulk Transferring Function described in paragraphs [5009.17450] through [5009.17501] (FIGS. 15109 through 15150b); Multiple Party Conversing Function described in paragraphs [5009.17502] through [5009.17670] (FIGS. 15151 through 15299); Window Monitoring Function described in paragraphs [5009.17671] through [5009.17700] (FIGS. 15300 through 15321b); Window Status Monitoring Function described in paragraphs [5009.17701] through [5009.17730] (FIGS. 15322 through 15343b); Door Monitoring Function described in paragraphs [5009.17731] through [5009.17760] (FIGS. 15344 through 15365b); Door Monitoring Function described in paragraphs [5009.17761] through [5009.17790] (FIGS. 15366 through 15387b); Push-To-Talk Function described in paragraphs [5009.17791] through [5009.18008] (FIGS. 15388 through 15586c Push-To-T); Door Open Monitoring Function described in paragraphs [5009.18009] through [5009.18065] (FIGS. 15587 through 15633b); Window Open Monitoring Function described in paragraphs [5009.18066] through [5009.18122] (FIGS. 15634 through 15680b); Lock Open Monitoring Function described in paragraphs [5009.18123] through [5009.18179] (FIGS. 15681 through 15727b); Destination Proceeding Function described in paragraphs [5009.18180] through [5009.18265] (FIGS. 15728 through 15803d); Driver's Eye Monitoring Safety Function described in paragraphs [5009.18266] through [5009.18316] (FIGS. 15804 through 15845); Driver's Head Monitoring Safety Function described in paragraphs [5009.18317] through [5009.18365] (FIGS. 15846 through 15885); Drawer Open Monitoring Function described in paragraphs [5009.18366] through [5009.18422] (FIGS. 15886 through 15932b); Curtain Open Monitoring Function described in paragraphs [5009.18423] through [5009.18479] (FIGS. 15933 through 15979b); Gate Open Monitoring Function described in paragraphs [5009.18480] through [5009.18536] (FIGS. 15980 through 16026b); Faucet Open Monitoring Function described in paragraphs [5009.18537] through [5009.18593] (FIGS. 16027 through 16073b); Hybrid Refrigerator Function described in paragraphs [5009.18594] through [5009.18695] (FIGS. 16074 through 16159b); Multiple Purpose Chamber Function described in paragraphs [5009.18696] through [5009.18869] (FIGS. 16160 through 16312c); Audiovisual Quality Auto Adjusting Function described in paragraphs [5009.18870] through [5009.18930] (FIGS. 16313 through 16363b); Audio Quality Auto Adjusting Function described in paragraphs

[5009.18931] through [5009.18991] (FIGS. 16364 through 16414b); TV Phone Quality Auto Adjusting Function described in paragraphs [5009.18992] through [5009.19100] (FIGS. 16415 through 16512); Voice Phone Quality Auto Adjusting Function described in paragraphs [5009.19101] through [5009.19209] (FIGS. 16513 through 16610); Television Related Audiovisual Downloading Function described in paragraphs [5009.19210] through [5009.19299] (FIGS. 16611 through 16687); Radio Related Audio Downloading Function described in paragraphs [5009.19300] through [5009.19389] (FIGS. 16688 through 16764); Header Displaying Function described in paragraphs [5009.19390] through [5009.19464] (FIG. 16765 through FIG. 16826b); Footer Displaying Function described in paragraphs [5009.19465] through [5009.19539] (FIG. 16827 through FIG. 16888b); Location Scheduled Notifying Function described in paragraphs [5009.19540] through [5009.19602] (FIG. 16889 through FIG. 16941e); Zone Leaving Notifying Function described in paragraphs [5009.19603] through [5009.19675] (FIG. 16942 through FIG. 17005d); Zone Entering Notifying Function described in paragraphs [5009.19676] through [5009.19748] (FIG. 17006 through FIG. 17069d); Power Off Notifying Function described in paragraphs [5009.19749] through [5009.19794] (FIG. 17070 through FIG. 17106d); Power On Notifying Function described in paragraphs [5009.19795] through [5009.19840] (FIG. 17107 through FIG. 17143d); Security Alarm On Notifying Function described in paragraphs [5009.19841] through [5009.19886] (FIG. 17144 through FIG. 17180d); Security Alarm Off Notifying Function described in paragraphs [5009.19887] through [5009.19932] (FIG. 17181 through FIG. 17217d); Email Transfer Notifying Function described in paragraphs [5009.19933] through [5009.19978] (FIG. 17218 through FIG. 17254d); Email Reception Notifying Function described in paragraphs [5009.19979] through [5009.20024] (FIG. 17255 through FIG. 17291d); Making Phone Call Notifying Function described in paragraphs [5009.20025] through [5009.20070] (FIG. 17292 through FIG. 17328d); Phone Call Reception Notifying Function described in paragraphs [5009.20071] through [5009.20116] (FIG. 17329 through FIG. 17365d); Key Pressed Notifying Function described in paragraphs [5009.20117] through [5009.20162] (FIG. 17366 through FIG. 17402d); Software Activation Notifying Function described in paragraphs [5009.20163] through [5009.20208] (FIG. 17403 through FIG. 17439d); Document Opening Notifying Function described in paragraphs [5009.20209] through [5009.20254] (FIG. 17440 through FIG. 17476d); Specified Event Notifying Function described in paragraphs [5009.20255] through [5009.20315] (FIG. 17477 through FIG. 17527d); Television Phone Auto Backup Function described in paragraphs [5009.20316] through [5009.20447] (FIG. 17528 through FIG. 17645b); File Auto Saving Function described in paragraphs [5009.20448] through [5009.20495] (FIG. 17646 through FIG. 17678b); File Compressing Function described in paragraphs [5009.20496] through [5009.20559] (FIG. 17679 through FIG. 17727e); Multiple Phone Number Billing Function described in paragraphs [5009.20560] through [5009.20609] (FIG. 17728 through FIG. 17771); Multiple Device Door Unlocking Function described in paragraphs [5009.20610] through [5009.20685] (FIG. 17772 through FIG. 17832c); Multiple Device Door Locking Function described in paragraphs [5009.20686] through [5009.20761] (FIG. 17833 through FIG. 17893c); Phone Call Making Log Recording Function described in paragraphs [5009.20762] through [5009.20815] (FIG. 17894 through FIG. 17938d); Phone Call Receiving Log Recording Function described in paragraphs [5009.20816] through [5009.20867] (FIG. 17939 through FIG. 17981d); Phone Call Making Log Exporting Function described in paragraphs [5009.20868] through [5009.20917] (FIG. 17982 through FIG. 18022d); Phone Call Receiving Log Exporting Function described in paragraphs [5009.20918] through [5009.20967] (FIG. 18023 through FIG. 18063d); Phone Call Making Log Synchronizing Function described in paragraphs [5009.20968] through [5009.21021] (FIG. 18064 through FIG. 18106f); Phone Call Receiving Log Synchronizing Function described in paragraphs [5009.21022] through [5009.21075] (FIG. 18107 through FIG. 18149f); 3D Advertisement Displaying Function described in paragraphs [5009.21076] through [5009.21217] (FIG. 18150 through FIG. 18277); Audiovisual Location Capability Function described in paragraphs [5009.21218] through [5009.21276] (FIG. 18278 through FIG. 18325c); Location Audio Notifying Function described in paragraphs [5009.21277] through [5009.21319] (FIG. 18326 through FIG. 18359b); Answering Machine Location Recording Function described in paragraphs [5009.21320] through [5009.21388] (FIG. 18360 through FIG. 18417e); Visual Phone File Sharing Function described in paragraphs [5009.21389] through [5009.21526] (FIG. 18418 through FIG. 18540b); Visual Phone Magnifying Function described in paragraphs [5009.21527] through [5009.21629](FIG. 18541 through FIG. 18631); Multiple Home Page Displaying Function described in paragraphs [5009.21630] through [5009.21700] (FIG. 18632 through FIG. 18693b FIG. 18632 through FIG. 18693b); Multiple Visual Phone Party Location Identifying Function described in paragraphs [5009.21701] through [5009.21796] (FIG. 18694 through FIG. 18778g); Individual Party Conversation Replaying Function described in paragraphs [5009.21797] through [5009.21962] (FIG. 18779 through FIG. 18929d); Multiple Phone Notifying Function described in paragraphs [5009.21963] through [5009.22050] (FIG. 18930 through FIG. 19004i); Multiple Phone Dial Tone Function described in paragraphs [5009.22051] through [5009.22160] (FIG. 19005 through FIG. 19101f); Multiple Phone New Party Joining Function described in paragraphs [5009.22161] through [5009.22276] (FIG. 19102 through FIG. 19206j); Music Property Setting Function described in paragraphs [5009.22277] through [5009.22302] (FIG. 19207 through FIG. 19226b); Fore/Background Audio Recording Function described in paragraphs [5009.22303] through [5009.22334] (FIGS. 19227 through 19248); Email Address Phone Calling Function described in paragraphs [5009.22335] through [5009.22392] (FIGS. 19249 through 19295c); Night Vision Displaying Carrier Function described in paragraphs [5009.22393] through [5009.22501] (FIGS. 19296 through 19386b); Phone Number Email Function described in paragraphs [5009.22502] through [5009.22561] (FIGS. 19387 through 19436c); No-Answer Auto Emailing Function described in paragraphs [5009.22562] through [5009.22634] (FIGS. 19437 through 19499e); Linked Page Auto Downloading Function described in paragraphs [5009.22635] through [5009.22662] (FIGS. 19500 through 19519); Folder Auto Hiding Function described in paragraphs [5009.22663] through [5009.22692] (FIGS. 19520 through 19543); Folder Time Defined Hiding Function described in paragraphs [5009.22693] through [5009.22746] (FIGS. 19544 through 19591); Folder Time Defined Revealing Function described in paragraphs [5009.22747] through [5009.22800] (FIGS. 19592 through 19639); Common Phone Number Changing Function described in paragraphs [5009.22801] through [5009.22829] (FIGS. 19640 through 19658c); Common Email Address Changing Function described in paragraphs [5009.22830] through [5009.22858] (FIGS. 19659 through 19677c); Multiple Incrementing Counter Function described in paragraphs [5009.22859] through [5009.22896] (FIGS. 19678 through 19709); Multiple Decrementing Counter Function described in paragraphs [5009.22897] through [5009.22934] (FIGS. 19710 through 19741); Multiple Alarm Clock Function described in paragraphs [5009.22935] through [5009.22984] (FIGS. 19742 through 19783); Alarm Clock Current Location Notifying Function described in paragraphs [5009.22985] through [5009.23022] (FIG. 19784 through FIG. 19815b); Camcorder Auto Time Adjusting Function described in paragraphs [5009.23023] through [5009.23047] (FIG. 19816 through FIG. 19833b); Location Identified Device Information Displaying Function described in paragraphs [5009.23048] through [5009.23098] (FIG. 19834 through FIG. 19875b); Folder Message Displaying Function described in paragraphs [5009.23099] through [5009.23126] (FIG. 19876 through FIG. 19897); Folder Audiovisual Outputting Function described in paragraphs [5009.23127] through [5009.23154] (FIG. 19898 through FIG. 19919); Pistol Monitoring Function described in paragraphs [5009.23155] through [5009.23226] (FIG. 19920 through FIG. 19983b); Earthquake Auto Locking Function described in paragraphs [5009.23227] through [5009.23264] (FIG. 19984 through FIG. 20013); Television Resolution Auto Changing Function described in paragraphs [5009.23265] through [5009.23290] (FIG. 20014 through FIG. 20033); Shortcut Auto Creating Function described in paragraphs [5009.23291] through [5009.23312] (FIG. 20034 through FIG. 20049); Auto Zooming Function described in paragraphs [5009.23313] through [5009.23332] (FIG. 20050 through FIG. 20063b); Oxygen Tank Function described in paragraphs [5009.23333] through [5009.23384] (FIG. 20064 through FIG. 20107); In Carrier Server Function described in paragraphs [5009.23385] through [5009.23430] (FIG. 20108 through FIG. 20146); Silent Mode Auto Subtitle Displaying Function described in paragraphs [5009.23431] through [5009.23454] (FIG. 20147 through FIG. 20164b); Silent Mode Auto Answerphone Message Displaying Function described in paragraphs [5009.23455] through [5009.23476] (FIG. 20165 through FIG. 20180b); Midnight Auto Downloading Function described in paragraphs [5009.23477] through [5009.23498] (FIG. 20181 through FIG. 20196); Shortcut Link Auto Updating Function described in paragraphs [5009.23499] through [5009.23522] (FIG. 20197 through FIG. 20214); Web Page Auto Refreshing Function described in paragraphs [5009.23523] through [5009.23560] (FIG. 20215 through FIG. 20246); Vibrator Remote Activation Function described in paragraphs [5009.23561] through [5009.23584] (FIG. 20247 through FIG. 20263b); Scenario Accordance Vibrating Function described in paragraphs [5009.23585] through [5009.23608] (FIG. 20264 through FIG. 20281); Location Dependent Message Outputting Function described in paragraphs [5009.23609] through [5009.23640] (FIG. 20282 through FIG. 20307c); Location Dependent Program Activating Function described in paragraphs [5009.23641] through [5009.23670] (FIG. 20308 through FIG. 20333c); Multiple Answering Machine Function described in paragraphs [5009.23671] through [5009.23716] (FIG. 20334 through FIG. 20373b); Time Dependent Answering Machine Function described in paragraphs [5009.23717] through [5009.23750] (FIG. 20374 through FIG. 20401b); Television Program Data Storage Area Selecting Function described in paragraphs [5009.23751] through [5009.23799] (FIG. 20402 through FIG. 20444c); Street Address Icon Displaying Function described in paragraphs [5009.23800] through [5009.23829] (FIG. 20445 through FIG. 20468c); Audiovisual Multiple Recording/Replaying Function described in paragraphs [5009.23830] through [5009.23867] (FIG. 20469 through FIG. 20500d); Map Editing Function described in paragraphs [5009.23868] through [5009.23901] (FIG. 20501 through FIG. 20528); Enhanced Television Tuner Remote Controlling Function described in paragraphs [5009.23902] through [5009.23940] (FIG. 20529 through FIG. 20560b); Enhanced DVD Player Remote Controlling Function described in paragraphs [5009.23941] through [5009.24002] (FIG. 20561 through FIG. 20615b); Monetary Value Data Auto Charging Function described in paragraphs [5009.24003] through [5009.24030] (FIG. 20616 through FIG. 20637c); Site Viewing Remotely Prohibiting Function described in paragraphs [5009.24031] through [5009.24062] (FIG. 20638 through FIG. 20662d); Remotely Controlled Device Auto Selecting Function described in paragraphs [5009.24063] through [5009.24110] (FIG. 20663 through FIG. 20702d); Driver Alerting Function described in paragraphs [5009.24111] through [5009.24150] (FIG. 20703 through FIG. 20735b); Robot Controlling Macro Function described in paragraphs [5009.24151] through [5009.24224] (FIG. 20736 through FIG. 20799b); Robot Predetermined Location Proceeding Function described in paragraphs [5009.24225] through [5009.24290] (FIG. 20800 through FIG. 20858); Message Leaving Function described in paragraphs [5009.24291] through [5009.24350] (FIG. 20859 through FIG. 20911c); Unique Folder Icon Attaching Function described in paragraphs [5009.24351] through [5009.24380] (FIG. 20912 through FIG. 20935d); Unique File Icon Attaching Function described in paragraphs [5009.24381] through [5009.24410] (FIG. 20936 through FIG. 20959d); Unique Email Icon Attaching Function described in paragraphs [5009.24411] through [5009.24440] (FIG. 20960 through FIG. 20983d); Device Current Condition Notifying Function described in paragraphs [5009.24441] through [5009.24536] (FIG. 20984 through FIG. 21072d); Device Bulk Duplicating Function described in paragraphs [5009.24537] through [5009.24613] (FIG. 21073 through FIG. 21142c); Program Related Audiovisual Data Auto Downloading Function described in paragraphs [5009.24614] through [5009.24643] (FIG. 21143 through FIG. 21166c); Weather Dependent Program Executing Function described in paragraphs [5009.24644] through [5009.24702] (FIG. 21167 through FIG. 21218d); Audiovisual Outputting Function described in paragraphs [5009.24703] through [5009.24745] (FIG. 21219 through FIG. 21254e); Email Outputting Function described in paragraphs [5009.24746] through [5009.24788] (FIG. 21255 through FIG. 21290e); Document Outputting Function described in paragraphs [5009.24789] through [5009.24831] (FIG. 21291 through FIG. 21326e); Program Executing Function described in paragraphs [5009.24832] through [5009.24874] (FIG. 21327 through FIG. 21362e); Multiple Mode Implementing Function described in paragraphs [5011] through [5018] (FIGS. 395 through 400); Multiple Software Download Function described in paragraphs [5019] through [5028] (FIGS. 401 through 407); Selected Software Distributing Function described in paragraphs [5029] through [5048] (FIGS. 1376 through 1393d); Multiple Software Download And Mode Implementation Function described in paragraphs [5049] through [5056] (FIGS. 408 through 412); and the last sentence described in paragraph [5058] (no drawings).

The invention claimed is:

1. A communication device comprising:
   a microphone;
   a speaker;
   an input device;
   a display;
   an antenna;
   a voice communicating implementer, wherein voice communication is implemented with another device in a wireless fashion;
   a payment monetary value data transmitting implementer, wherein a payment monetary value data is transmitted in a wireless fashion, wherein said payment monetary value data indicates a certain amount of monetary value in a certain currency;
   a remaining monetary value data updating implementer, wherein a remaining monetary value data is updated by subtracting said payment monetary value data therefrom, wherein said remaining monetary value data is the total amount of monetary value in said certain currency;
   an automated supplementary monetary value data adding implementer, wherein said remaining monetary value data is compared with a certain criterion and when said remaining monetary value data is determined to be below said certain criterion, said communication device automatically receives a supplementary monetary value data in a wireless fashion and updates said remaining monetary value data by adding said supplementary monetary value data thereto; and
   a simultaneous implementation implementer, wherein said voice communicating implementer and one of said payment monetary value data transmitting implementer, said remaining monetary value data updating implementer, and said automated supplementary monetary value data adding implementer are implemented simultaneously, thereby said payment monetary value data is transmitted in a wireless fashion, said remaining monetary value data is updated by subtracting said payment monetary value data therefrom, or said communication device automatically receives said supplementary monetary value data in a wireless fashion while said voice communication is implemented.

2. A system comprising:
   a communication device comprising a microphone, a speaker, an input device, a display, and an antenna;
   a voice communicating implementer, wherein voice communication is implemented with another device in a wireless fashion;
   a payment monetary value data transmitting implementer, wherein a payment monetary value data is transmitted in a wireless fashion, wherein said payment monetary value data indicates a certain amount of monetary value in a certain currency;
   a remaining monetary value data updating implementer, wherein a remaining monetary value data is updated by subtracting said payment monetary value data therefrom, wherein said remaining monetary value data is the total amount of monetary value in said certain currency;
   an automated supplementary monetary value data adding implementer, wherein said remaining monetary value data is compared with a certain criterion and when said remaining monetary value data is determined to be below said certain criterion, said communication device automatically receives a supplementary monetary value data in a wireless fashion and updates said remaining monetary value data by adding said supplementary monetary value data thereto; and
   a simultaneous implementation implementer, wherein said voice communicating implementer and one of said payment monetary value data transmitting implementer, said remaining monetary value data updating implementer, and said automated supplementary monetary value data adding implementer are implemented simultaneously, thereby said payment monetary value data is transmitted in a wireless fashion, said remaining monetary value data is updated by subtracting said payment monetary value data therefrom, or said communication device automatically receives said supplementary monetary value data in a wireless fashion while said voice communication is implemented.

3. A method for a communication device comprising a microphone, a speaker, an input device, a display, and an antenna, said method comprising:
   a voice communicating implementing step, wherein voice communication is implemented with another device in a wireless fashion;
   a payment monetary value data transmitting implementing step, wherein a payment monetary value data is transmitted in a wireless fashion, wherein said payment monetary value data indicates a certain amount of monetary value in a certain currency;
   a remaining monetary value data updating implementing step, wherein a remaining monetary value data is updated by subtracting said payment monetary value data therefrom, wherein said remaining monetary value data is the total amount of monetary value in said certain currency;
   an automated supplementary monetary value data adding implementing step, wherein said remaining monetary value data is compared with a certain criterion and when said remaining monetary value data is determined to be below said certain criterion, said communication device automatically receives a supplementary monetary value data in a wireless fashion and updates said remaining monetary value data by adding said supplementary monetary value data thereto; and
   a simultaneous implementation implementing step, wherein said voice communicating implementing step and one of said payment monetary value data transmitting implementing step, said remaining monetary value data updating implementing step, and said automated supplementary monetary value data adding implementing step are implemented simultaneously, thereby said payment monetary value data is transmitted in a wireless fashion, said remaining monetary value data is updated by subtracting said payment monetary value data therefrom, or said communication device automatically receives said supplementary monetary value data in a wireless fashion while said voice communication is implemented.

* * * * *